April 16, 1957  H. A. SKOG  2,788,818
PEACH FEEDING, ORIENTING, ASSORTING, TRANSFERRING,
SPLITTING, AND PITTING MACHINE
Filed Dec. 14, 1950  38 Sheets-Sheet 1

INVENTOR.
Henry A. Skog
BY
Moore, Olson & Treadway

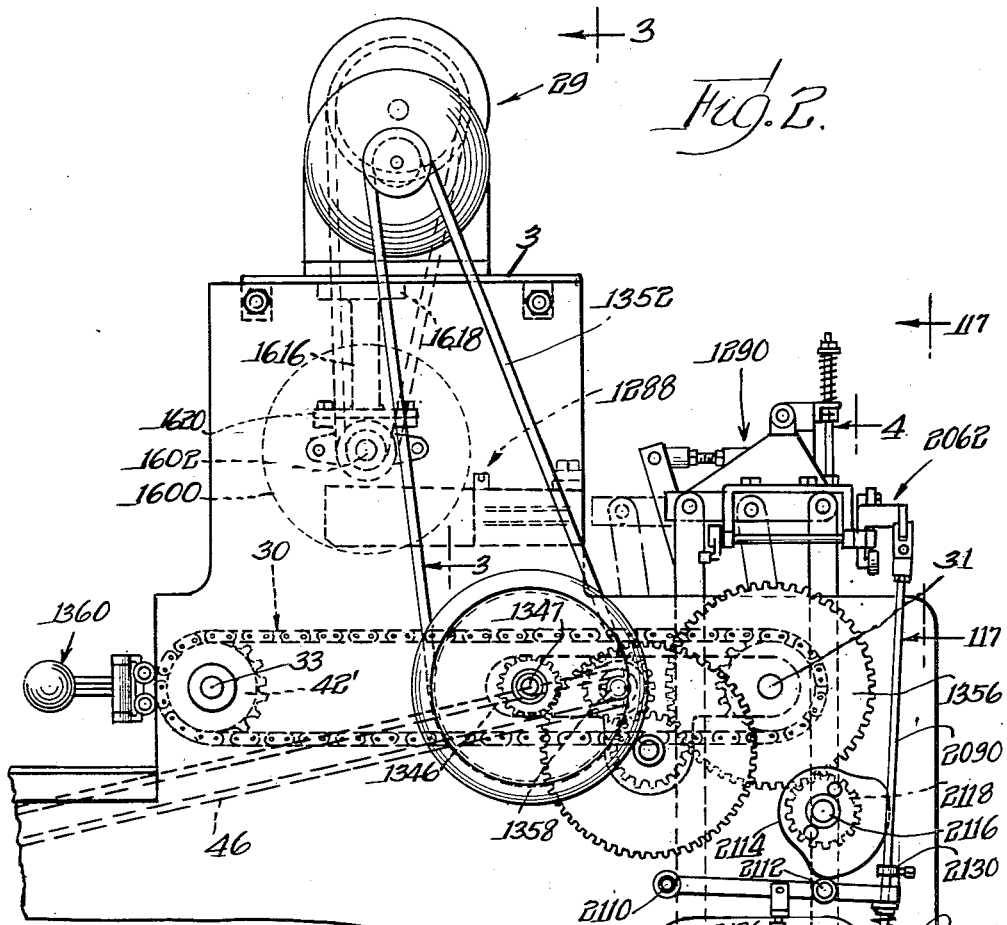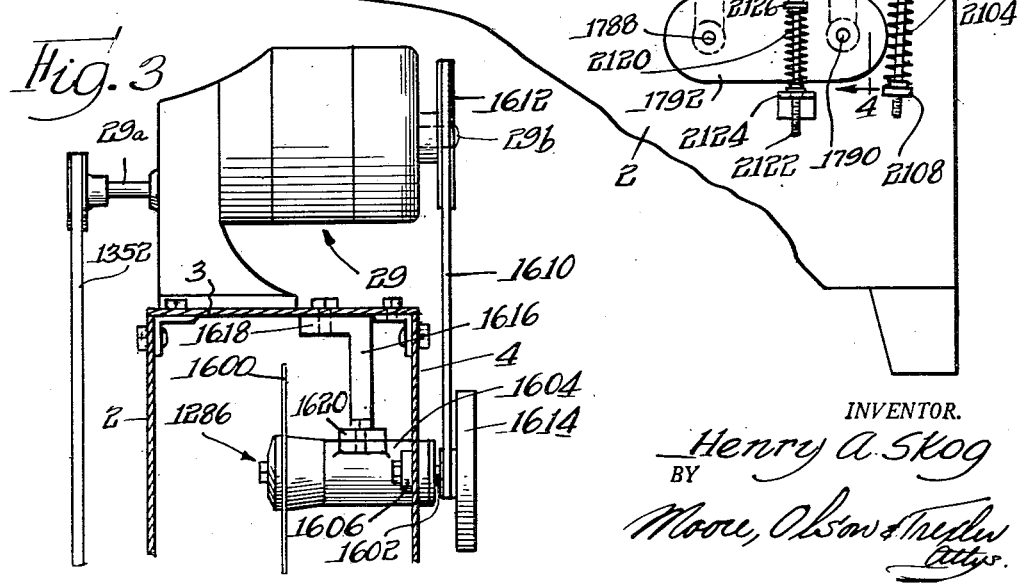

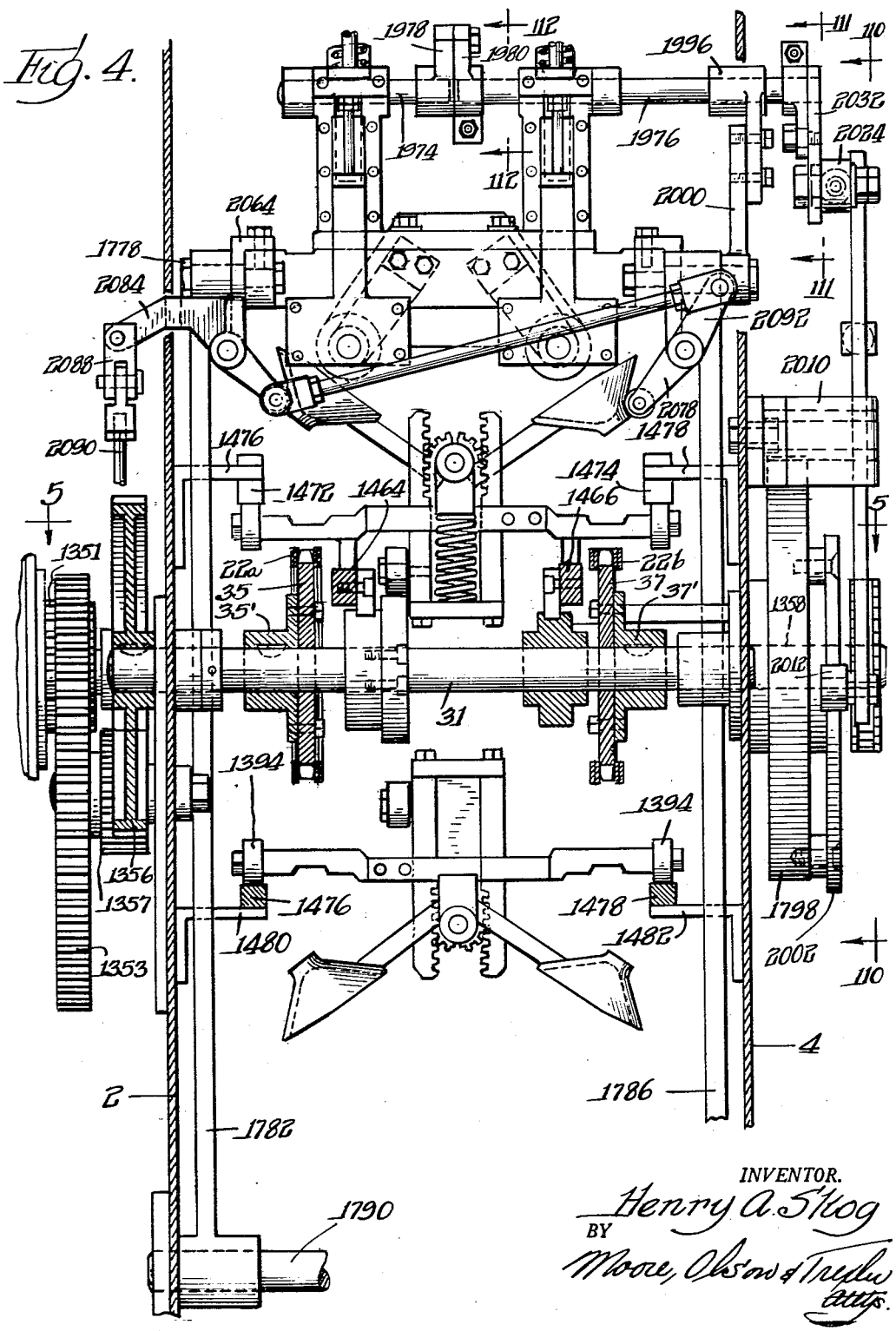

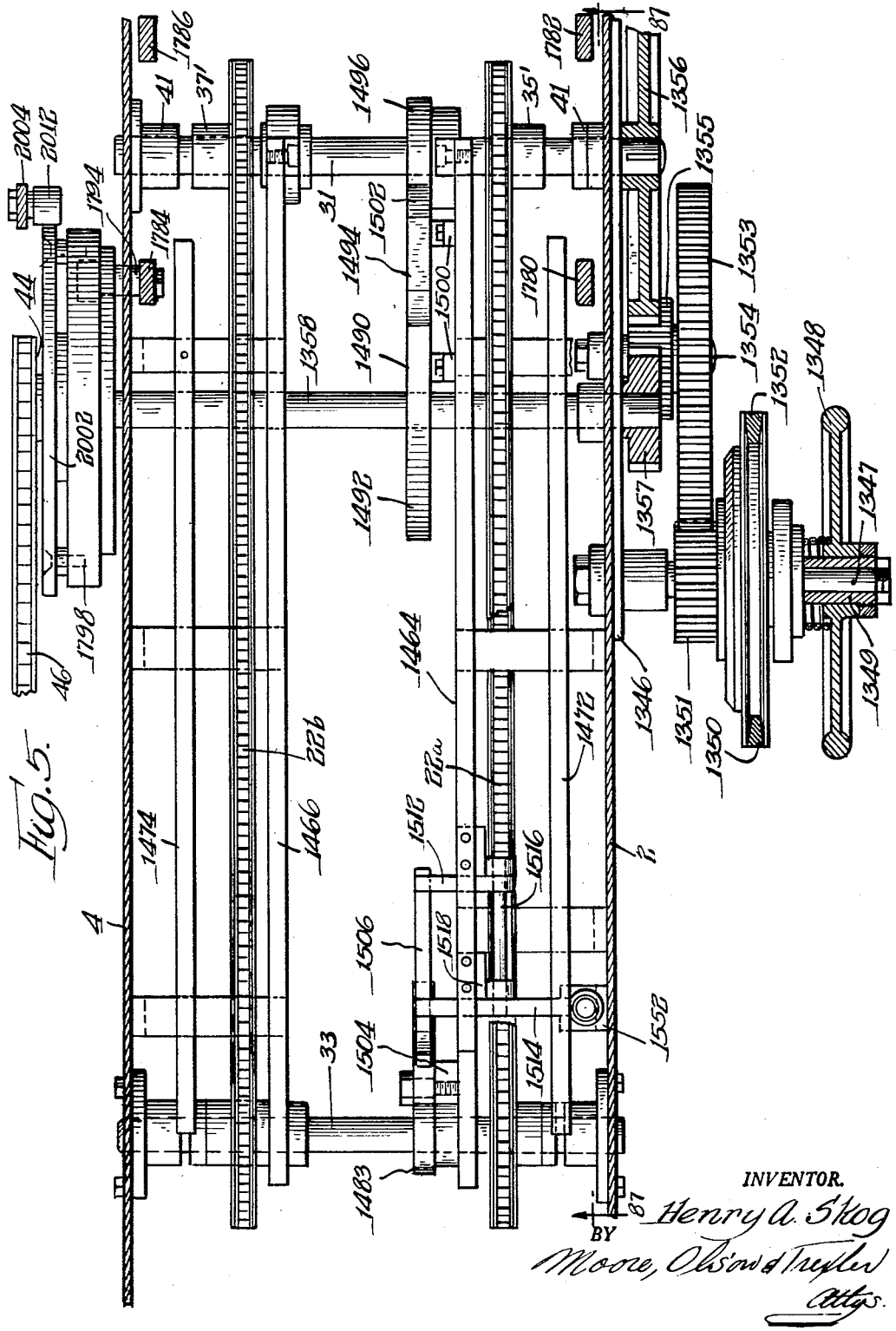

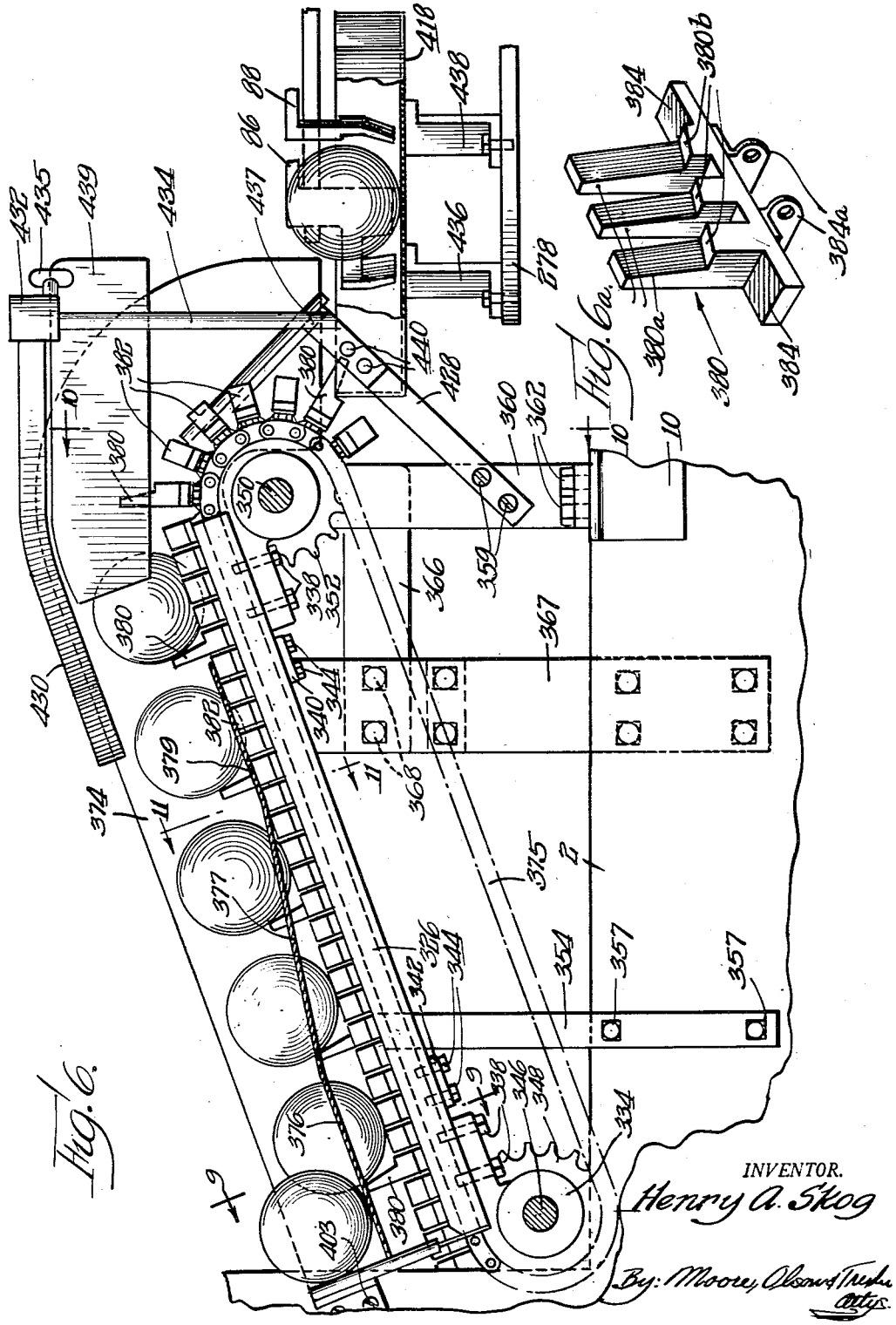

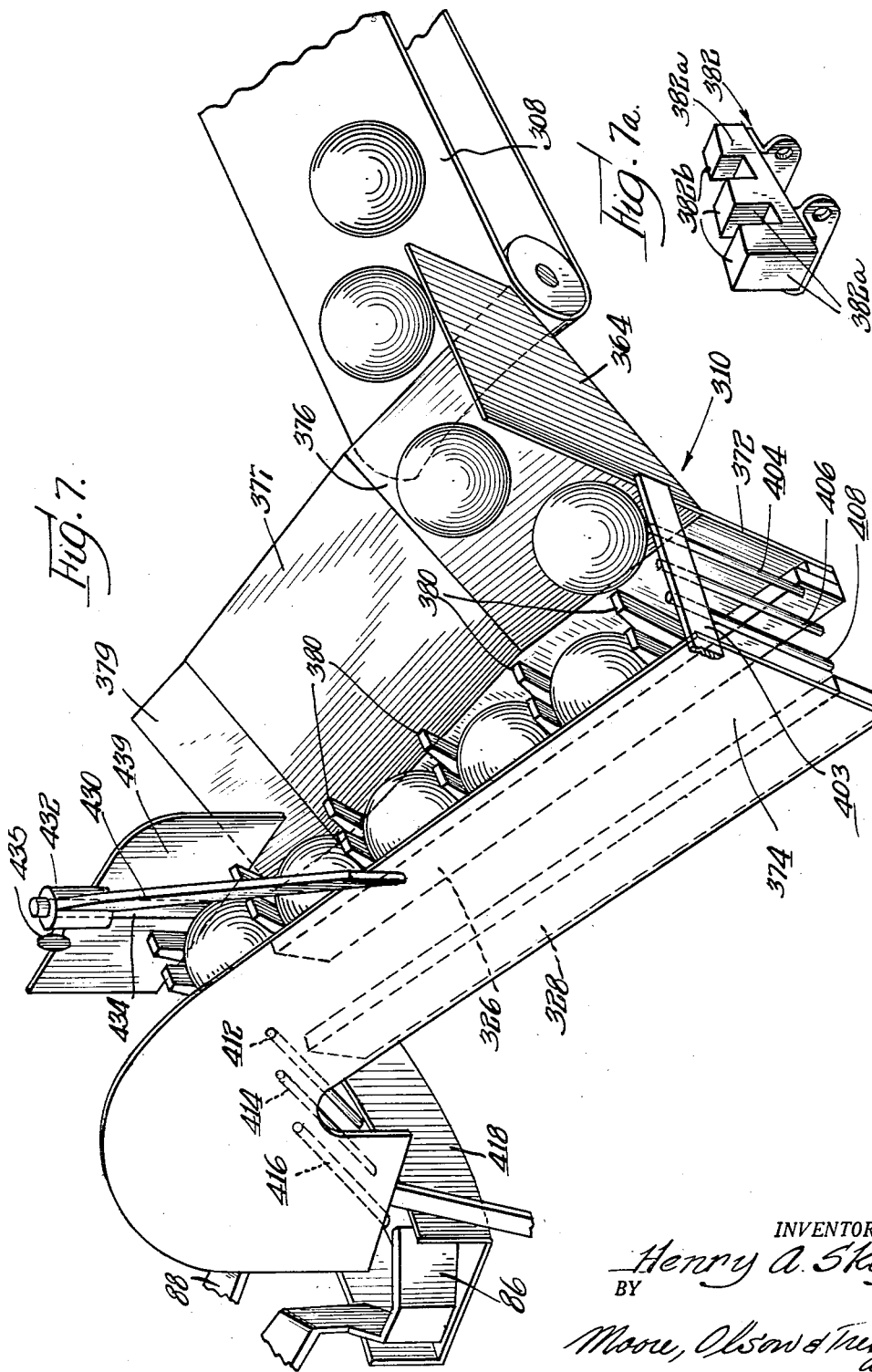

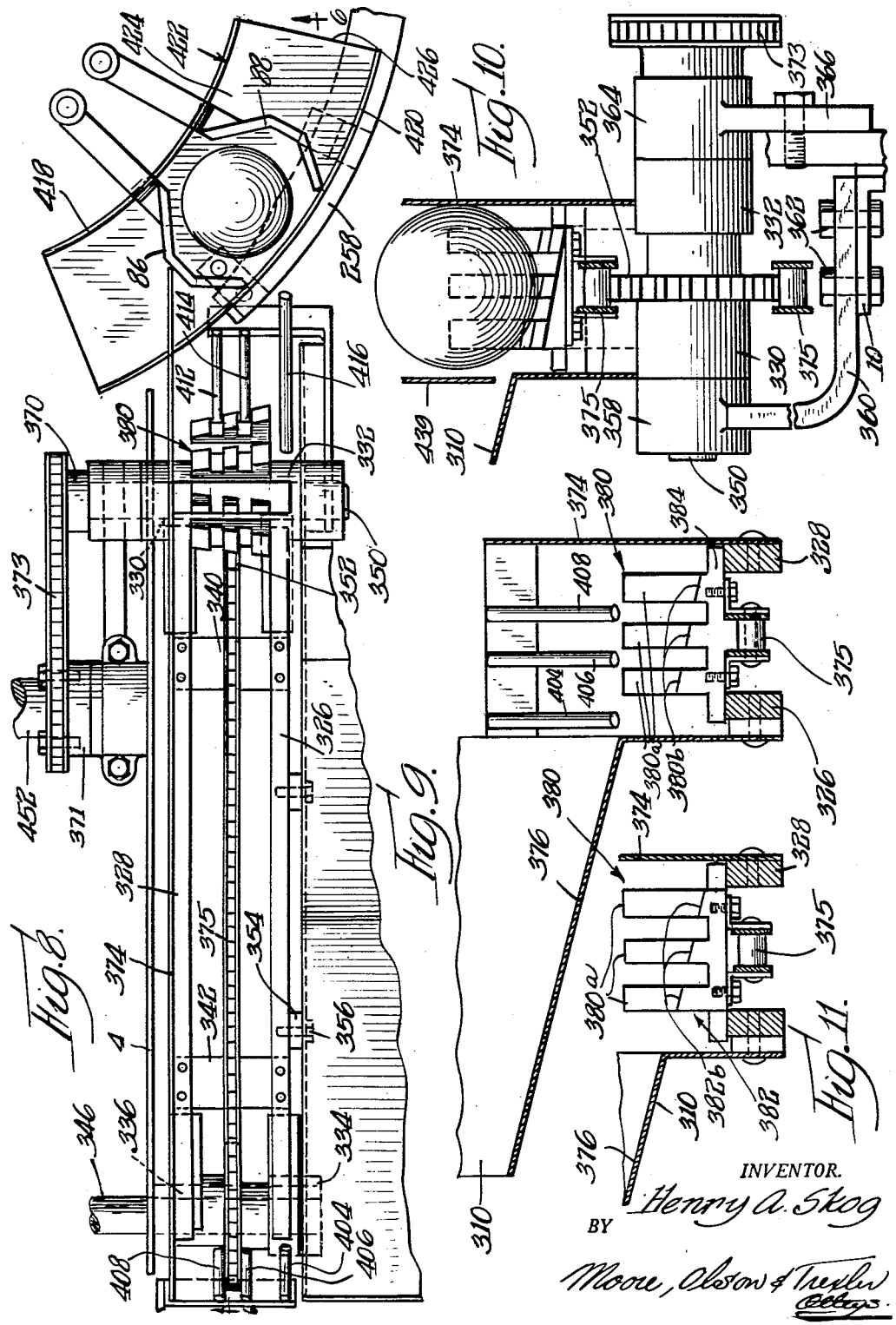

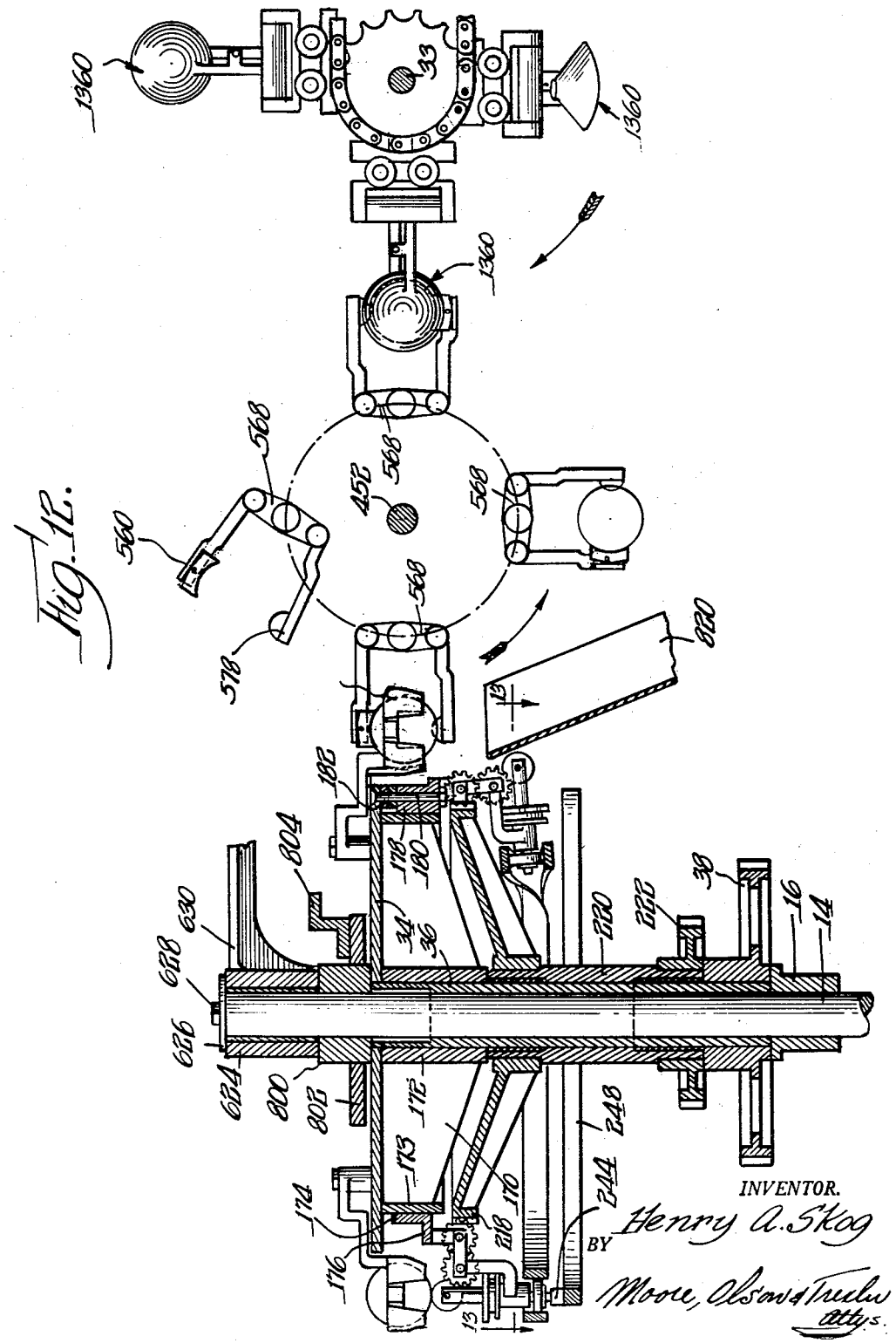

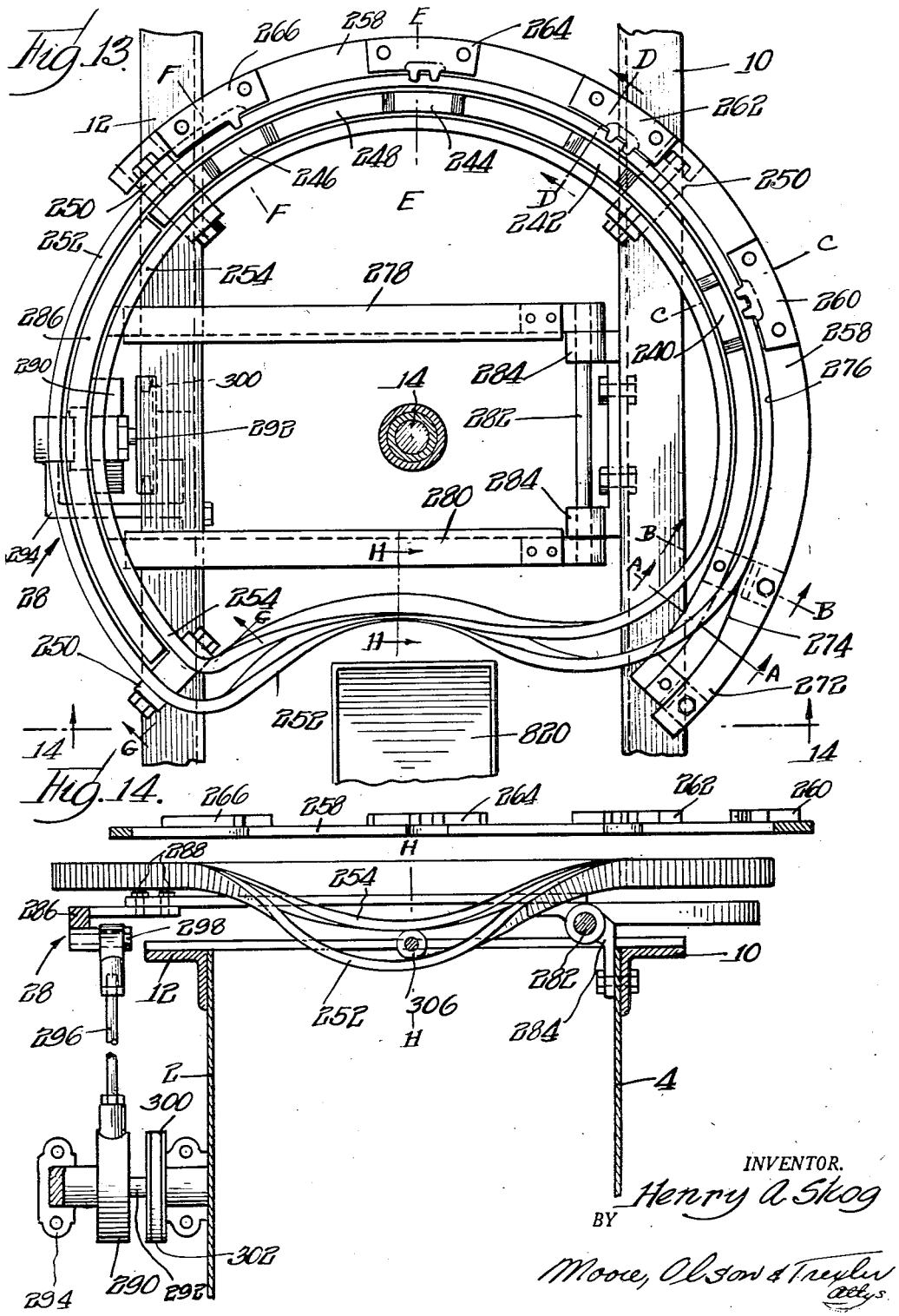

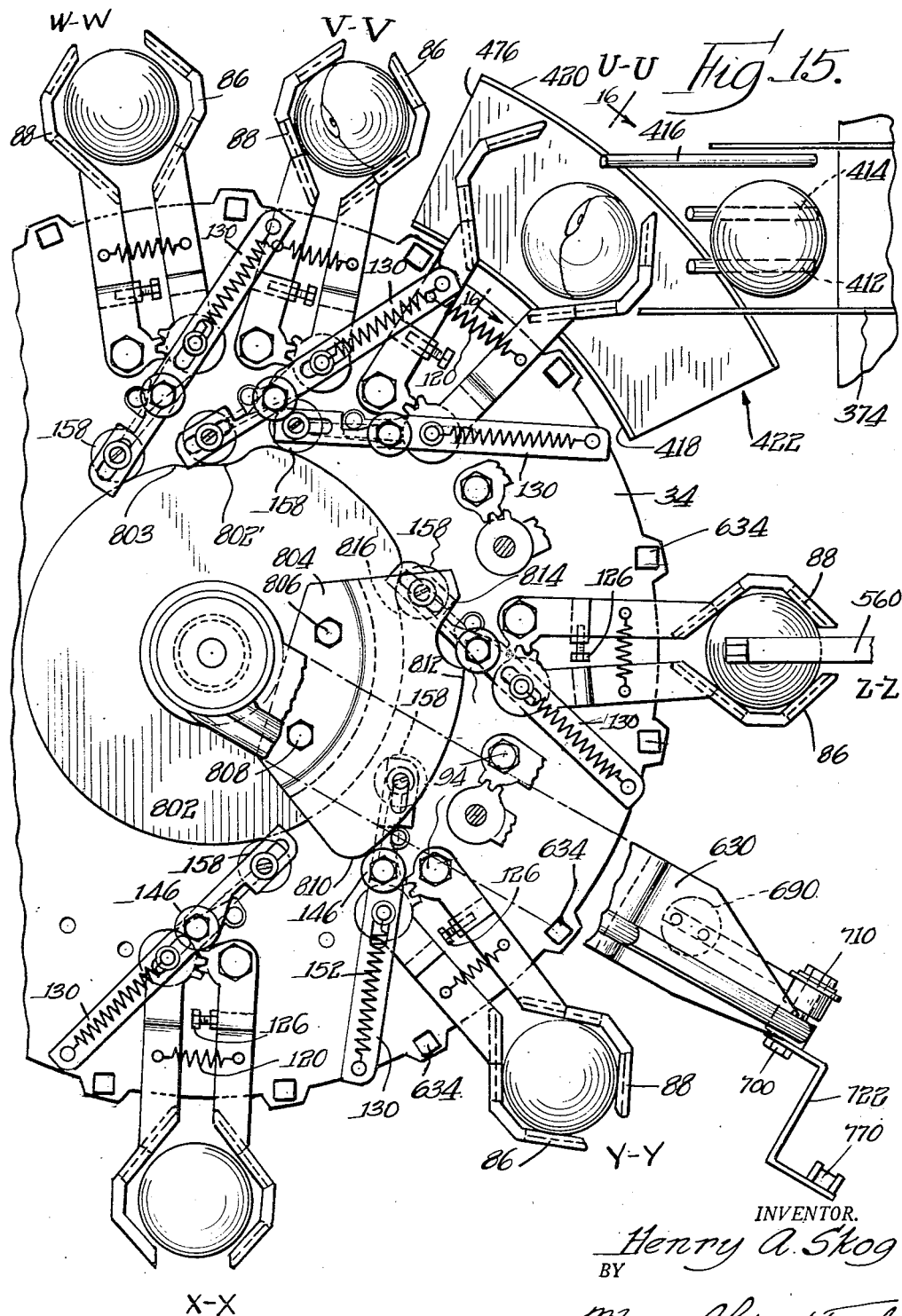

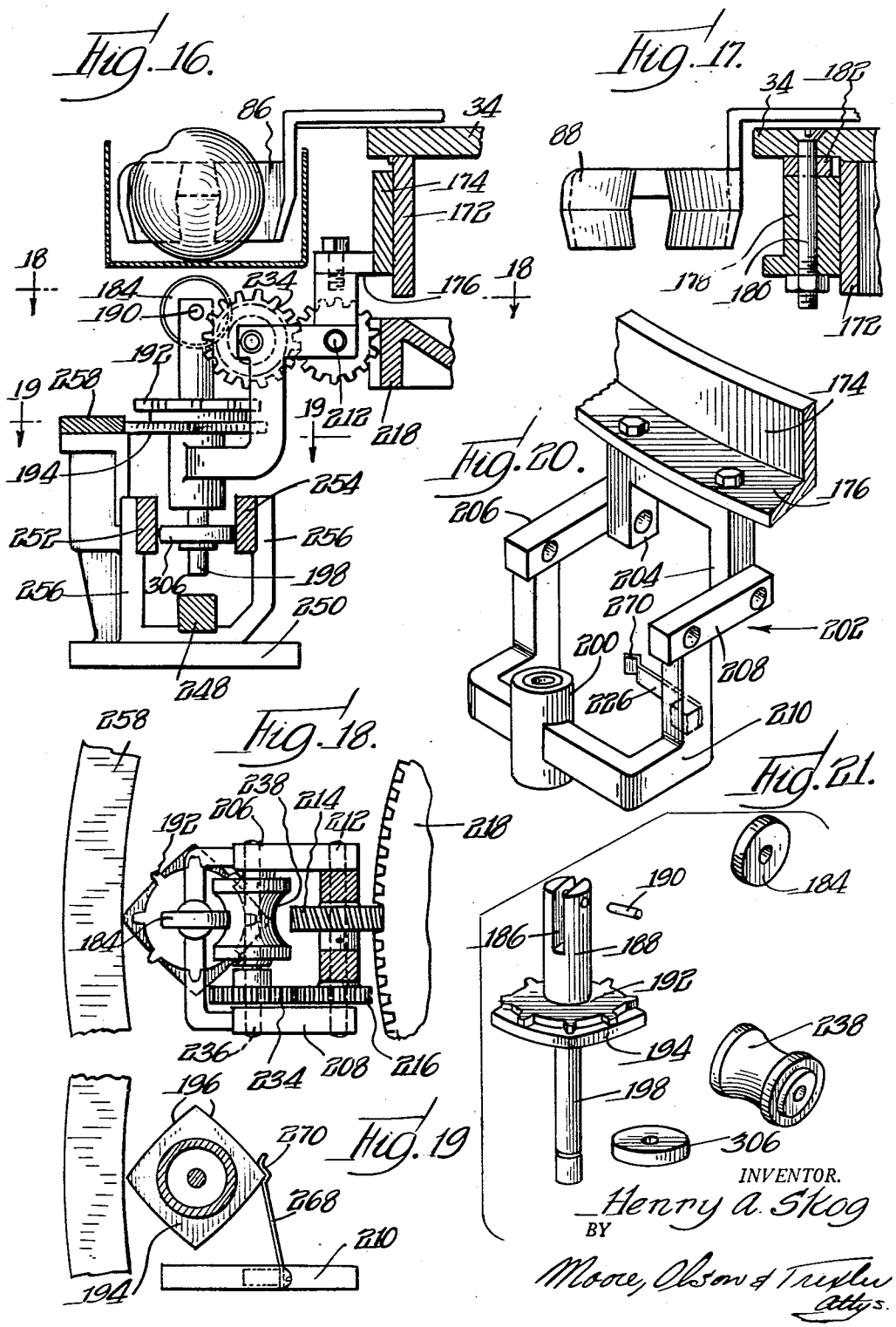

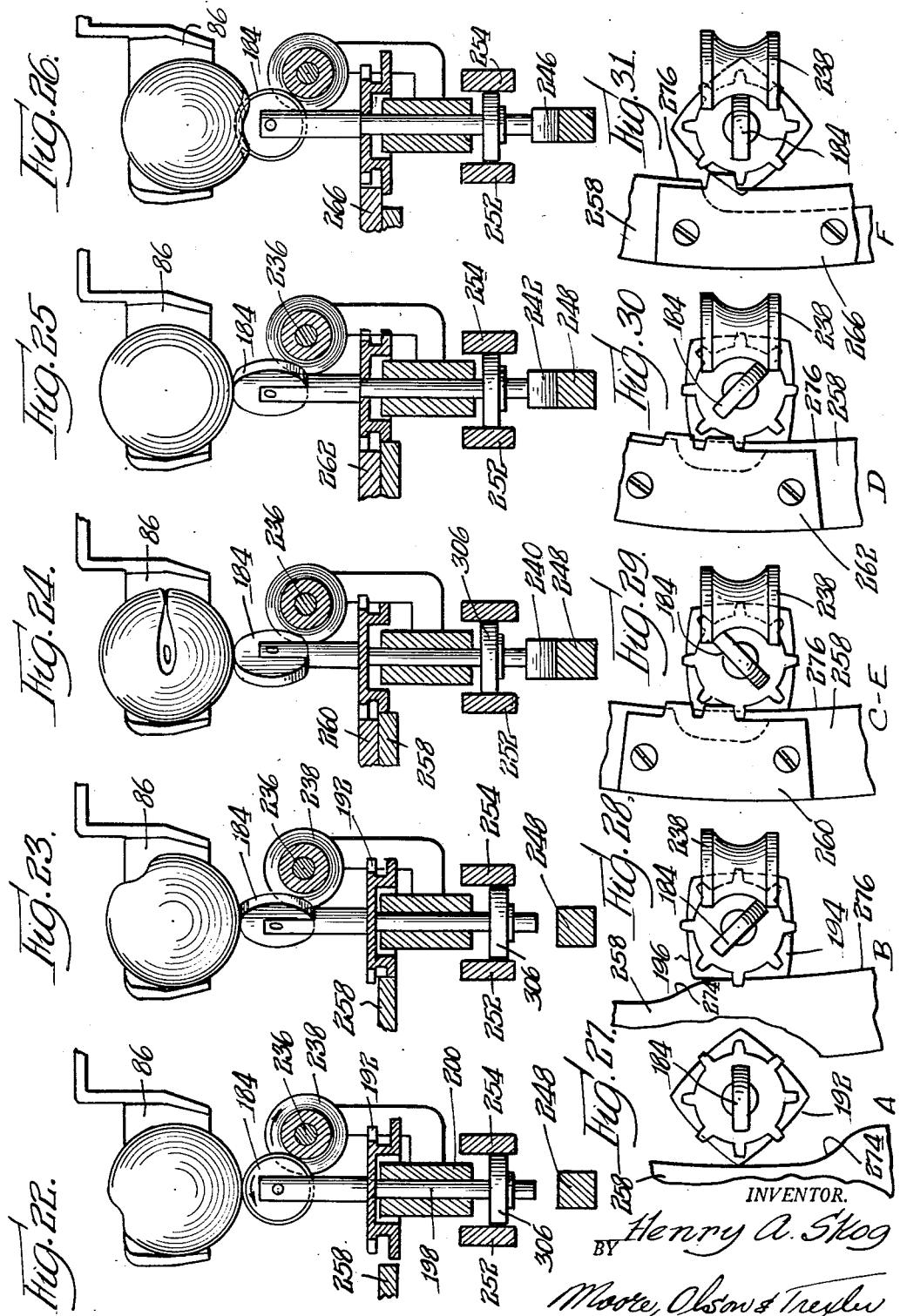

April 16, 1957 H. A. SKOG 2,788,818
PEACH FEEDING, ORIENTING, ASSORTING, TRANSFERRING,
SPLITTING, AND PITTING MACHINE
Filed Dec. 14, 1950 38 Sheets-Sheet 13
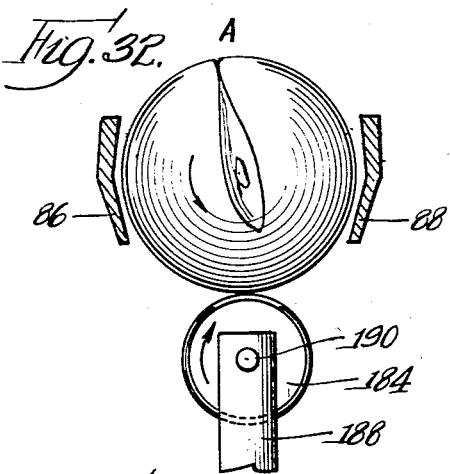
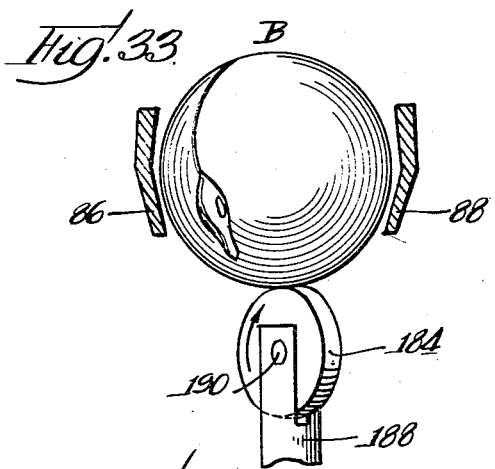
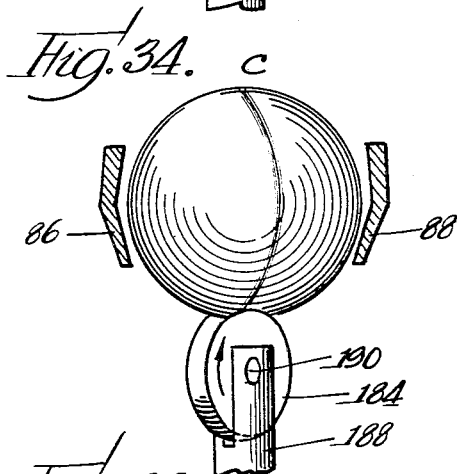
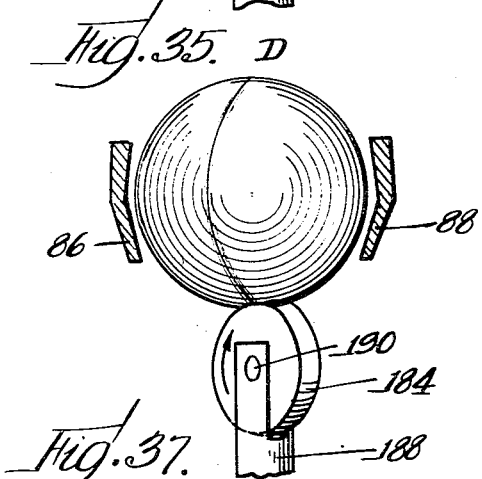
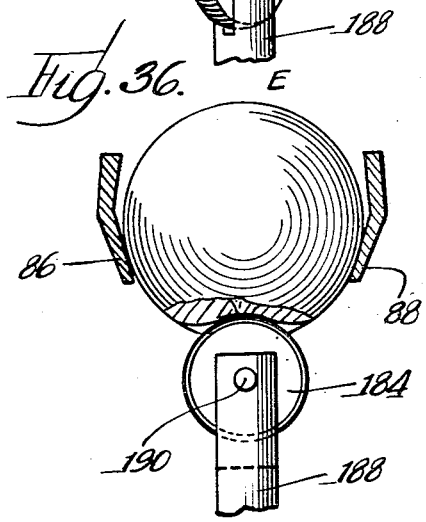
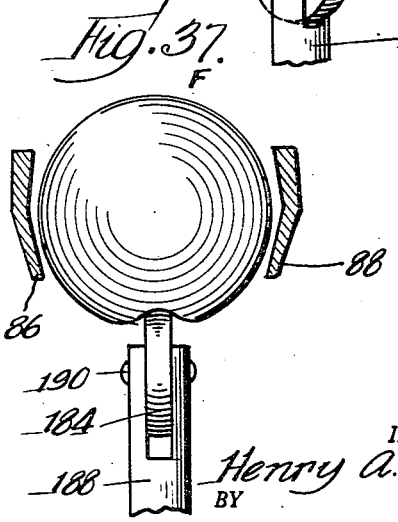
INVENTOR.
Henry A. Skog
BY
Moore, Olson & Trexler
attys.

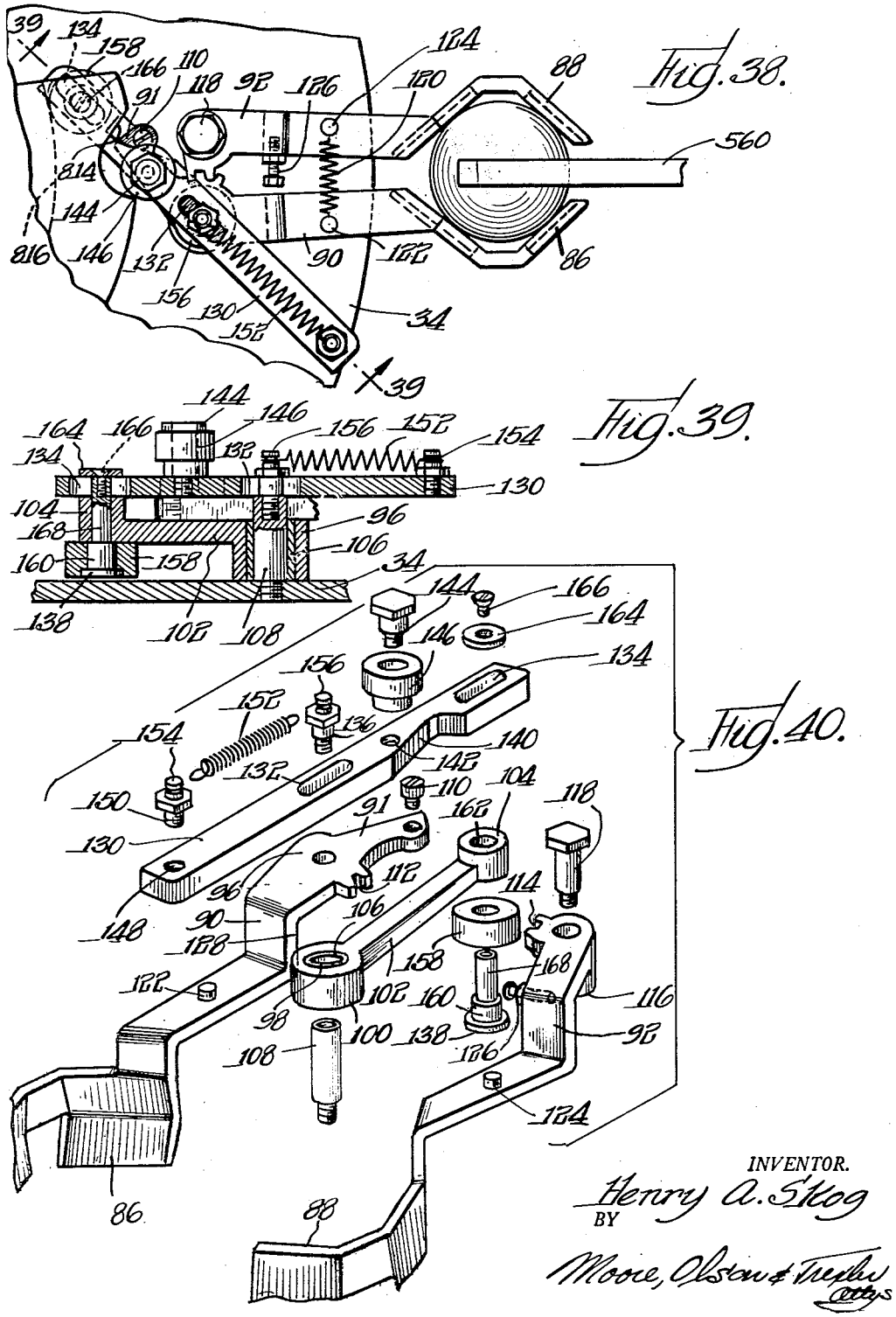

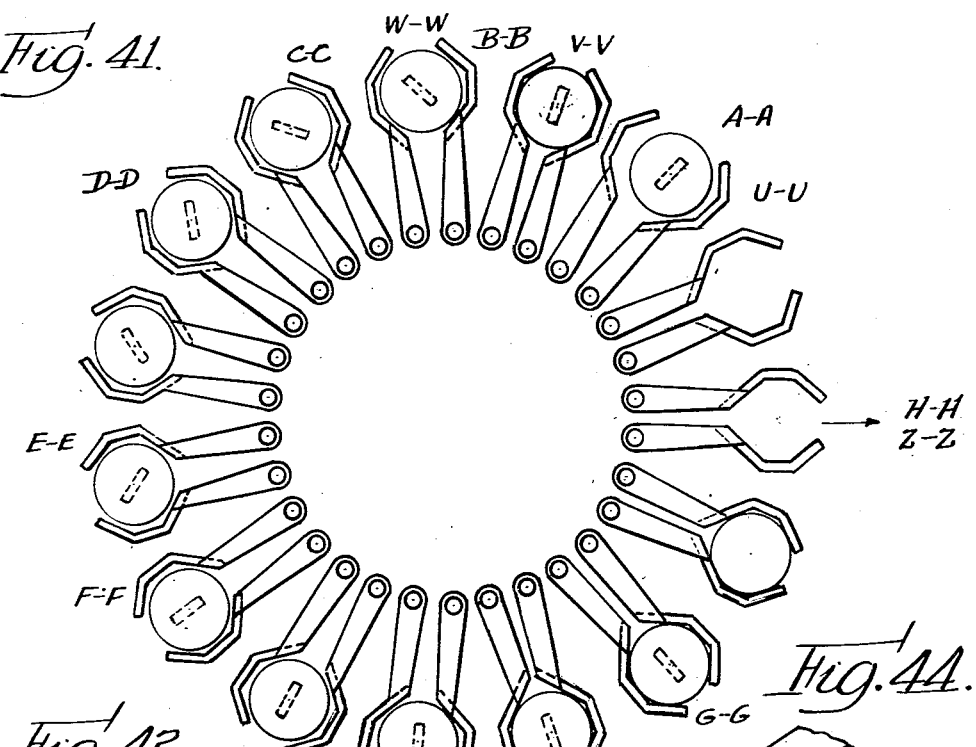
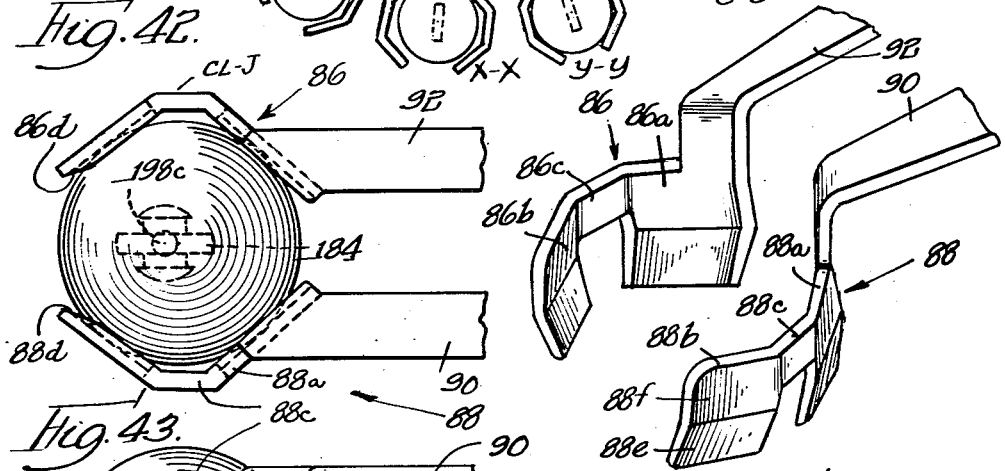
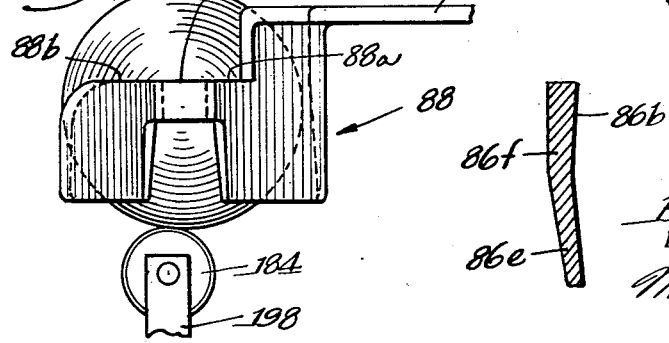

April 16, 1957 H. A. SKOG 2,788,818
PEACH FEEDING, ORIENTING, ASSORTING, TRANSFERRING,
SPLITTING, AND PITTING MACHINE
Filed Dec. 14, 1950 38 Sheets-Sheet 16
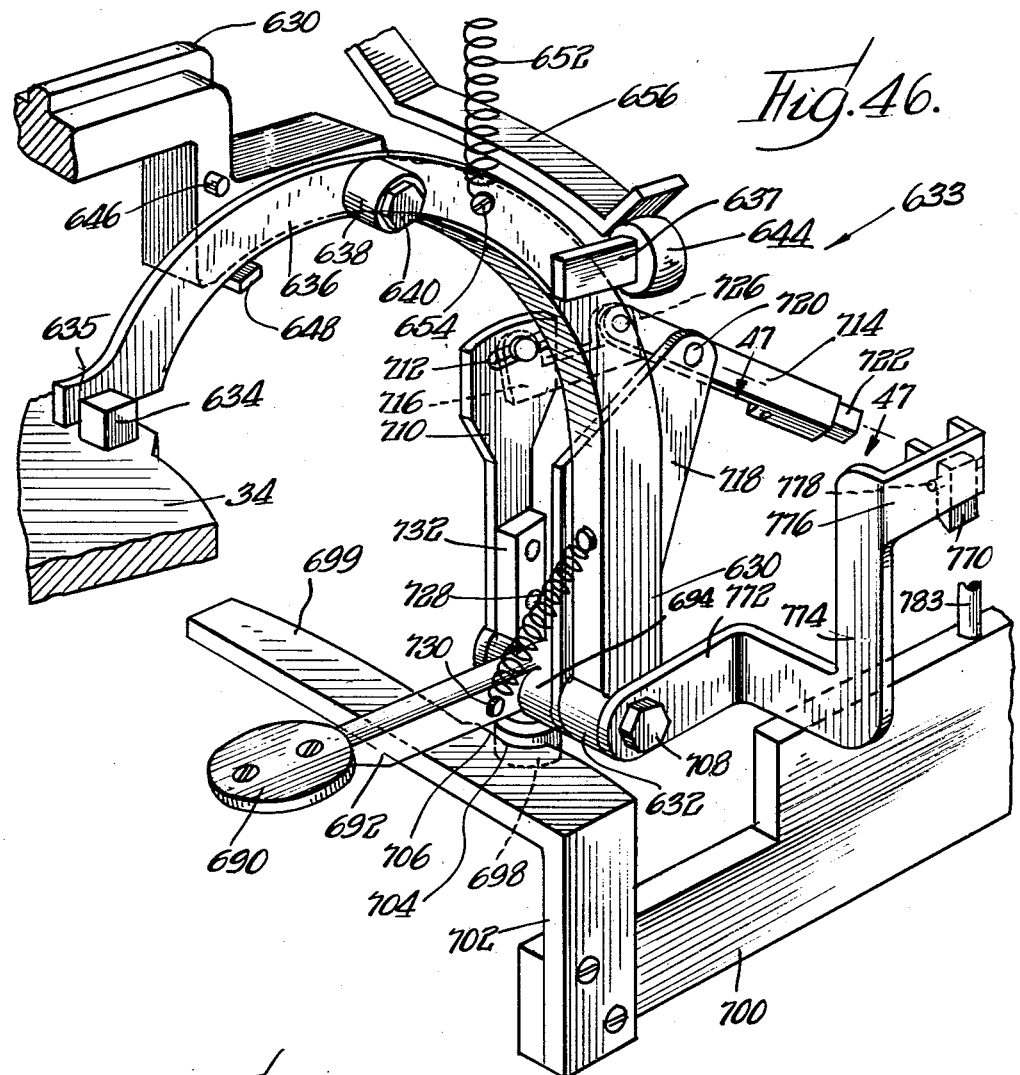
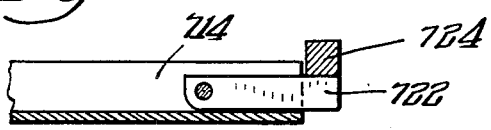
INVENTOR.
Henry A Skog
BY
Moore, Olson & Trexler
attys.

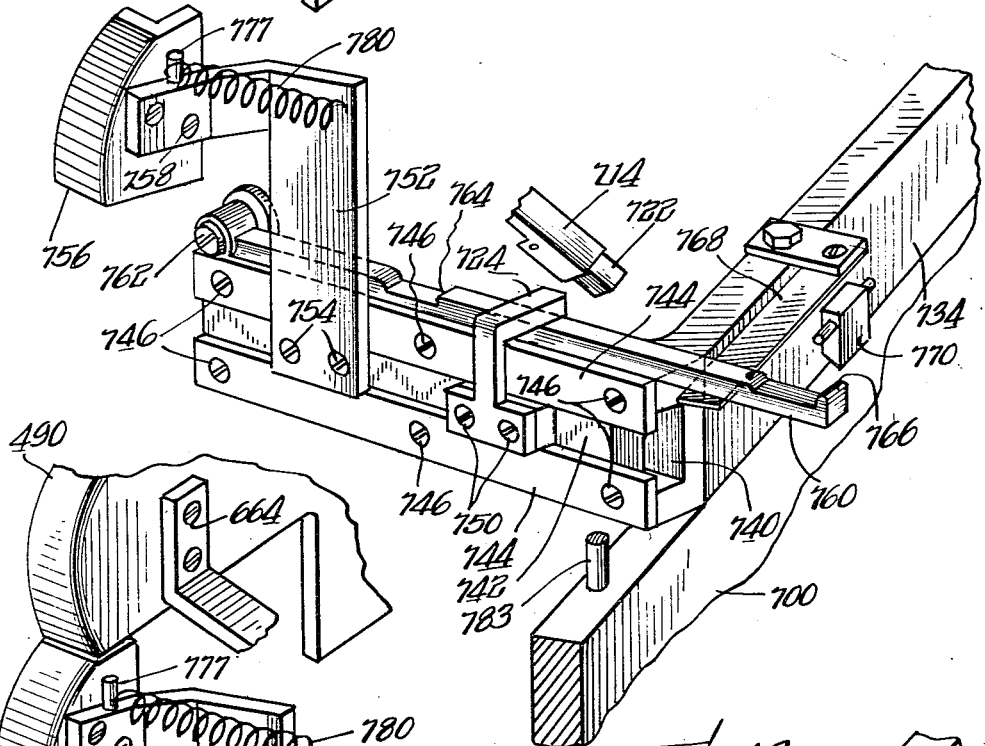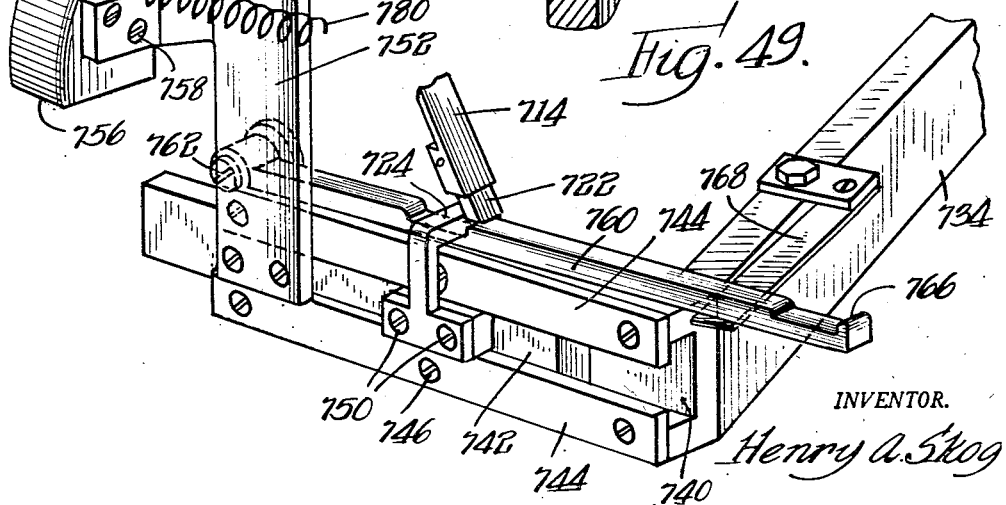

April 16, 1957     H. A. SKOG     2,788,818
PEACH FEEDING, ORIENTING, ASSORTING, TRANSFERRING,
SPLITTING, AND PITTING MACHINE
Filed Dec. 14, 1950     38 Sheets-Sheet 18
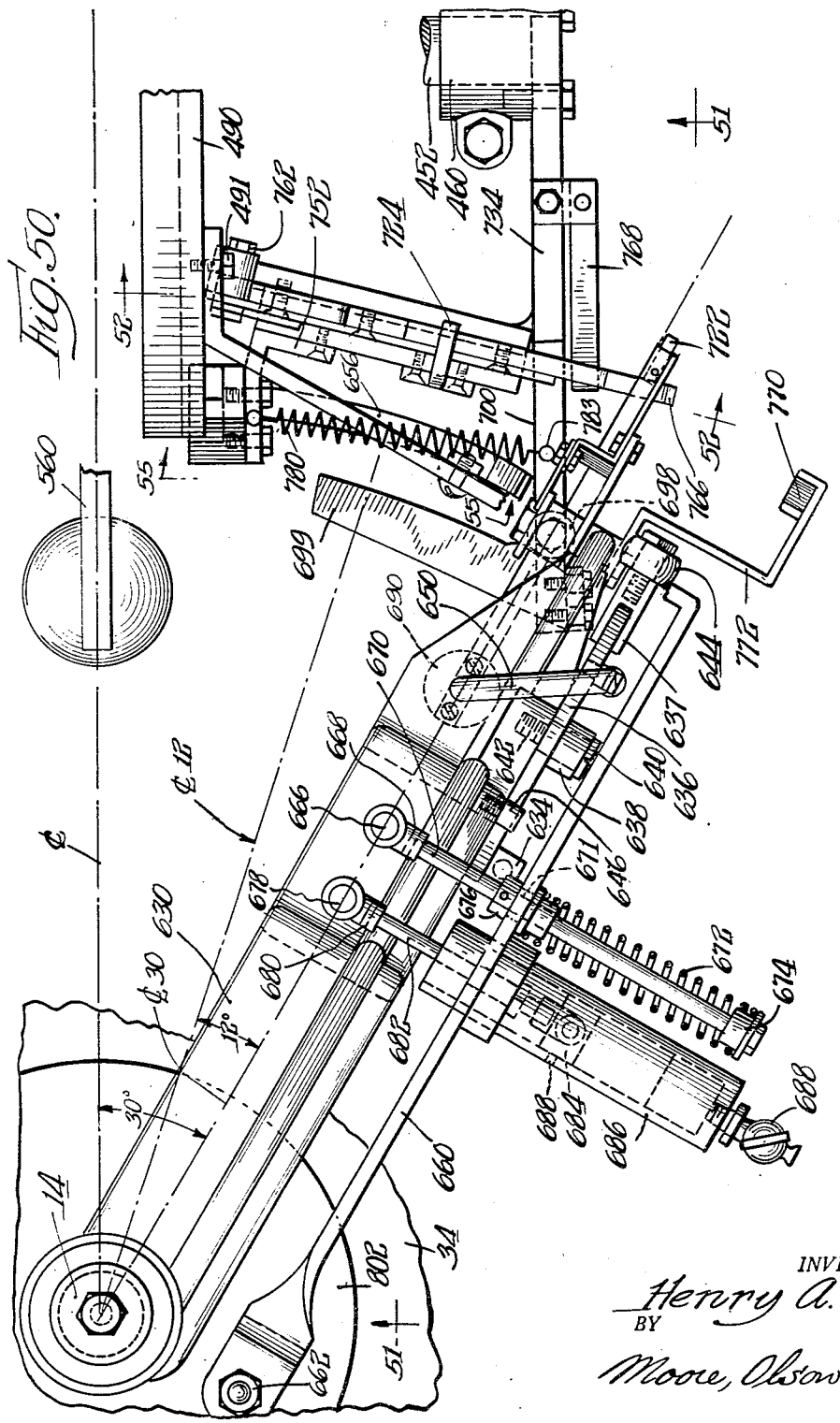
INVENTOR.
Henry A. Skog
BY
Moore, Olson & Trexler
attys.

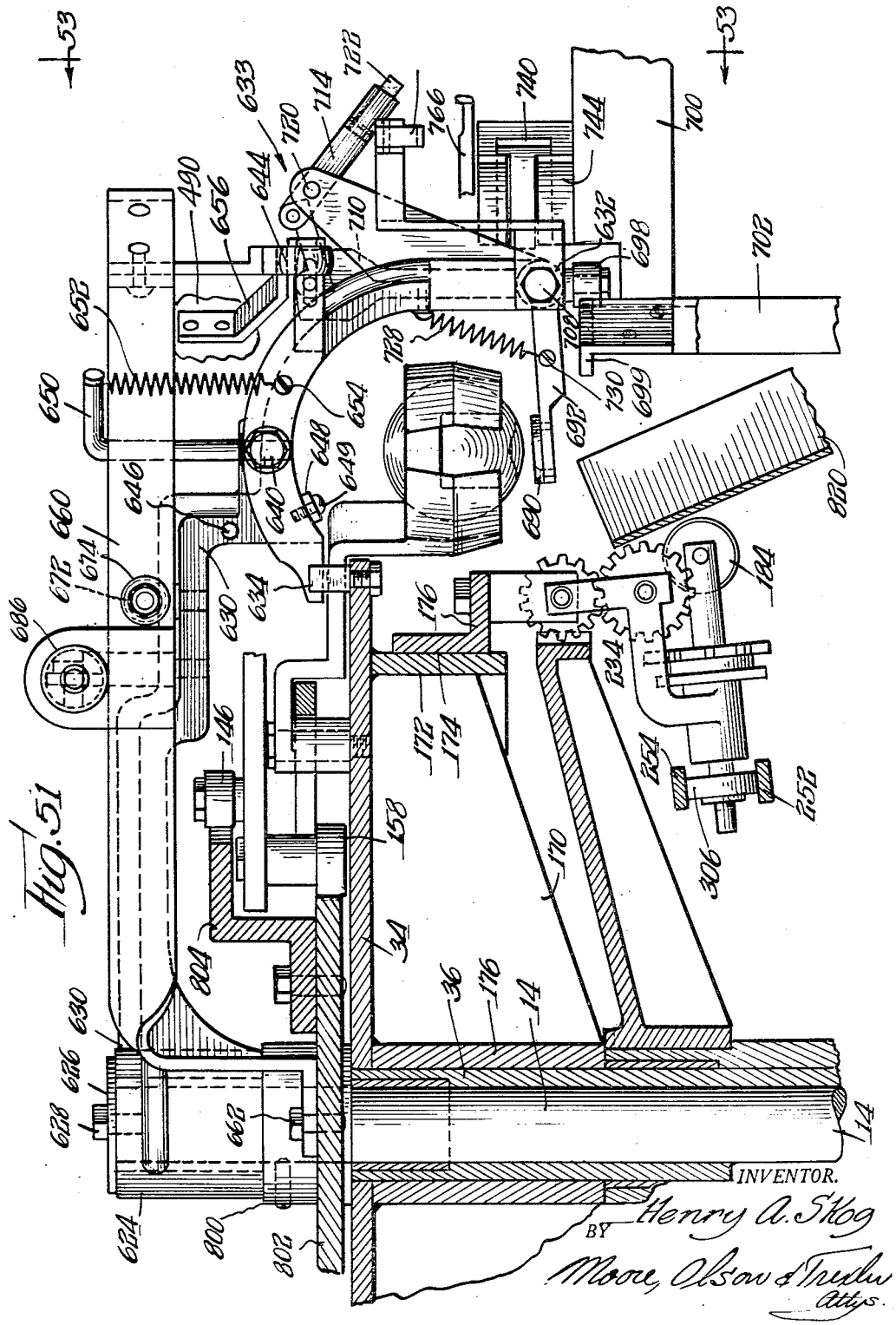

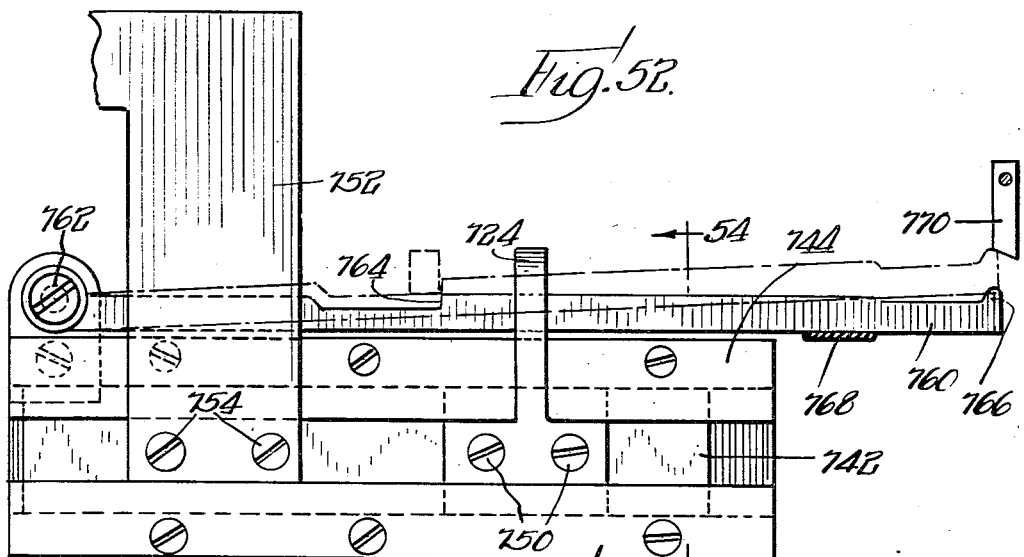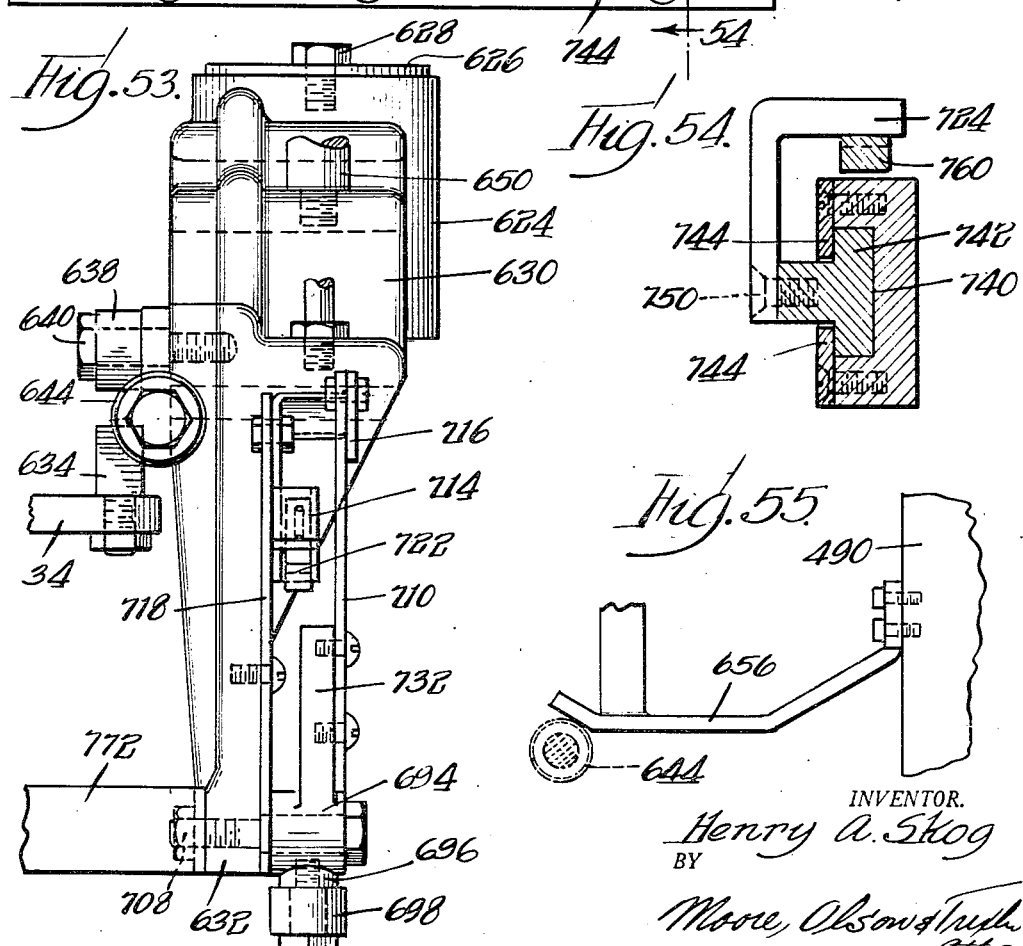

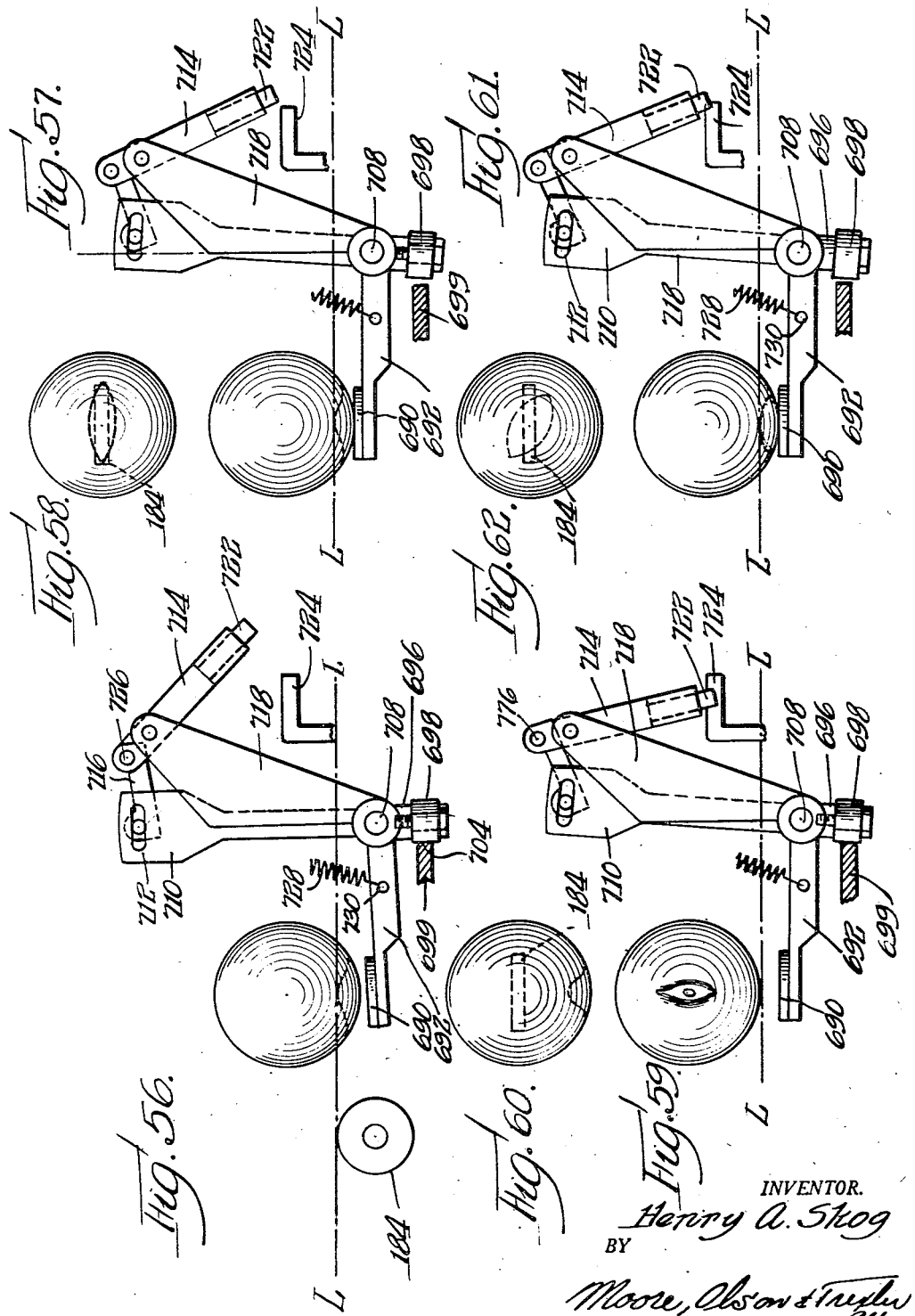

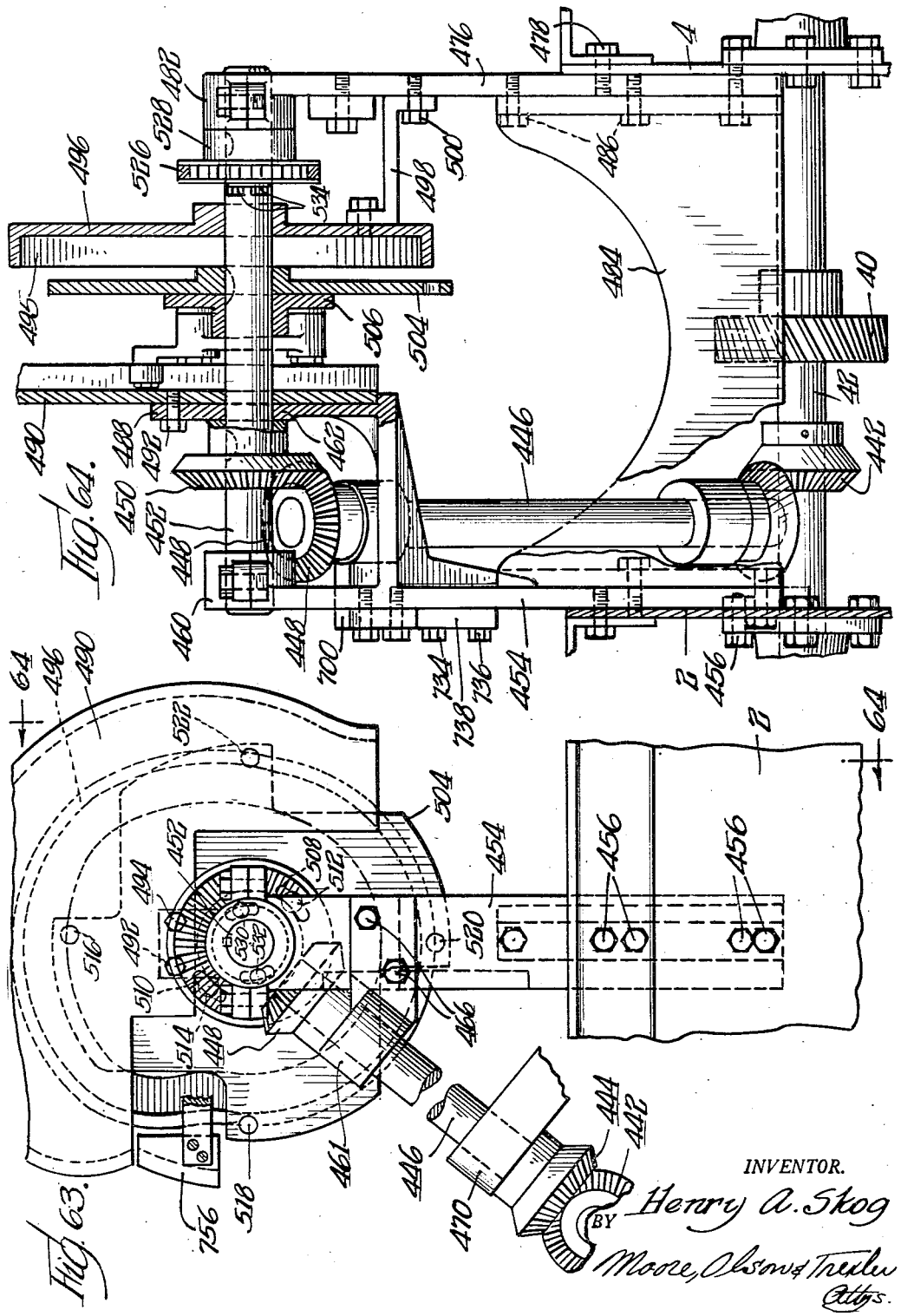

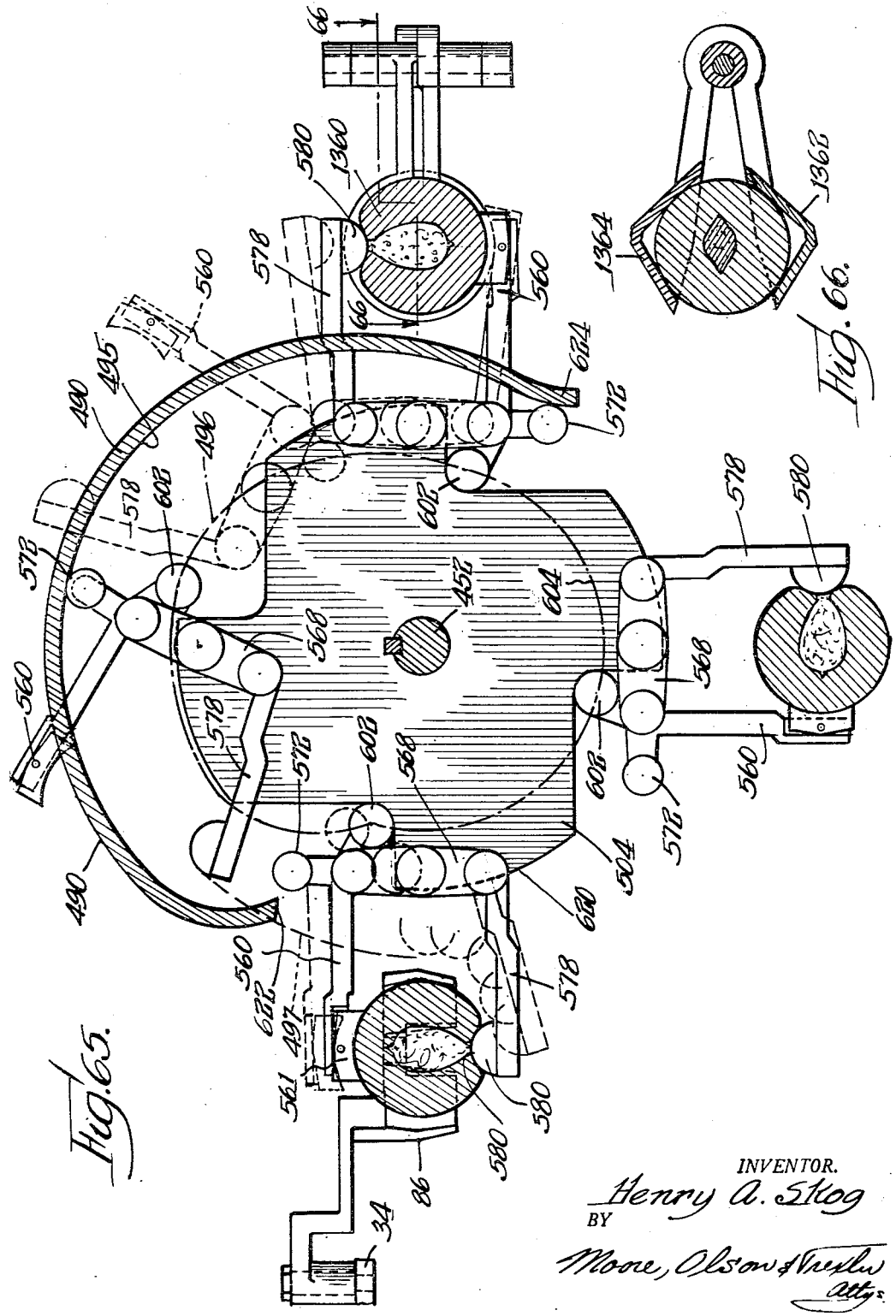

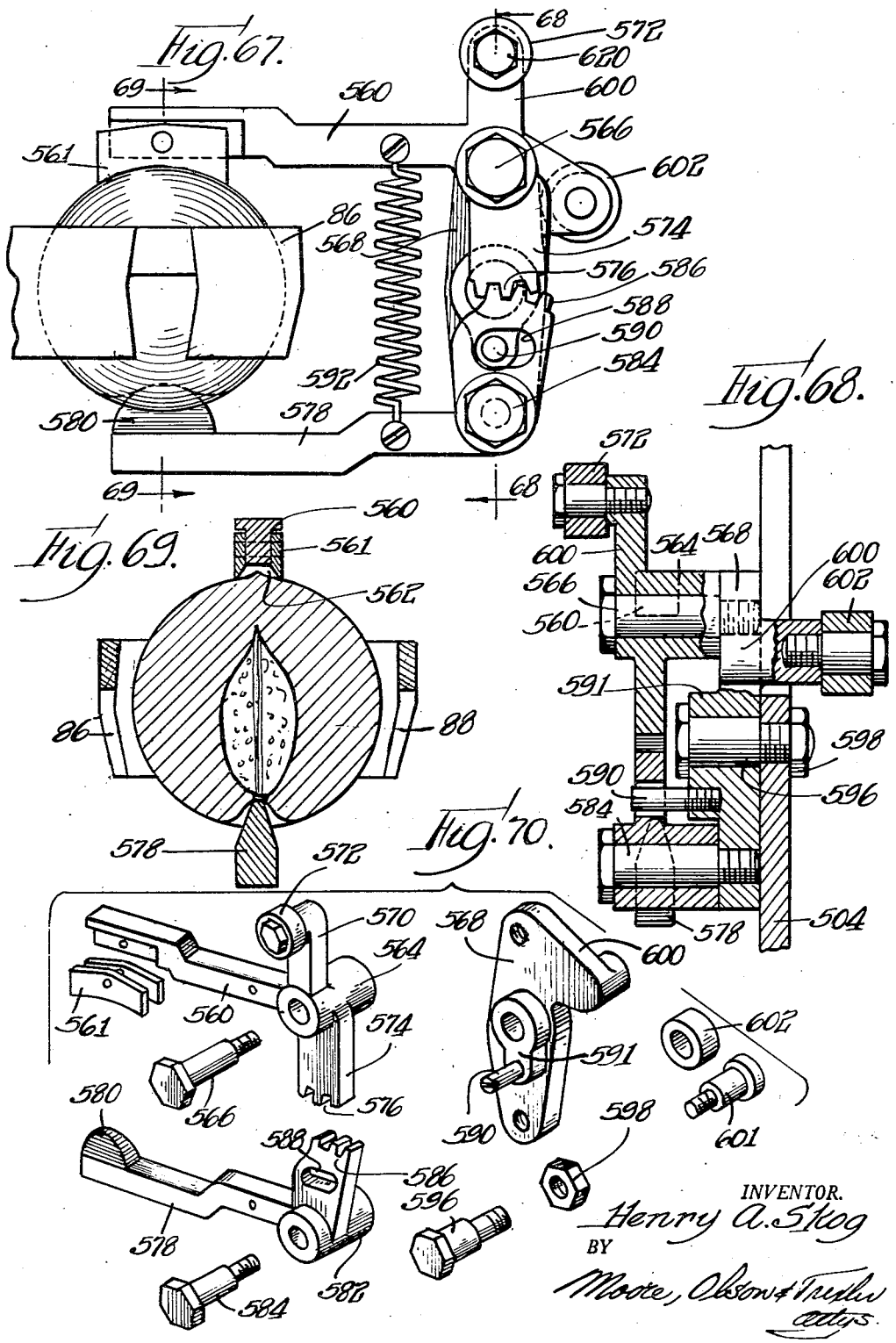

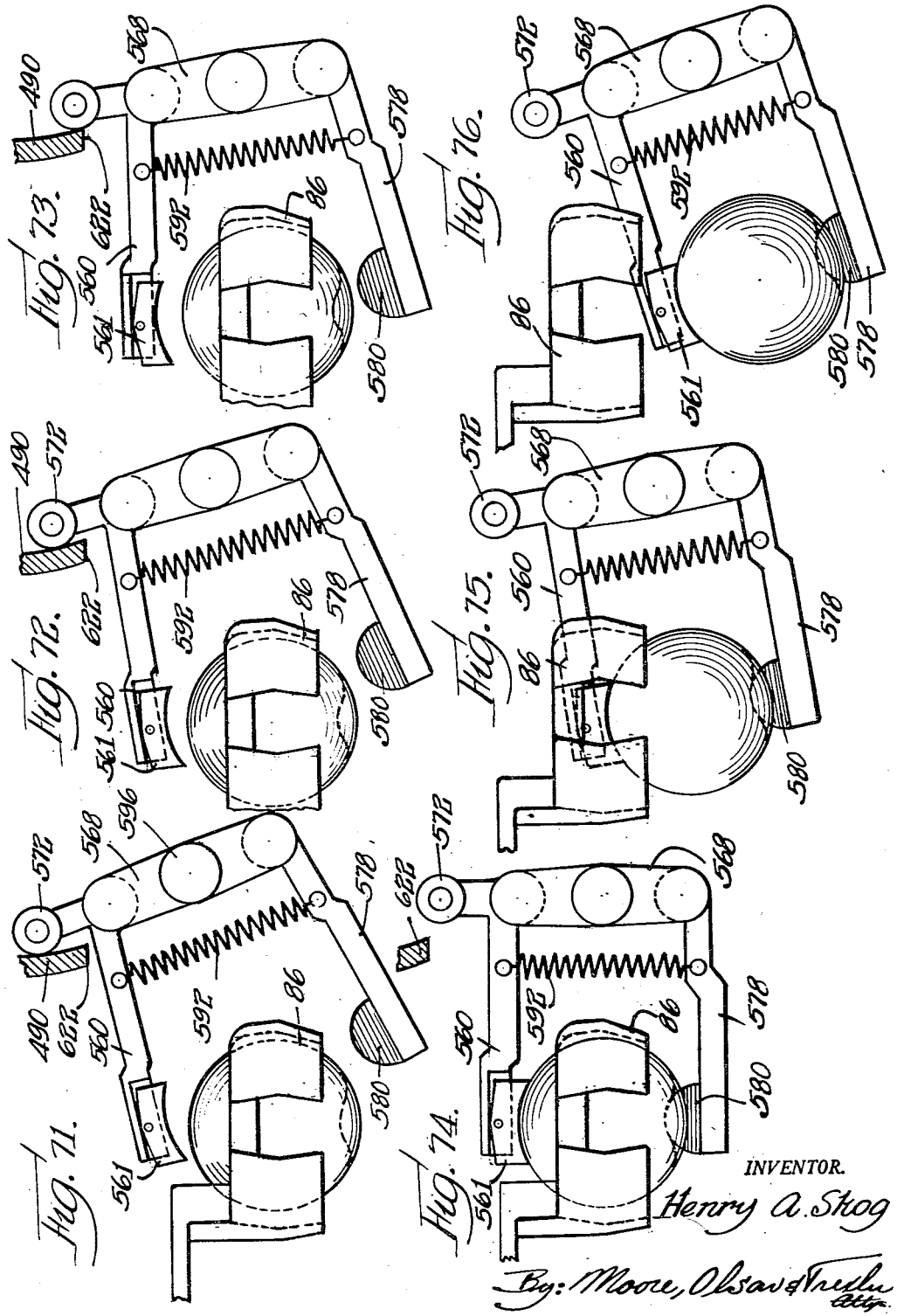

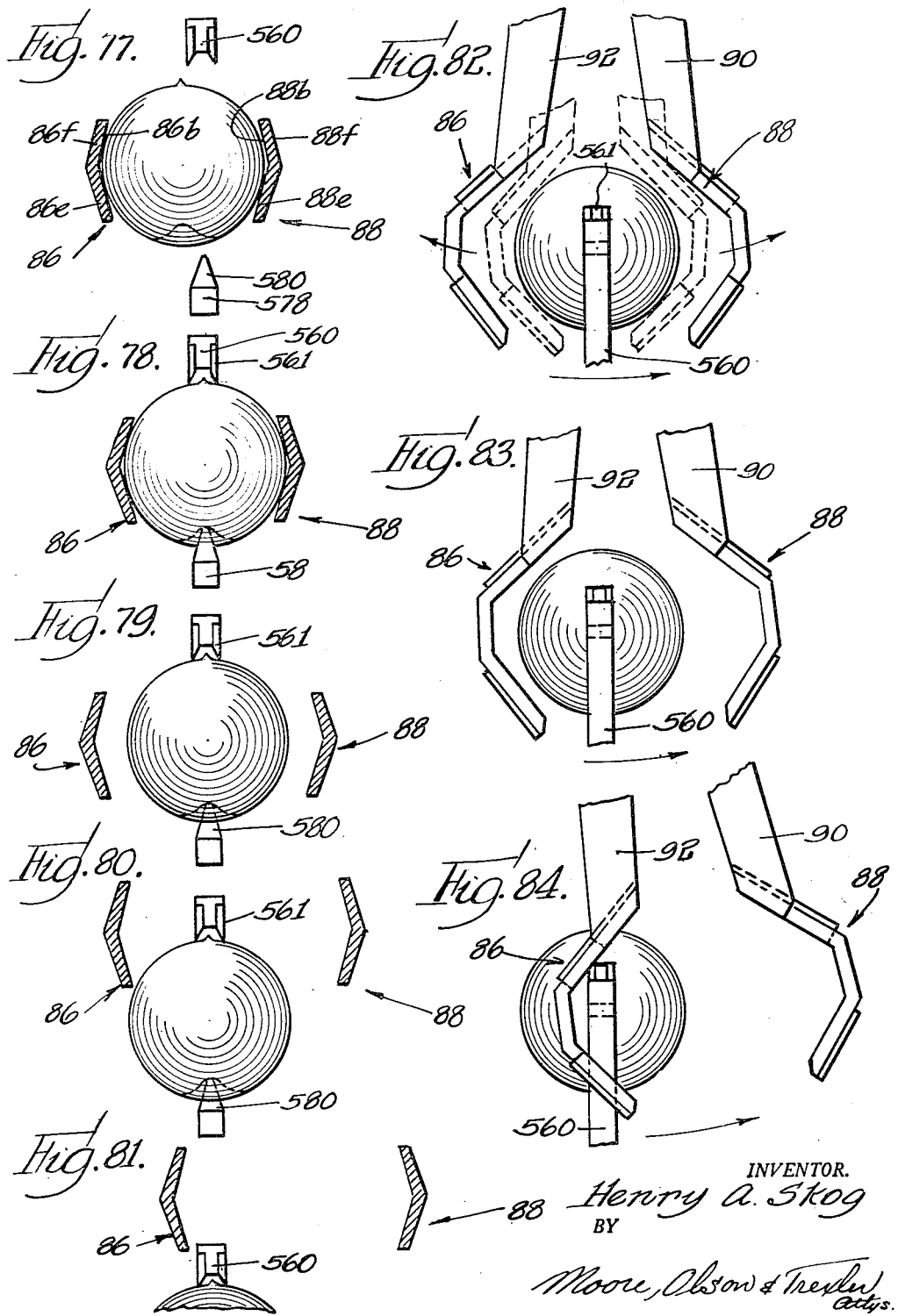

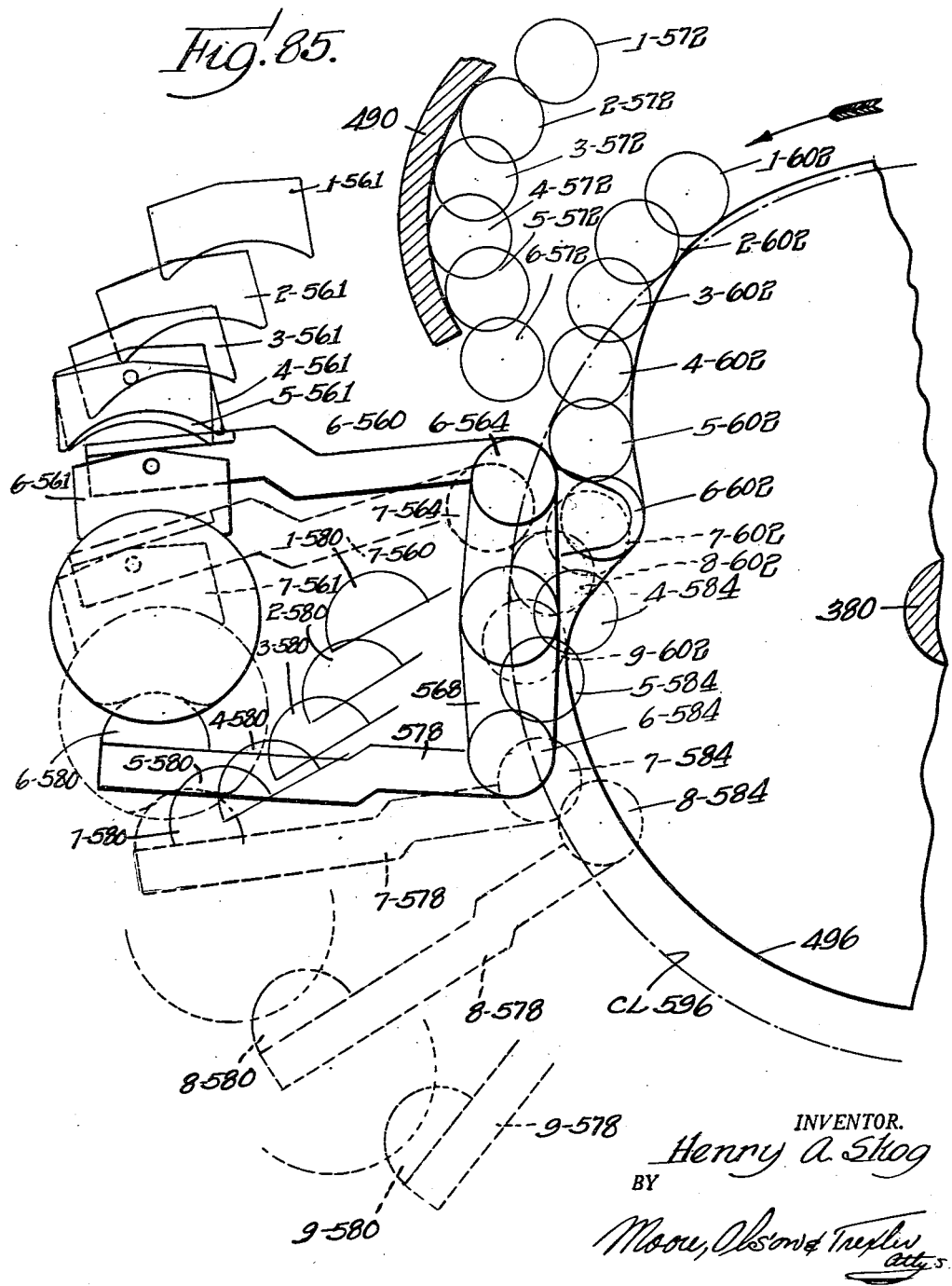

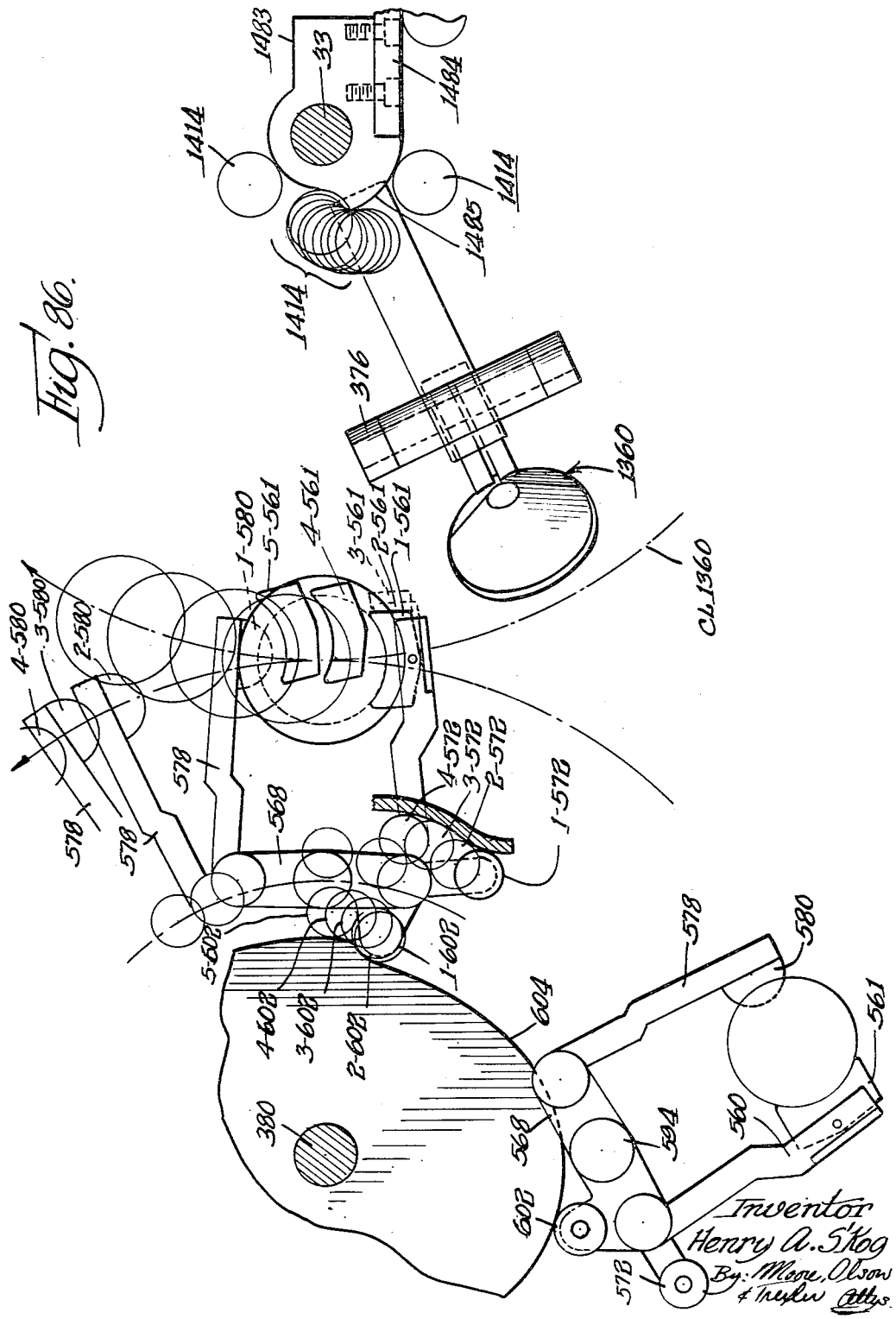

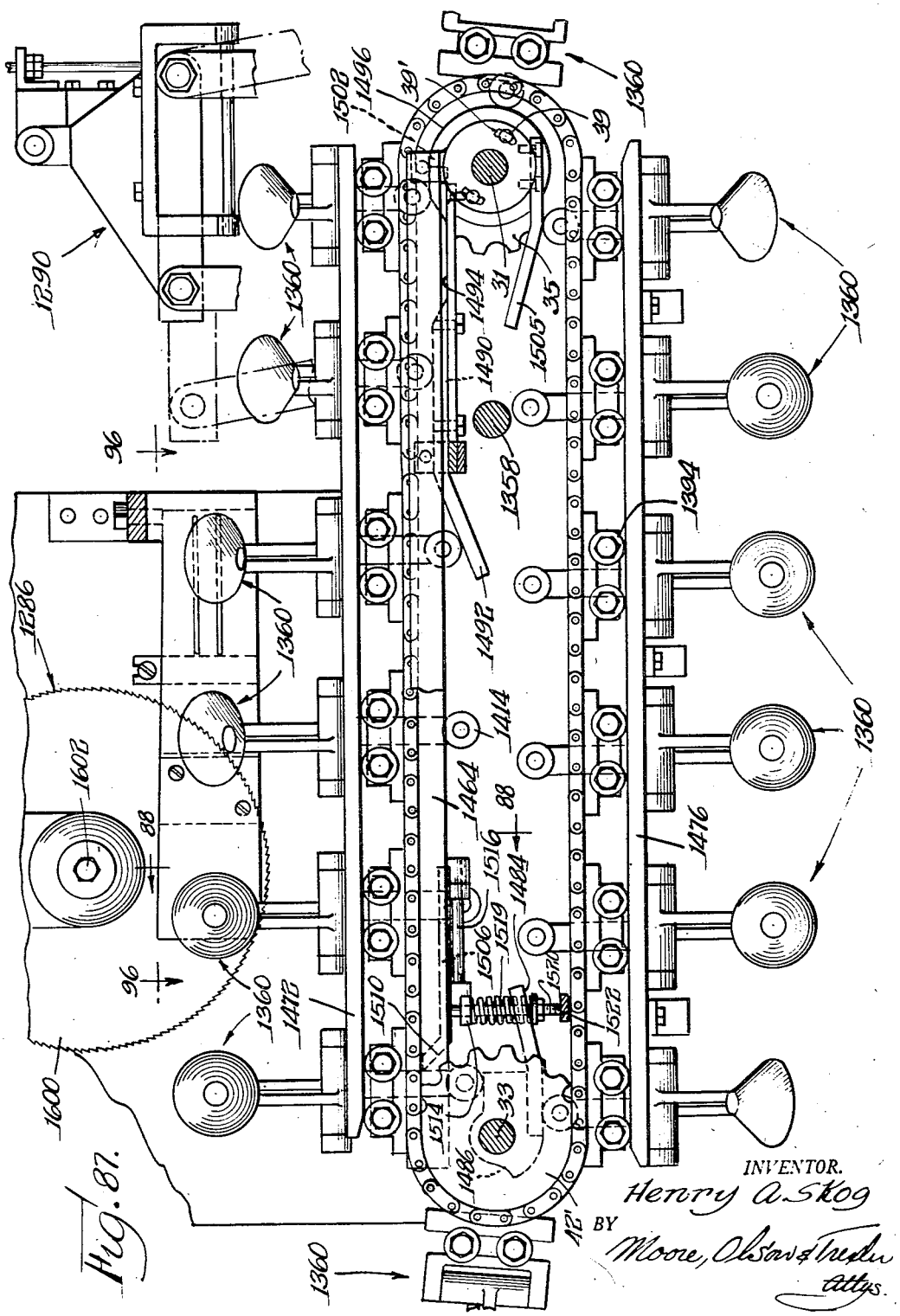

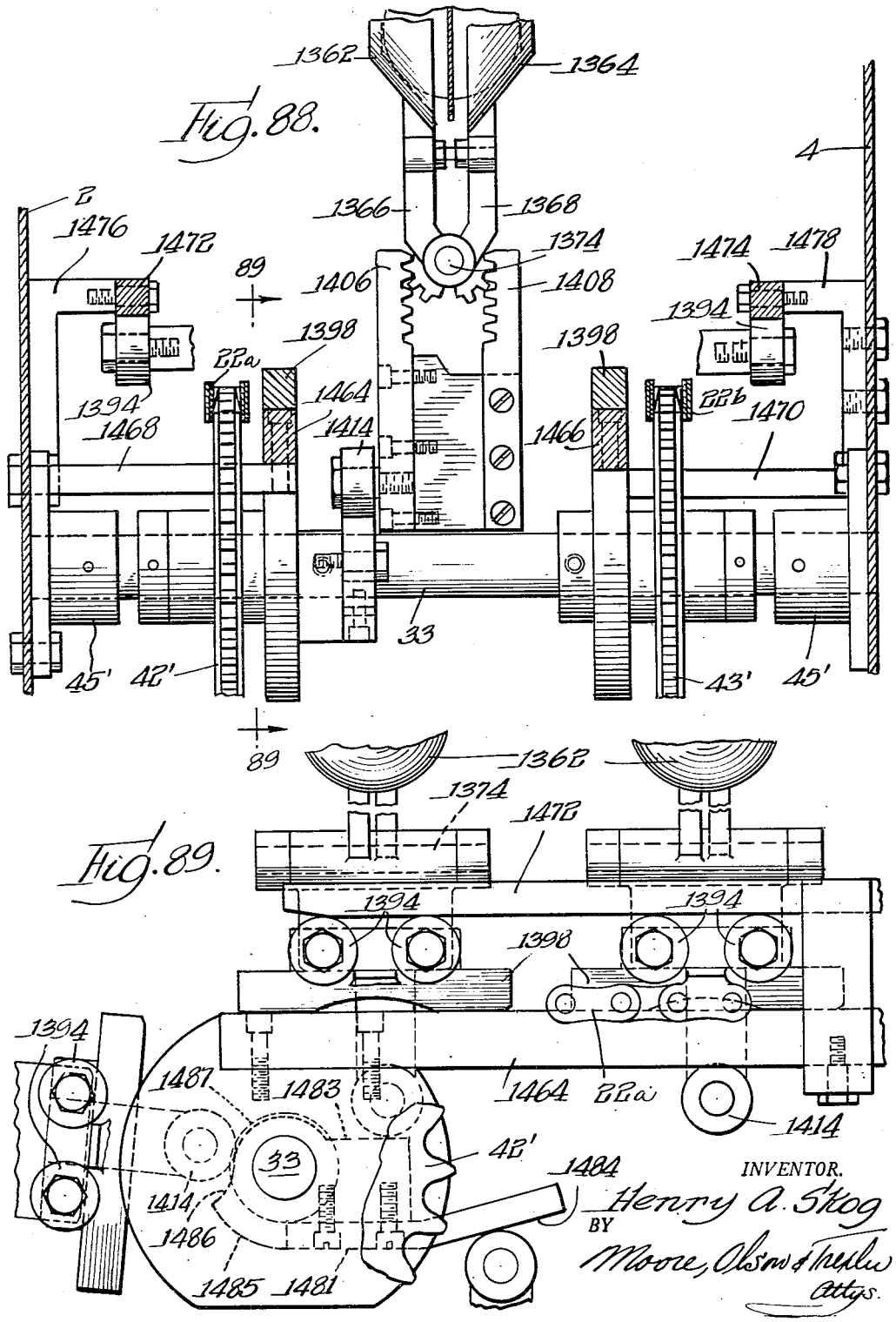

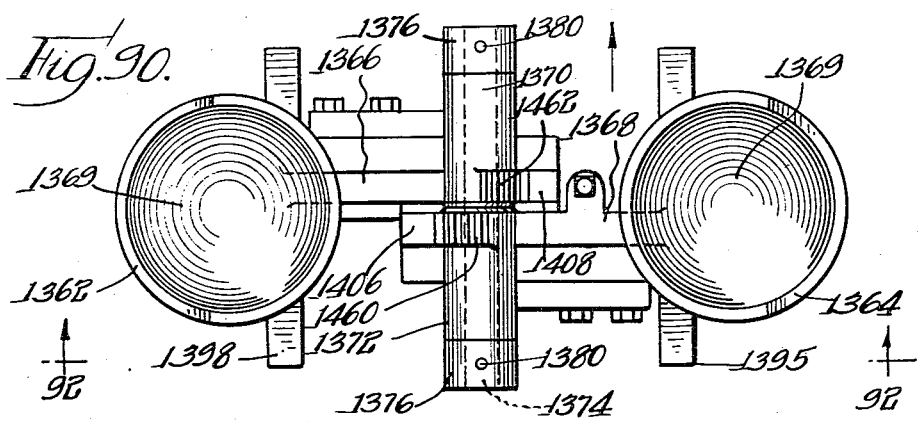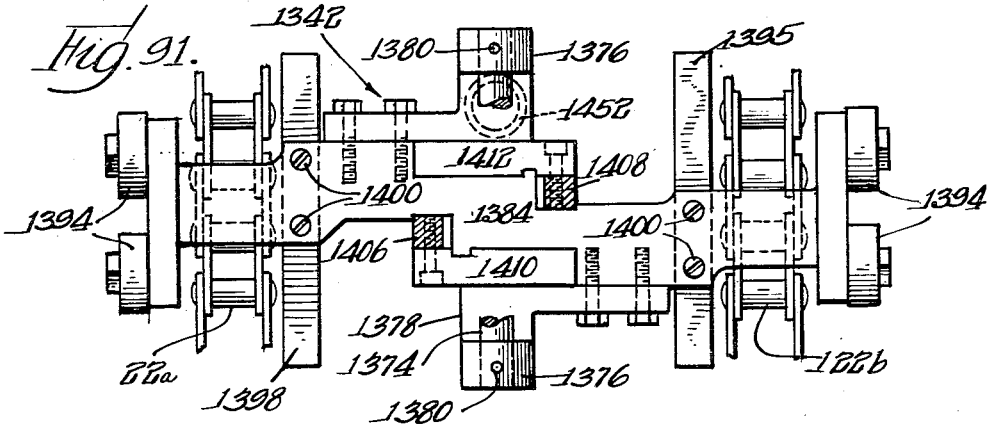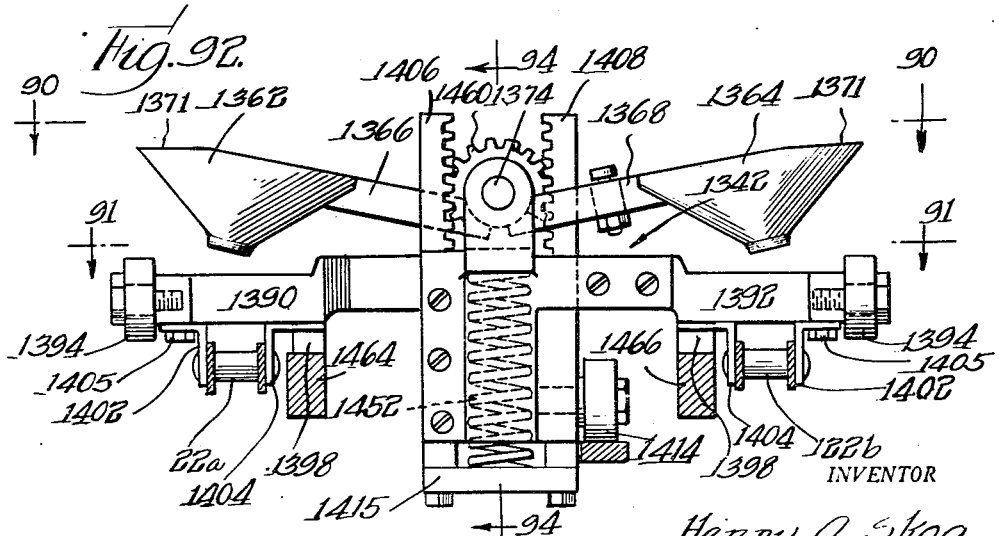

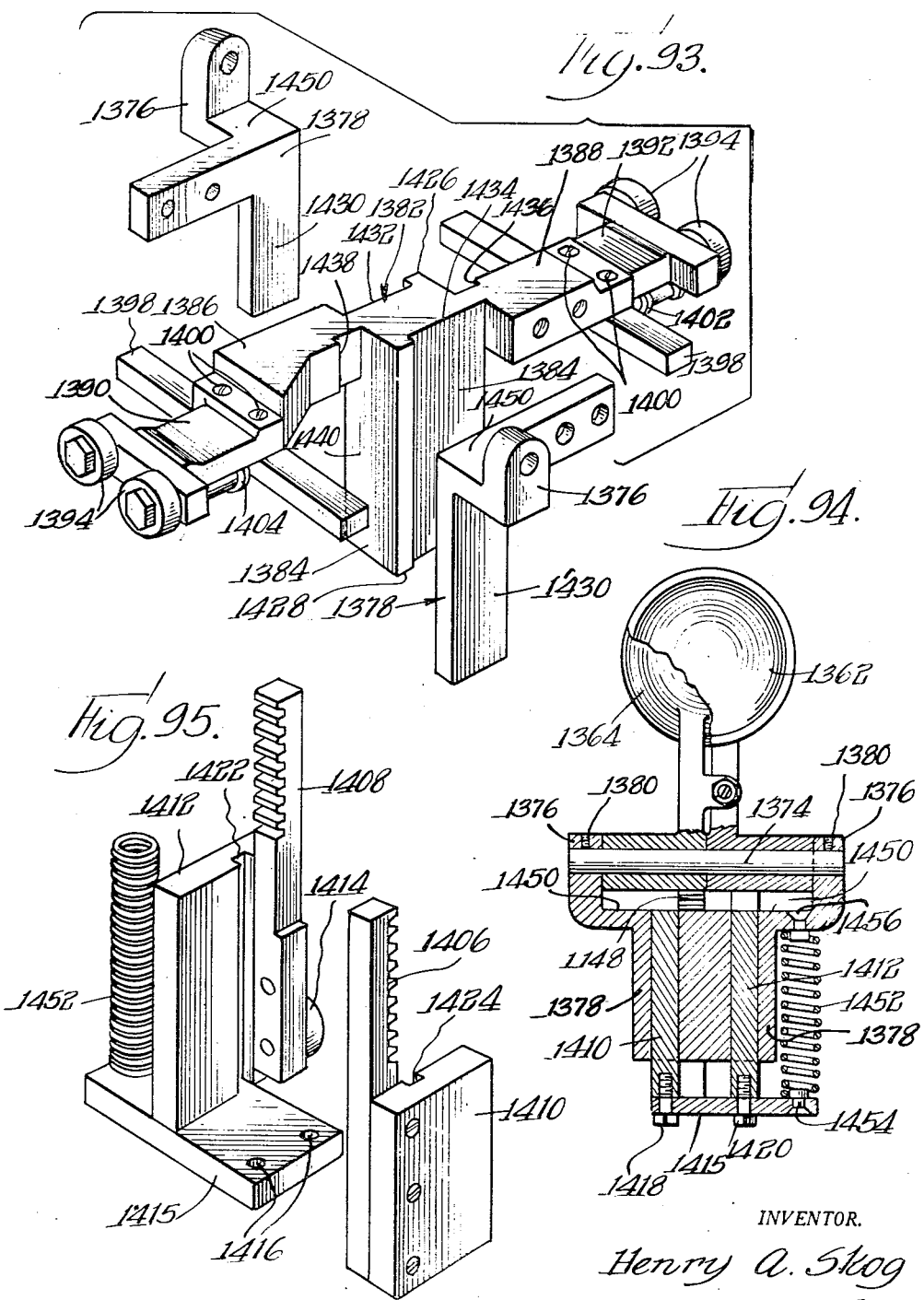

April 16, 1957
H. A. SKOG
2,788,818
PEACH FEEDING, ORIENTING, ASSORTING, TRANSFERRING, SPLITTING, AND PITTING MACHINE
Filed Dec. 14, 1950
38 Sheets-Sheet 33
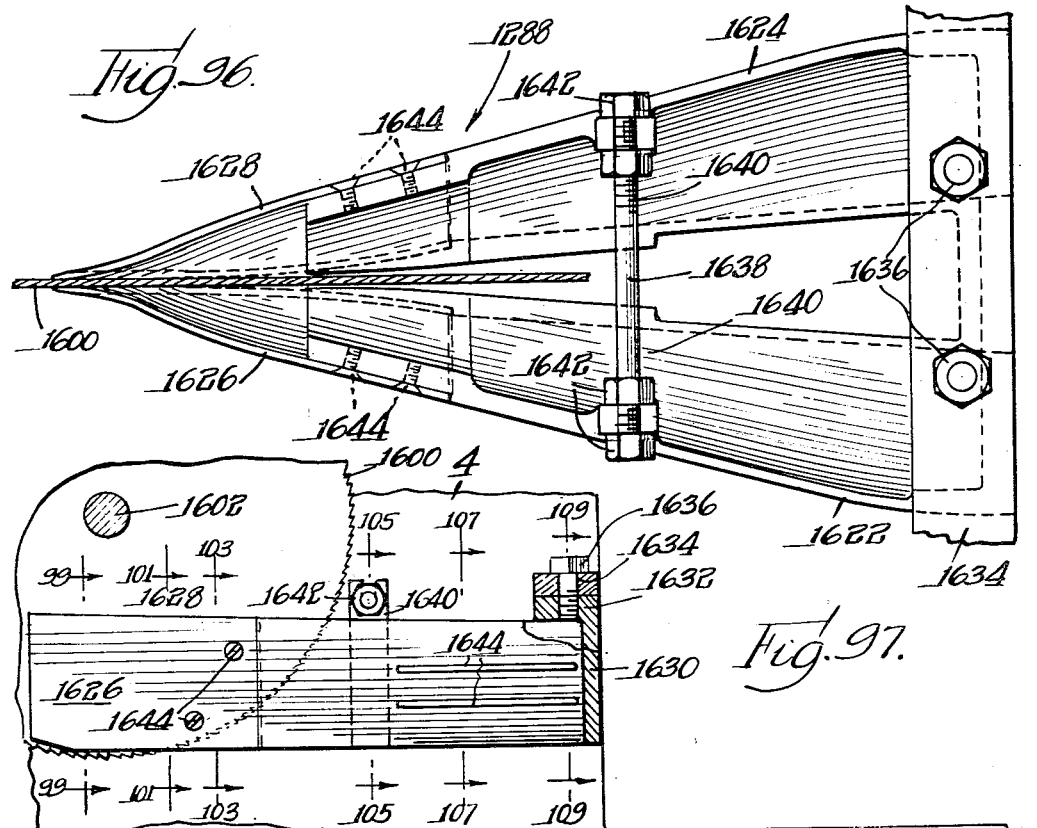
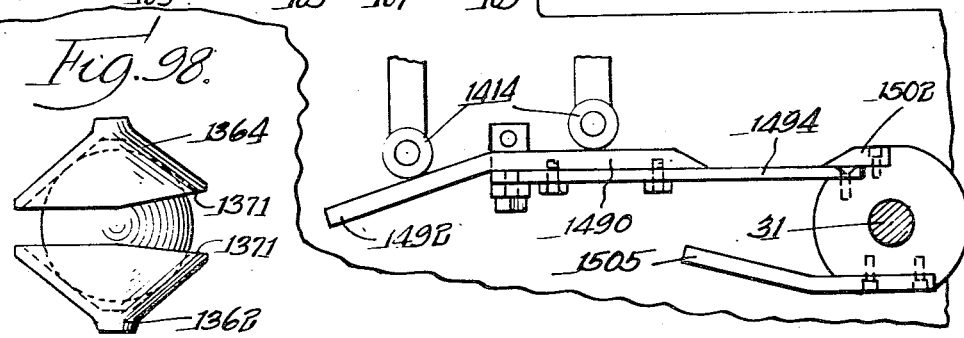
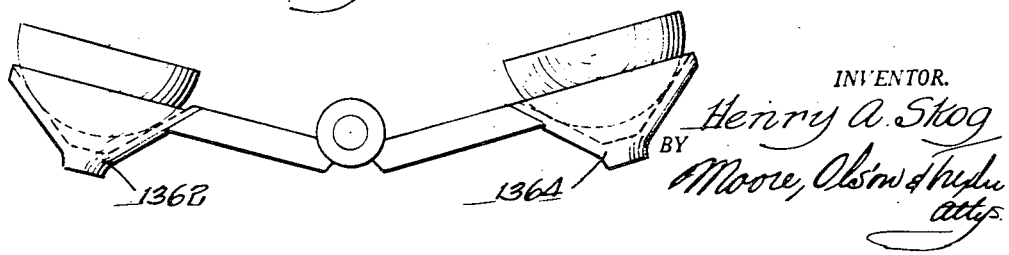
INVENTOR.
Henry A. Skog
BY
Moore, Olson & Hyde
attys.

April 16, 1957
H. A. SKOG
2,788,818
PEACH FEEDING, ORIENTING, ASSORTING, TRANSFERRING,
SPLITTING, AND PITTING MACHINE
Filed Dec. 14, 1950
38 Sheets-Sheet 34
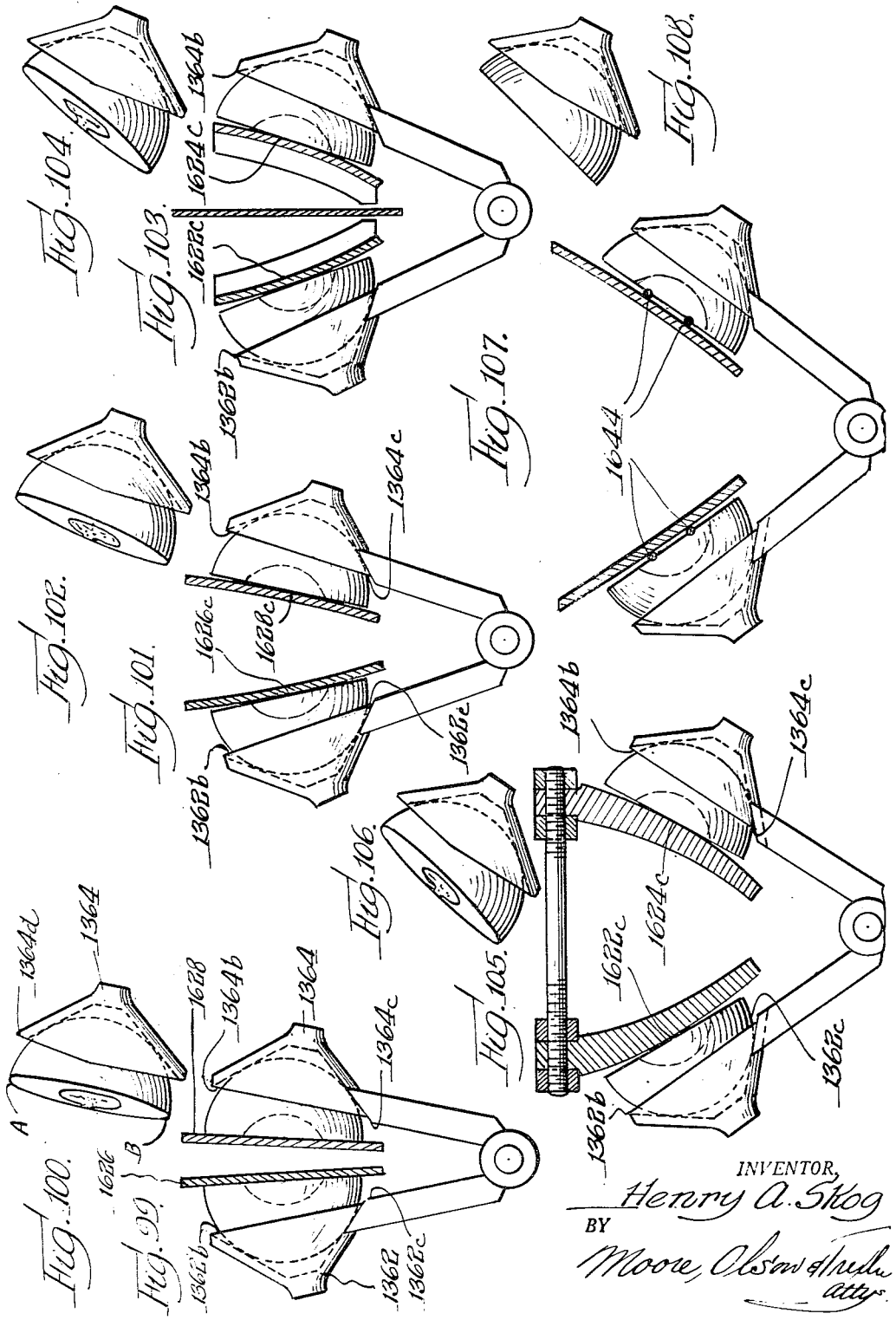
INVENTOR,
Henry A. Skog
BY
Moore, Olson & Trube
attys

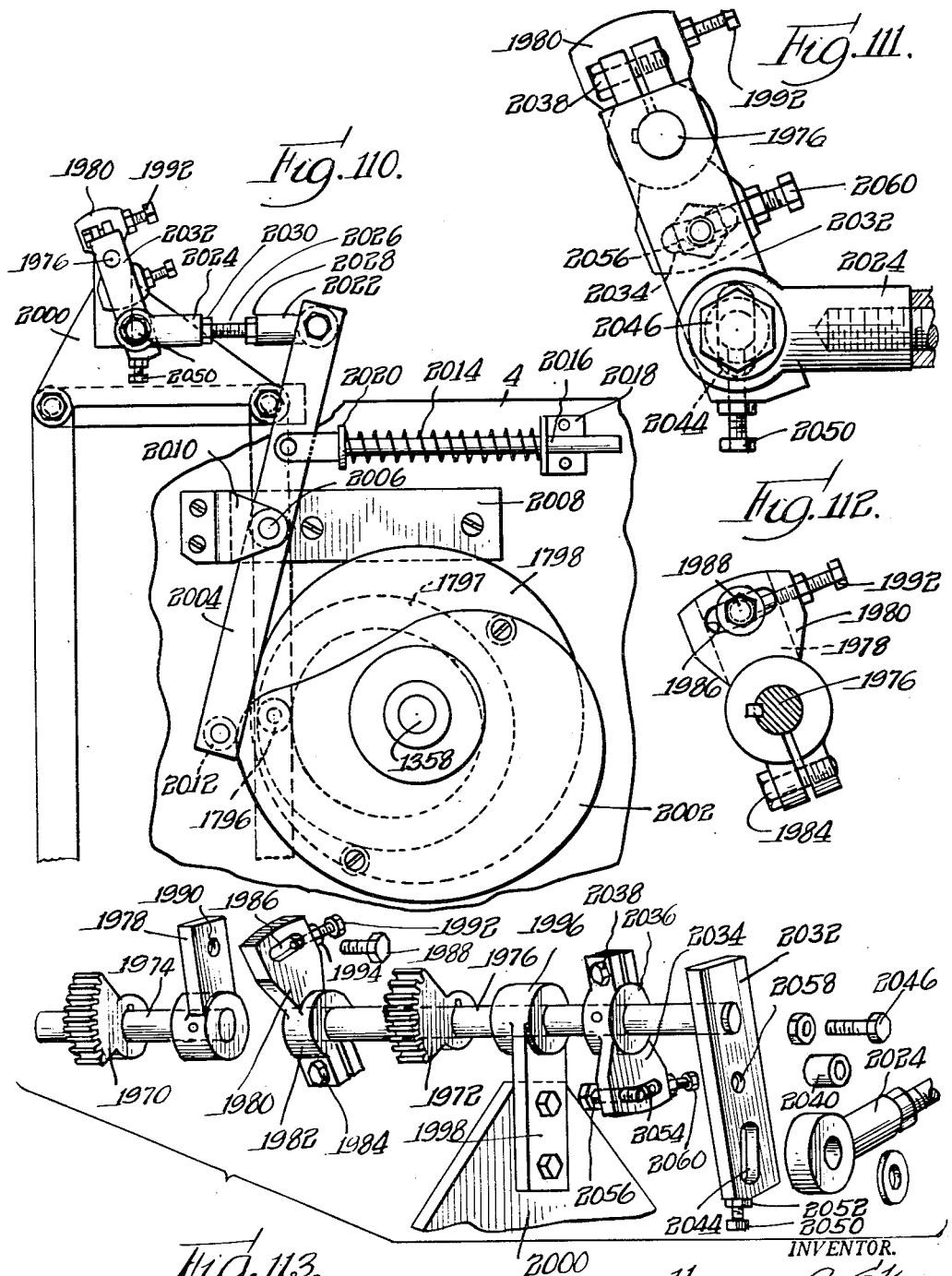

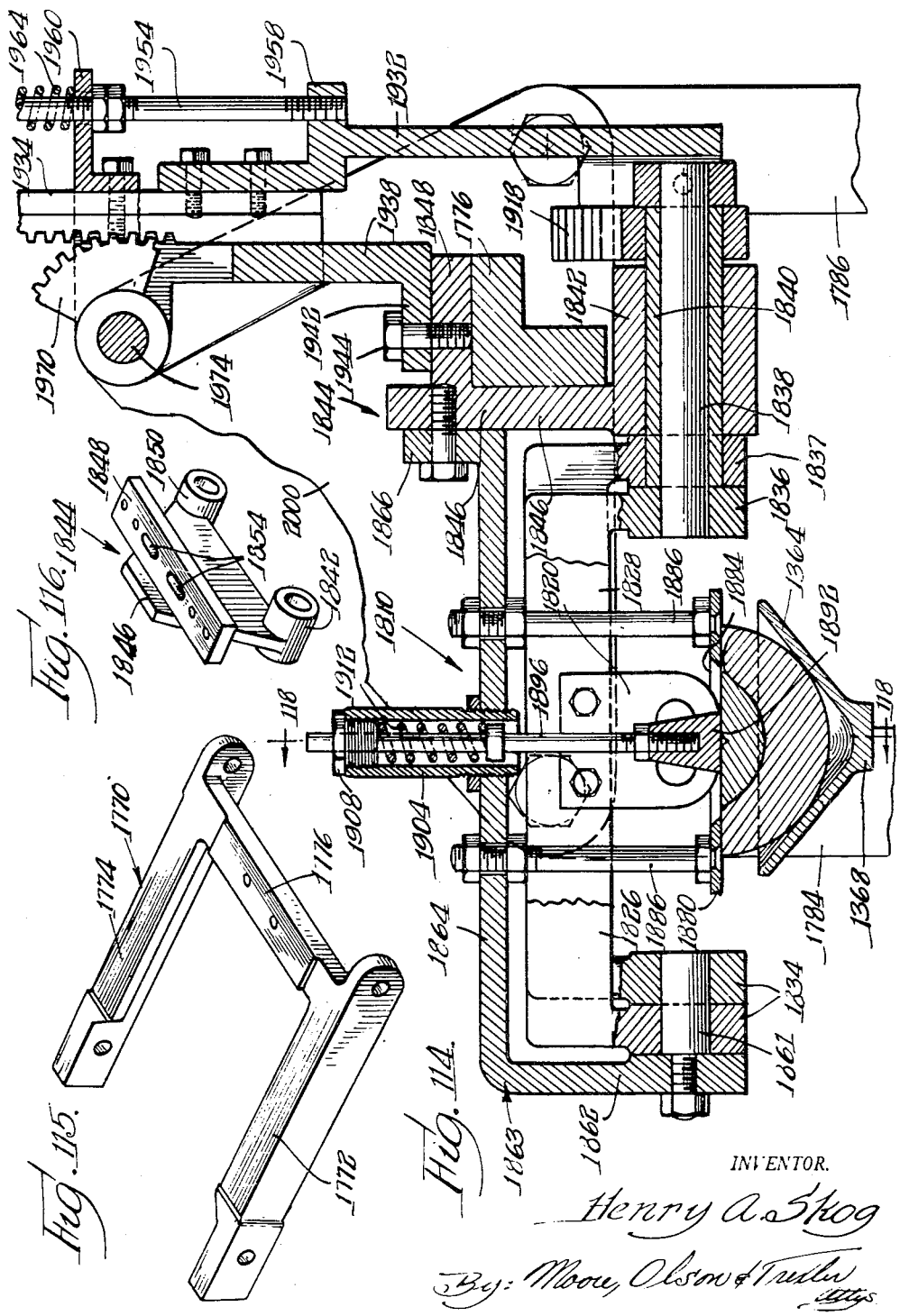

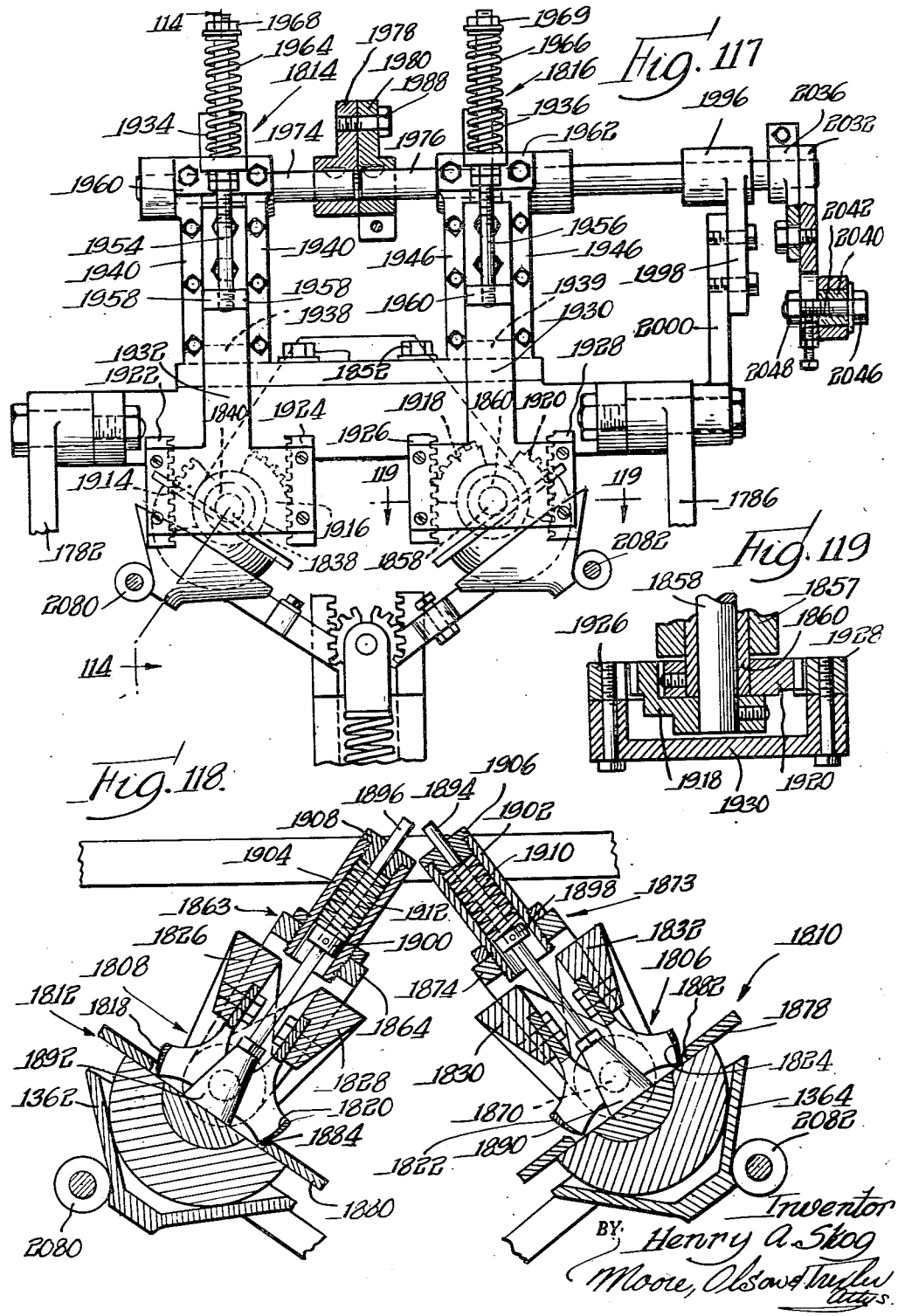

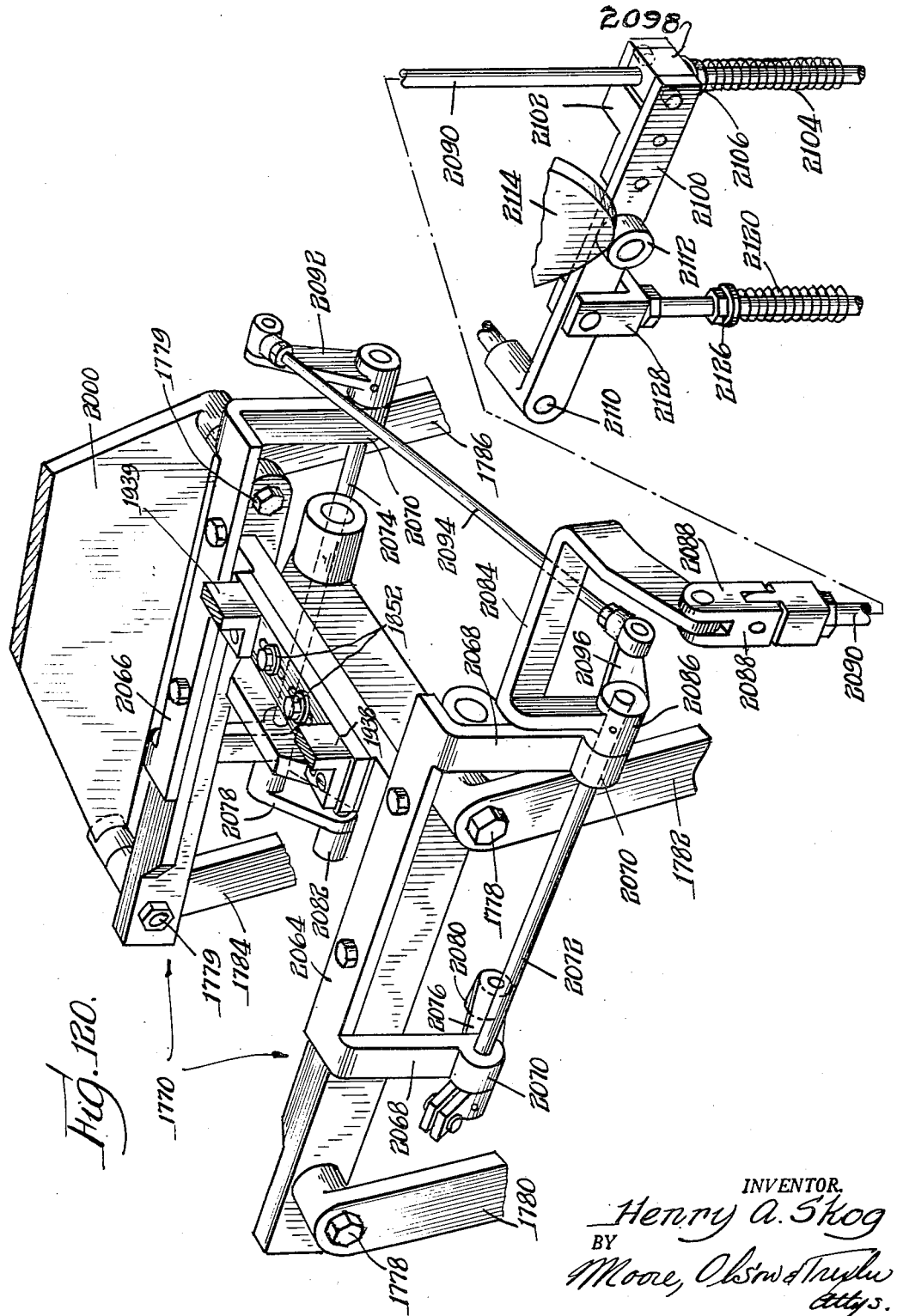

United States Patent Office 2,788,818
Patented Apr. 16, 1957

2,788,818

PEACH FEEDING, ORIENTING, ASSORTING, TRANSFERRING, SPLITTING, AND PITTING MACHINE

Henry A. Skog, Olympia, Wash., assignor to Special Equipment Company, Portland, Oreg., a corporation of Oregon Application December 14, 1950, Serial No. 200,705

44 Claims. (Cl. 146—28)

This invention relates to a method and apparatus for processing peaches and similar fruit.

The invention contemplates the automatic, uninterrupted and continuous movement of whole fruit from a heterogeneous mass in spaced apart continuously moving relation. During their uninterrupted movement the whole fruit as it moves is subjected to suture plane orientation operations, and then, without interrupting its motion, is inspected to determine whether or not the fruit has become oriented as to suture plane by such operations. If not properly oriented it is then discharged from the machine, but if properly oriented, it is fed to continuously moving transfer mechanism constructed and arranged to feed the thus properly oriented whole fruit, while maintaining the fruit in properly oriented position, to continuously moving fruit conveying mechanism adapted to carry the whole fruit past mechanism which divides the whole fruit substantially along the suture plane and thereafter continuously, and without interruption, feeds each half fruit past a travelling pitting mechanism that pits the halves simultaneously, the fruit halves being thereafter discharged from the machine.

Among the objects of the present invention are to provide continuously moving mechanisms operable to segregate single peaches or the like from a heterogeneous mass of peaches and to feed the peaches in spaced relation to a continuously moving orienting mechanism; to provide an improved mechanism for individually orienting peaches of a succession of continuously moving peaches by rotating each peach about its own axis in such manner as to cause the suture plane of the peach quickly to be positioned in a predetermined direction, and to provide inspecting means for inspecting each peach as to suture orientation without interrupting its continuous feeding movement through the machine.

Another object of the invention resides in providing in association with the hereinbefore described orienting mechanism and inspecting mechanism, additional mechanism operative, upon the inspection of each peach, to discharge a peach from the machine if not properly so oriented and to pass a properly oriented peach or the like to transfer and conveying mechanisms which continue the uninterrupted movement of the peach to peach processing mechanisms which operate properly only if the suture of the peach be properly positioned.

Other objects of the invention are to provide new or improved means for holding or confining the whole fruit on fruit rotating and orienting wheels for permitting substantially free rotation of the fruit upon the rotation of said wheels; to provide in a fruit orienting mechanism fruit holding or confining means which are movable between open and closed positions different amounts, depending upon the sizes of the fruit, to provide a uniform amount of clearance between the holding or confining means and the fruit when the fruit is engaged by a fruit rotating member or wheel; to provide in an orienting machine or mechanism new or improved fruit holding means or clamps for centralizing the fruit on the orienting member or wheel and then to straighten the fruit after it has been oriented as to stem indent or suture plane, so that the stem axis extends vertically, or the suture plane coincides with the plane of the orienting member or wheel; to provide new or improved fruit holding means or clamps for holding or clamping the fruit in oriented position on withdrawal of the orienting member or wheel; to provide new or improved means for feeding to an orienting machine or mechanism a surplus of whole fruit so that the orienting machine or mechanism may operate at all times at substantially full capacity, and to provide in connection with such feeding means, means for withdrawing from the orienting machine or mechanism fruit which may be surplus in amount; to provide means for feeding whole fruit from a fruit receiving hopper in a single row stream to a continuously moving fruit conveyor and orienting machine or mechanism at a rate to feed one whole fruit to each fruit receiving and orienting unit of the continuously moving conveyor and orienting machine or mechanism; to provide orientation inspecting means capable of sensing or determining the orientation of fruit without interrupting the movement, or feeding, of the fruit at a continuously uniform rate; to provide high speed means for inspecting fruit as to orientation; to provide means for inspecting fruit as to orientation without penetrating or entering the stem indent of the fruit; to provide fruit orientation or inspecting means capable of determining the orientation of fruit by measuring or determining the distance between the surface of the fruit and a predetermined reference plane; to provide new or improved means for controlling the withdrawal of fruit orienting members or wheels from the fruit after the fruit has been subjected by said members or wheels to orientation operations whereby to permit inspection of the fruit as to orientation and transfer of properly oriented fruit; to provide, in a fruit conveying and orienting machine or mechanism having orienting members or wheels movable laterally of the path of the conveyance to engage fruit to be oriented and then to be withdrawn from the fruit after orientation thereof, means for positively controlling the approaching and recessive movements of the orienting members or wheels in timed relation with the feeding of the fruit; to provide, in a fruit processing machine having a plurality of fruit feeding devices which convey fruit to different processing mechanisms at a continuous uniform rate, means for transferring the fruit without interruption of its movement from one of such devices to another; to provide in a fruit processing machine having a continuously rotating fruit feeding turret and a continuously travelling fruit feeding chain or conveyor operable in a plane substantially at right angles to the plane of rotation of the turret, fruit transfer means rotating in a plane substantially at right angles to the plane of rotation of the turret and capable of abducting fruit from the turret without interrupting the movement of the turret and to feed the fruit into the continuously moving chain or conveyor substantially in, or parallel to, the plane of the chain or conveyor and without interrupting the movement of said chain or conveyor; to provide a high speed fruit splitting, bisecting and sawings, pitting or deseeding machine; to provide, in a fruit splitting, bisecting and sawing, pitting or deseeding machine, wherein the fruit is fed to the bisecting, pitting or deseeding mechanisms at a continuous uniform rate, new or improved means for spreading or separating the fruit halves after bisecting and while the fruit is being carried at such continuous uniform rate from the bisecting mechanism to the pitting or deseeding mechanism; to provide, in a fruit bisecting and pitting or deseeding machine, a stationary spreader member for spreading the fruit halves and the cup sections in which the fruit halves are contained as the fruit is carried in the cup sections from the bisecting means to the pitting or deseeding means; to provide high speed pitting mechanisms travelling with and relative to a continuously moving fruit conveyor for pitting fruit without interrupting the movement of the conveyor; to provide new or improved travelling, pitting mechanism and driving mechanism therefor for pitting fruit as it is being fed at a continuous uniform rate; to provide improved or simplified driving mechanism for a travelling, pitting mechanism.

Yet another object of the invention resides in providing a most simple type of suture plane orientating mechanism for a series of continuously moving peaches of variant sizes and/or variant contours and in association therewith a simple type of inspecting mechanism operable upon the peach without interrupting the movement of the peach through the machine for determining whether or not the peach is improperly or properly oriented and likewise for controlling the actuation of subsequent peach processing mechanisms on the peach if the same be properly oriented or alternately for discharging an improperly oriented peach from the machine whereby such improperly oriented peach may be returned to the machine for subsequent passage therethrough and without damaging the peach.

Yet another object of the invention resides in providing a simple type of inspecting mechanism for continuously and uninterruptedly inspecting peaches which have been under the influence of peach orienting mechanism adaptable to orient each peach as to its suture plane and wherein such inspecting mechanism is of such simple operation that it need only contact the curved periphery of a peach that has been oriented in order immediately and without interrupting the continuous movement of the peach either to discharge the improperly oriented peach from the machine or for continuing the peach uninterruptedly through the machine for subsequent processing based upon the proper positioning of the peach according to its suture plane.

Yet another object of the invention resides in the provision of suitable peach guiding means adaptable during the continuous uninterrupted movement of a series of peaches through the machine for first maintaining the peach free for rotation upon a rotatable orienting wheel for sufficient time so that the peach will be oriented as to its suture plane and for thereafter firmly gripping the peach in its oriented position during an inspecting operation wherein an inspector moves to contact the curved wall of the peach to determine whether or not suture plane orientation has in fact been properly accomplished and if so accomplished for continuing firmly to hold the peach thus so oriented during the interval that a continuously moving transfer jaw mechanism will firmly grasp the so properly oriented peach and convey the same away from the first mentioned peach gripping means to carry the properly oriented peach to further processing means all in continuous uninterrupted fashion.

Yet another object of the invention resides in a novel means and apparatus for supporting a whole peach or the like substantially solely by the action of gravity upon a rotatable orienting member which by its rotation is operable ultimately to cause the suture plane indent to register with the periphery of the rotatable orienting mechanism and wherein means is provided for uninterruptedly and continuously moving the peach so being oriented and in providing means congruently moving with the peach so being oriented for holding the peach from further orientation after the termination of the orienting operation, for relatively separating the thus held peach of the rotatable orienting mechanism and causing an inspecting mechanism to move into contact with the curved surface of the held peach for the purpose of determining whether or not the peach is properly oriented and for controlling mechanism which operates in one instance to discharge the improperly oriented peach from the machine or alternately to hold the peach thus firmly held by the gripping means while additional transfer jaws grasp the thus properly oriented peach and convey it to subsequent peach processing mechanism.

Yet another object of the present invention resides in supporting a whole peach upon a rotating orienting wheel operable to rotate the peach to position the stem indent of the peach into parallelism with the long axis of the curved periphery of the orienting wheel, for thereafter gripping the peach thus oriented, for removing the rotating orienting mechanism from beneath the gripped peach and for moving and inspecting a peach inspecting mechanism into position beneath the held peach for the purpose of contacting the curved underside of the peach to determine whether or not the peach be properly oriented and for controlling passage of the peach either to a discharge chute or to subject the peach to action by transfer mechanism for transferring the peach to subsequent peach processing devices.

Yet another object of the invention resides in providing a constantly rotating turret carrying peach guiding and gripping means and associated peach supporting means in the form of a rotatable orienting wheel operable to support the peach in rotatable position thereon and between the gripping jaws and wherein means is provided for causing the jaws first merely to confine the peach in gravity position upon the rotatable orienting wheel and thereafter firmly to grip the peach after a predetermined amount of rotation on said wheel, together with mechanism for moving the rotating orienting wheel from supporting position below the held peach and also in providing congruently moving mechanism including peach inspecting means adapted to move into position below the held peach as it is constantly and continuously moved by the turret mechanism for inspecting the peach to determine whether or not the suture plane of said peach has been properly oriented and for controlling the operation of means for either discharging the peach from the machine if improperly oriented or for holding the peach for transfer to subsequent peach processing devices.

These and other objects of the invention will be hereinafter more fully evident from a perusal of the following specification when taken in connection with the accompanying drawings wherein:

Figure 2 is a view in side elevation of the right end of the machine of Figure 1.

Figure 3 is a view taken on the line 3—3 of Figure 2.

Figure 4 is an enlarged cross-sectional view taken on line 4—4 of Figure 2.

Figure 5 is a fragmentary view in vertical section taken substantially on line 5—5 of Figure 4.

Figure 6 is a cross-sectional view of the fruit feed conveyor taken on line 6—6 of Figure 8.

Figure 6a is a fragmentary view in perspective of a part of the conveyor of Figure 6.

Figure 7 is a perspective view of the hopper fruit conveyor and feed belt.

Figure 7a is a fragmentary view in perspective of another part of the conveyor of Figures 6 to 7.

Figure 8 is an enlarged plan view of the fruit feed conveyor.

Figure 9 is a sectional view taken on line 9—9 of Figure 6.

Figure 10 is a sectional view taken on line 10—10 of Figure 6.

Figure 11 is a sectional view taken on line 11—11 of Figure 6.

Figure 12 is an enlarged sectional view of the machine showing the orientator, the transferor and the forward portion of the sawing and pitting mechanism.

Figure 13 is an enlarged plan section taken on the line 13—13 of Figure 12.

Figure 14 is a sectional view taken on line 14—14 of Figure 13.

Figure 15 is an enlarged partial plan view of the orientator machine showing the fruit guiding and holding jaws.

Figure 16 is an enlarged view in vertical section taken along the line 16—16 of Figure 15.

Figure 17 is an enlarged fragmentary view in vertical section taken substantially along the line 17—17 of Figure 1.

Figure 18 is a fragmentary view in horizontal section taken substantially along the line 18—18 of Figure 16.

Figure 19 is a fragmentary view in horizontal section taken along the line 19—19 of Figure 16.

Figure 20 is a fragmentary view in perspective of the mounting support for the orienting wheel and a portion of its drive mechanism.

Figure 21 is an exploded perspective view showing the orienting wheel, the spindle and the wheel drive.

Figures 22 to 26 are operation illustrating diagrams in vertical sections taken along radial lines at positions or stations A—A to F—F in Figures 13 and 41.

Figures 27 to 31 are operation illustrating diagrams in plan views corresponding to the sectional views of Figures 22 to 26 respectively.

Figures 32 to 37 are operation diagrams illustrating the manner in which an orienting wheel may operate to orient a peach or like fruit, and illustrating the manner in which the fruit receiving and holding means cooperates with the orienting wheel in effecting the orientation of the peach or like fruit.

Figure 38 is an enlarged plan view of one of the pairs of the fruit receiving and clamping jaws and its actuating mechanism.

Figure 39 is a fragmentary view in vertical section taken on line 39—39 of Figure 38.

Figure 40 is a view in perspective of the parts of the pair of fruit receiving and clamping jaws of Figure 38.

Figure 41 is a diagrammatic plan view illustrating the relative positions of the orienting wheels and the jaws of the various pairs of fruit receiving and clamping jaws.

Figures 42 and 43 are fragmentary views in plan and elevation respectively of positioning and orienting wheels in respect to the center of the fruit when it is centralized in the closed jaws of a pair of fruit receiving and clamping jaws.

Figure 44 is a fragmentary view in perspective illustrating the formation of different confining and centralizing jaws of each pair of fruit receiving and clamping jaws.

Figure 45 is a diagrammatic view in vertical section illustrating the manner of forming each of the jaws of Figure 44.

Figure 46 is an enlarged view in perspective of an orientation inspector mechanism from an enlarged part of the machine of Figures 1 and 2.

Figure 47 is a fragmentary view in section taken substantially along the line 47—47 of Figure 46.

Figure 48 is a fragmentary view in perspective of a fruit discharging mechanism operated by the inspector mechanism of Figures 46 and 47.

Figure 49 is a view in perspective similar to Figure 48 showing the parts in a different position of operation.

Figure 50 is a fragmentary plan view on reduced scale of the inspector and fruit discharging mechanisms of Figures 46 to 49.

Figure 51 is a view in vertical section taken along the line 51—51 of Figure 50.

Figure 52 is an enlarged fragmentary view in vertical section taken substantially along the line 52—52 of Figure 50.

Figure 53 is an enlarged fragmentary end view looking along the line 53—53 of Figure 51.

Figure 1:
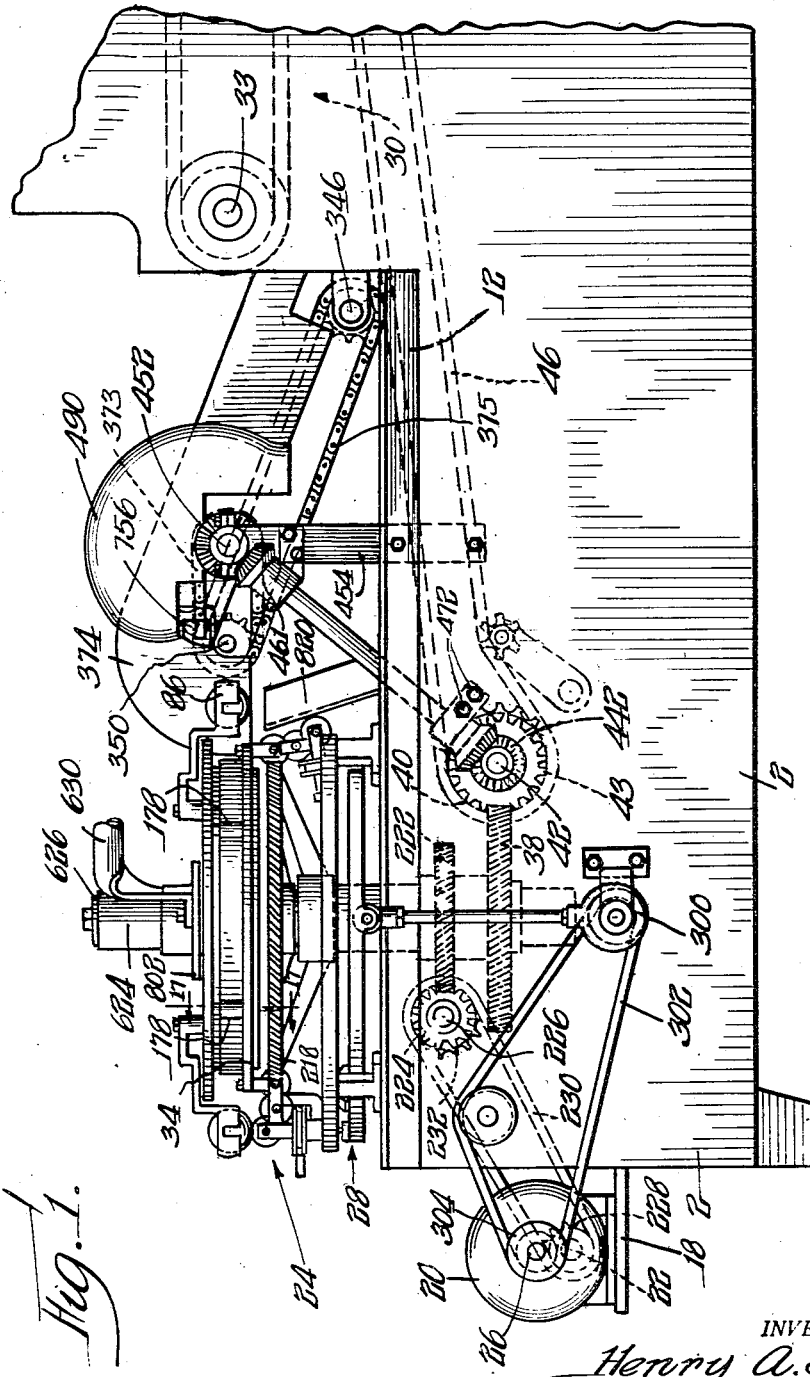
Figure 1 is a view in side elevation of the left end of a peach orienting, inspecting, splitting and pitting machine, including transfer mechanism, embodying the present invention.

Figure 54 gives a fragmentary view in vertical section taken substantially along the line 54—54 of Figure 52.

Figure 55 is a fragmentary view in vertical section taken substantially along the line 55—55 of Figure 50.

Figures 56 to 62 are diagrammatic views illustrating the operation of the inspecting and controlling mechanisms of Figures 46 to 55.

Figure 63 is an enlarged fragmentary view in elevation of a fruit transfer mechanism forming part of the machine in Figures 1 and 2.

Figure 64 is a fragmentary view in vertical section taken along the line 64—64 of Figure 63.

Figure 65 is a fragmentary diagrammatic view illustrating the construction and operation of the transfer mechanism of Figures 63 and 64.

Figure 66 is a fragmentary view in horizontal section taken substantially along the line 66—66 of Figure 65.

Figure 67 is an enlarged fragmentary view in elevation illustrating the construction of one of the pairs of transfer jaws of the transfer mechanism of Figures 63 to 66.

Figure 68 is a view in vertical section taken substantially along the line 68—68 of Figure 67.

Figure 69 is a fragmentary view in vertical section taken substantially along the line 69—69 of Figure 67.

Figure 70 is a view in perspective of the parts of a pair of transfer jaws shown in Figures 67 to 69.

Figures 71 to 84 are diagrammatic views illustrating the operation of the transfer jaws shown in Figures 67 to 70 and a cooperative operation of the fruit receiving and clamping jaws of the orienting mechanism.

Figure 85 is a diagrammatic illustration of the movement of a pair of jaws as the fruit is abducted or transferred from the orienting mechanism.

Figure 86 is a diagrammatic illustration of the movements of the pair of transfer jaws as the fruit is transferred to a conveyor by which the fruit is carried to the fruit splitting, spreading and pitting mechanisms of Figures 1 and 2.

Figure 87 is a fragmentary view in vertical section taken substantially on the line 87—87 of Figure 5.

Figure 88 is an enlarged fragmentary view in vertical section taken along the line 88—88 of Figure 87.

Figure 89 is a fragmentary view in horizontal section taken along the line 89—89 of Figure 88.

Figure 90 is a fragmentary plan view looking along the line 90—90 of Figure 92.

Figure 91 is a fragmentary view in the horizontal section taken substantially along the line 91—91 of Figure 92.

Figure 92 is a fragmentary view in vertical section taken along the line 92—92 of Figure 90.

Figure 93 is a view in exploded perspective of a travelling carriage for a fruit holder or cup unit for the splitting, spreading and pitting mechanism.

Figure 94 is a fragmentary view in vertical section taken along the line 94—94 of Figure 92.

Figure 95 is a view in vertical perspective of the cup actuating racks of the fruit holding unit or cups of Figures 87 to 94.

Figure 96 is an enlarged view in vertical section taken substantially along the line 96—96 of Figure 87.

Figure 97 is a diagrammatic view in elevation of the spreader unit of Figure 96 illustrating the location of the cup control cam in relation to the spreader unit.

Figure 98 is a fragmentary plan view of the cup unit holding the peach.

Figures 99 to 109 are operation diagrams illustrating the spreading of the fruit halves and the opening of the cups as they are conveyed past the spreader unit, Figures 99, 101, 103, 105, 107 and 109 being taken along position lines 99-109 respectively, of Figures 96 and 97.

Figure 110 is a fragmentary view in vertical section taken substantially along the line 110—110 of Figure 4.

Figure 111 is a fragmentary enlarged view in vertical section taken substantially along the line 111—111 of Figure 4.

Figure 112 is a fragmentary enlarged view in vertical section taken along the line 112—112 of Figure 4.

Figure 113 is a view in an exploded perspective of the parts of the mechanism shown in Figures 110 to 112.

Figure 114 is a view in vertical section on reduced scale taken substantially along the line 114—114 of Figure 117.

Figure 115 is a view in perspective of the frame casting of the pitter mechanism of Figure 114.

Figure 116 is a view in perspective of the mounting bracket of the pitter mechanism of Figure 114.

Figure 117 is an enlarged view in end elevation of the pitter mechanism along the line 117—117 of Figure 2.

Figure 118 is a fragmentary view in vertical section taken substantially along the line 118—118 of Figure 114.

Figure 119 is a fragmentary view in horizontal section taken substantially along the line 119—119 of Figure 117.

Figure 120 is a view in perspective of the supporting and actuating mechanisms of Figures 110 to 119.

Referring now to the drawings in detail, a preferred embodiment of a machine constructed in accordance with the present invention comprises a machine frame having side plates 2 and 4 (Figures 1 and 4) spaced apart by a plurality of cross members (not shown). Angle irons 10 and 12 (Figures 1, 13 and 14) extend longitudinally of the side plates 2 and 4 at the upper ends thereof and like angle irons (not shown) extend longitudinally of the side plates at the bottom thereof to form supporting feet for the machine frame. A stationary supporting column or shaft 14 (see Figure 12) is secured in suitable bosses, as 16, in upper and lower cross members of the machine frame. As shown in Figure 1, a platform 18 mounted in any convenient manner upon the side plates supports a combined motor and speed reducer gear unit 20 which has a slow speed shaft 22 which rotates a plurality of orienting wheels 24 hereinafter referred to, and also a high speed shaft 26 which drives a fruit vibrator mechanism 28 hereinafter referred to.

A combined motor and speed reducer gear unit 29 (see Figures 2 and 3) operates to drive through mechanism hereinafter described, a conveyor 30 for carrying the fruit to halving and pitting mechanisms. This conveyor 30 is an endless conveyor having a drive shaft 1358 (Figures 2 and 5) which carries a sprocket wheel 44 (Figure 5) about which runs a sprocket chain 46 (Figures 2 and 5) which passes over another sprocket 43 affixed to a shaft 42 thereby to rotate or operate the orienting turret now to be described.

The conveying means for the orienting mechanisms comprises a turret or disk 34 (Figures 1, 12 and 15) secured to a sleeve 36 (Figure 12) journalled on the column or shaft 14. This sleeve is secured at its lower end to a spiral gear 38 which is driven by means of a gear 40 (Figure 1) on shaft 42.

A series of fruit retaining and clamping jaws are mounted in substantially radially disposed relation on the turret disk, the outer portions of these retaining and holding jaws projecting beyond the periphery of the disk as best illustrated in Figure 15. Each such fruit receiving and holding means comprises, as best seen in Figures 15 and 32 to 45, a pair of generally V-shaped peach retaining and gripping jaws 86 and 88. The jaws 86 and 88 are formed integrally with levers or arms 90 and 92. The inner portion 96 of the arm 90 is journalled on a stud 108 passing through a sleeve 106 mounted in a hub 100 of a lever 102. The stud 108 is screwed into the turret 34 as shown in Figures 15 and 39. The jaw 86 and the lever 102 thus oscillate about the stud 108.

A short stud 110 is screwed into the end angularly extending portion 91 of the arm 90 for a purpose which will presently appear. The portion 96 of the arm 90 is provided with sector like teeth 112 which mesh with complementary teeth 114 on the arm 92 of the opposite jaw 88. This arm 92 at its inner end is provided with an elongated depending hub 116 receiving pivot pin 118 threaded into the turret disk 34. The jaws 86 and 88 are normally urged toward each other by a spring 120 connected as at 122 to jaw 86 and to jaw 88 at 124.

The jaw arm 92 is also provided with an adjustable stop 126 which is adapted to contact the jaw arm 90 whereby adjustably to limit the approaching movement of the two confronting jaws.

A bar 130 has spaced apart elongated slots 132 and 134 adapted slidably to receive studs 136 and 138. This bar 130 is also provided with an inclined plane surface 140 adapted to engage stud 110. The bar 130 also has a threaded hole 142 which receives a threaded stud 144 on which is journalled a roller 146. The outer end of the bar 130 is provided with a threaded hole 148 which receives a threaded stud 150. The stud 136 is threaded into the upper end of the stud 108. The studs 136 and 150 are each provided with a knob, such as 154 and 156, around which are fastened the end coils of a tension spring 152. A roller 158 is mounted upon the lower cylindrical portion 160 of the stud 138. This same stud 138 is also provided with an upper cylindrical portion 168 which passes up through a hole 162 in the boss 104 of the lever 102 and through the slot 134 of the long bar 130. The stud 138 is held in assembled relation with the bar 130 and lever 102 by a washer 164 and a screw 166 threaded into the upper end of the stud 138.

The jaw members, or jaws, 86 and 88 are preferably formed as shown in Figures 32 to 45. Thus the jaw member 86 is generally V-shaped in plan as illustrated in Figures 38, 40, 42 and 44, consisting of a rear leg portion 86a and a front leg portion 86b integrally joined by a base portion 86c of substantially less height than the leg portions 86a and 86b. The free end of the leg portion 86b is rounded or tapered as at 86d to aid in eliminating or minimizing the possibility of bruising of the fruit by the free ends of the jaw members.

The jaw member is formed of tapered stock, as illustrated in Figure 45, which is thicker at the top than at the bottom. Each leg portion of the jaw member 86, as for example the leg portion 86b illustrated in Figure 45, is provided with a lower section 86e and an upper section 86f, the inner wall of both sections first tapering outwardly in a downward direction by reason of the tapered stock from which the jaw is formed. The lower section 86e is thereafter bent inwardly, as shown in Figure 45, about a line substantially midway between the top and bottom of the leg portion so that the leg portion is in the form of a shallow V in vertical section as shown in said figure, whereby the bottom section of the leg portion may underlie the peach and prevent the peach from dropping down when the orienting wheel is swung downwardly out of engagement with the peach.

It is to be understood that the jaw member 88 is formed with leg portions 88a and 88b and a connecting base portion 88c similar to the portions 86a, b and c of the jaw member 86. It is also to be understood that the jaw member 88 has a free rounded or tapered end edge 88d, similar to the edge 86d of jaw member 86, to aid in eliminating or minimizing the possibility of bruising of the fruit. Each leg portion of the jaw member 88 is formed with an upper and lower section, 88e and 88f respectively, so that the leg portions of this member are in the form of a shallow V in vertical elevation. Thus the jaw members serve, when in closed position gripping the peach, to centralize the peach vertically in a plane extending through the axis of the turret and the vertical axis of the orienting wheel spindle. This is accomplished by reason of the deep V formation of the jaw members in a horizontal plane. The jaw members also serve by reason of the shallow V formation of the leg portions in the vertical plane to grip the peach sufficiently firmly to prevent it from shifting vertically when the jaw members are closed upon it and the orienting wheel is withdrawn or dropped out of engagement with the peach.

The turret construction embodies a wheel-like member 170 (Figure 12) which has a central hub portion 172 surrounding sleeve 36. In addition, the wheel-like member 170 has a rim or flange 173 abutting and depending from the turret disk 34. A ring 174 having an annular horizontal flange 176 at its lower end is mounted on the rim 173 and forms a mounting for the orienting mechanisms 24, which are equal in number to the number of pairs of jaws. In the present instance there are 15 of these orienting mechanisms to correspond to the 15 pairs of jaws mounted for rotation on and with the main turret disk 34.

The supporting ring 174 is provided with angularly spaced, axially extending bosses 178 (Figures 1, 12 and 17), receiving bolts 180 by means of which the wheel 170 is secured to the turret disk 34. One or more spacing members or shims 182 is interposed between the turret disk 34 and each of the bosses 178 whereby adjustably to predetermine the position of the orienting mechanisms vertically with respect to the turret disk 34 and the fruit receiving means or jaws 86 and 88. The adjustment is accomplished by varying the number of shims 182, or substituting shims of different thicknesses.

Each individual orienting mechanism comprises a rotatable member or wheel 184, the diameter of which is on the order of from 1⅜" to 1¾". It is preferred to use the same size wheel to orient all sizes of peaches. The preferred size of orienting wheel measures 1⅜" in diameter by ¼" in width.

As shown in Figures 16 to 37 inclusive, each orienting wheel 184 is positioned within a slot 186 of a spindle 188. The wheel 184 is journalled on a cross pin 190 press fitted or otherwise secured to the spindle 188. A Geneva gear plate 192 and a Geneva lock plate 194 are secured to the spindle 188. The Geneva lock plate 194 has four equal, arcuate surfaces 196. The reduced lower portion 198 of the spindle 188 is journalled in an apertured boss 200 of a supporting unit 202, best seen in Figure 20. This supporting unit may comprise a U-shaped bracket 204 bolted to the annular flange 176 of the ring 174. The U-shaped bracket 204 has secured to it spaced arms or bars 206 and 208 to which is secured or with which is integrally formed a bracket 210. The central portion of this latter bracket 210 is provided with the apertured boss 200 hereinbefore described. The depending arms of the bracket 204 also form a mounting support for a horizontal shaft 212 to which is secured a spiral pinion 214 and a gear 216 (Figure 18).

The spiral pinion 214 meshes with and is rotated by a large spiral gear wheel 218 (Figures 12 and 18) keyed to a sleeve 220 (Figure 12) concentric with the column or stationary shaft 14 journalled on the sleeve 36. The sleeve 220 has keyed to its lower end a spiral gear 222 driven by a spiral pinion 224 (Figure 1) on a shaft 226 journalled in suitable bearing brackets (not shown) secured to the side plates 2 and 4 of the machine. This latter shaft 226 is driven by the slow speed shaft 22 of the combined motor and speed reducer 20 as by means of a sprocket 228 on the shaft 22, a chain 230 and a sprocket 232 on the shaft 226.

Gear 216 (Figure 18) meshes with a gear 234 secured to a shaft 236 journalled in the forward ends of the arms 206 and 208. A drive spool 238 of "hour glass" form is secured to the shaft 236 for rotation thereby. The concave surface of this hour glass drive spool which is concentric to the axis of the spindle 198 is adapted frictionally to rotate the orienting wheel 184. It should be noted that the horizontal distance between the vertical planes through the axes of rotation of the orienting wheel and the axis of rotation of the drive spool is less than the sum of the radius of the wheel and the radius of the spool and that the horizontal planes through the respective axes are vertically spaced so that the orienting wheel engages the surface of the drive spool at a point above the horizontal plane through the spool axes. Each orienting wheel is periodically raised out of driving engagement with the drive spool 238 and while out of engagement is revolved or rotated about the axis of the spindle 188, i. e., about a vertical axis. This disengagement of the wheel from the spool is accomplished by suitable wheel raising mechanism or means in the form of cam blocks 240, 242, 244 and 246, best seen in Figures 12, 13 and 22 to 26. These cam blocks 240 to 246 inclusive, have beveled end portions and are bolted to a mounting ring 248 fastened to and supported upon brackets, such as 250 (Figures 13 and 16), fastened to the longitudinal frame bars 10 and 12 (Figure 13).

The spindle 188 of the orienting mechanism is of such length that the bottom end of its reduced portion 198 is spaced above the cam mounting ring 248 as illustrated in Figures 16 and 22 to 26. When this spindle 188 is carried by the continuously moving turret into engagement with the leading beveled end of one of the stationary cam blocks 240 to 246 inclusive, the spindle 188 is thereby raised as illustrated in Figures 22 to 26 inclusive. Circular guide means for the spindles 188 of the orienting mechanisms, as they are revolved in a planetary movement about the axis of the column or shaft 14, is provided by a pair of circular tracks or rings 252 and 254 (as shown in Figures 13 and 22 to 26 inclusive). These rings are mounted on spaced vertical arms 256 of the brackets 250 (see Figure 16). The outer arms of the brackets 250 also support in vertical spaced relation to the track 252 a Geneva lock ring 258 best seen in Figures 13 and 16, which, by engaging the arcuate surfaces 196 of the Geneva lock plates, holds the spindles 188 of the orienting mechanisms against rotation. Geneva movement actuating, or driving gear, sectors 260, 262, 264 and 266 (Figure 13) are supported in angularly spaced relation on the Geneva lock ring 258. Each of the sectors is provided with two teeth on its inner surface to engage the teeth of the Geneva gear 192 of each orienting mechanism as the orienting mechanisms are brought thereto by the rotation of the turret.

The two teeth of each Geneva drive sector 260, 262 and 264 hereinbefore mentioned cause the spindle of each orienting mechanism to be rotated through an angle of 90°. The Geneva drive sector 266 is provided, however, with only one tooth as shown in Figure 13 and this sector therefore rotates the spindle 188 of each orienting mechanism only through an angle of 45° for purposes which will presently appear.

Means is provided for holding each spindle from accidental rotation about its vertical axis when the wheel extends radially of the turret. This means preferably comprises a flat spring 268 (see Figures 19 and 20) secured to an upstanding arm of the bracket 210 and provided with a V-shaped hook 270 at its outer end to engage a corner of the Geneva lock plate 194. The spindles of the orienting mechanisms are initially turned to a position at 45° to a radius of the turret, as shown at station B in Figures 13 and 41, and as illustrated in Figures 23 and 28, by the Geneva locking ring 258, For that purpose the Geneva locking ring is formed at its leading end with a radially reduced or narrower portion 272 (Figures 13, 27 and 28) merging into the thicker portion by a curved camming surface or portion 274 which is adapted to engage a corner of the Geneva lock plate 194 of each orienting mechanism to cause each lock plate and hence the spindle 188 to turn about its vertical axis to position shown in Figure 28 in which the curved locking surface 196 of the lock plate 194 slides along the inner edge 276 of the locking ring 258 so that the ring holds the lock plates and hence the spindles against accidental rotation. It will be evident that the locking surface 196 of the locking plate 194 has the same radius of curvature as the locking edge 276 of the locking ring 258.

As the continuously driven turret 34 rotates at a uniform rate, a peach positioned between any pair of grippers 86 and 88, is carried successively through the positions or stations A—A, B—B, C—C, D—D, E—E and F—F indicated in Figure 13 and illustrated in Figures 22 to 31. While the fruit is thus continuously and uninterruptedly being conveyed through this series of positions or stations, it is (as hereinafter described more particularly) oriented as to stem indent and also as to suture plane (which includes the long axis of the stem indent).

After the fruit has been carried past the position or station F—F (Figure 13) the orienting wheel mechanism may for one reason or another not be fully seated in its maximum depth in the stem indent of the overlying peach. Or, in some few instances, the long axis of the stem indent of the peach may be slightly cocked or slightly out of alignment with respect to the plane of rotation of the orienting wheel. In order to cause the wheel to enter into the deepest portion of the cavity there is provided peach vibrating mechanism 28 (see Figures 13 and 14). This vibrating mechanism 28, best shown in Figures 13 and 14, comprises a pair of arms or levers 278 and 280 pivoted at their inner ends on a common shaft 282 mounted in brackets 284 bolted to the side frame plate 4. As shown in Figure 13, the track or ring 248 which supports the spindle raising cam blocks 240, 242, 244, 246, is cut away between a pair of brackets 250 and a vibratable ring sector or section 286 of substantially the same radius as the ring 248 is inserted and is bolted, as at 288, to the outer ends of the arms 278 and 280 and bridges the gap between the ends of the ring 248. The sector 286 is vibrated substantially vertically by an eccentric 290 (Figure 14) secured to a shaft 292 mounted on a suitable bracket 294 bolted to the side frame plate 2. A connecting rod 296 connects the eccentric 290 to a stud bolt 298 pivoted in a boss formed on or secured to the ring sector 286. The shaft 292 is provided with an adjustable-speed pulley 300 driven by a belt 302 in turn driven by a pulley 304 on high speed shaft 26.

The tracks 252 and 254 are progressively twisted, and bent downwardly and inwardly, as shown in Figure 14 from position G—G to position H—H to cause each orienting wheel and its mounting unit to swing downwardly about the axis of its mounting pin 212. This construction provides a means for moving the orienting wheel 184 down and away from the fruit as the fruit is carried through certain inspection and transfer zones hereinafter described.

The tracks 252 and 254 are then progressively twisted in the opposite direction and bent upwardly and outwardly from position H—H to position A—A, as shown in Figure 13, to cause each wheel and its mounting unit to be swung upwardly to its normal, fruit supporting position.

By bending the tracks 252 and 254 as shown, exact control of the positions of the orienting wheel assembly is maintained at all times. In this connection, it should be noted that the lower part of the spindle 198 of the orienting wheel is provided with a roller 306 which runs between the opposed tracks 252 and 254. As the roller 306 moves along the downwardly bent portion of the track the wheel assembly is gradually lowered so as to clear the path of the inspection mechanism and the transfer mechanism, as hereinafter described. Upon continued rotation of the turret, the upwardly directed portions of the track 252 and 254, between the positions H—H and A—A, as shown in Figure 14, progressively and gradually force the wheel 306 and the orienting wheel structure upwardly to vertical position as shown in Figure 16. The orienting assembly is then ready to receive another peach from the peach feeding mechanism soon to be described. It will be understood, of course, that each of the orienting wheels mounted upon the turret go through similar cyclic raising and lowering operations so that peaches in a constant stream are carried in continuous uninterrupted but spaced apart relation by the turret and are received, oriented, inspected and transferred, to other processing mechanisms, without interrupting the continuous, uniform movement of the peaches.

The purpose of swinging each orienting wheel 184 downwardly is twofold: first, to permit the positioning of the inspecting mechanism under the peach without moving the peach vertically, and secondly, to permit the transfer mechanism to grasp and remove a properly orientated peach from the first turret and convey such properly oriented peach further to processing apparatus without disturbing the orientation of the peach and without interrupting the continuous progression or movement of the peach through the machine.

In connection with the orienter mechanism, means is provided for opening the fruit clamping jaws variant amounts, dependent on the size of the individual fruits, so as to provide a uniform clearance between the fruits and jaws during the rotating of the fruits by the orienting wheels. Such means comprises the bars 130, and connections to the jaw levers 90, and a cam 802 having a collar 800 pinned to the top of the stationary shaft 14 by means of a set screw, the purpose of the cam being to control the opening and closing of jaws 86 and 88. As the gripper jaws with their rollers 158 rotate around the stationary cam 802, the rollers come to a dip or recess 802' which allows the gripper jaws to close and grip the peach.

Each bar 130 is provided with the two slots 132 and 134, as hereinbefore described, these slots slidably receiving the studs 136 and 138. Since the stud 136 is screwed into the top of the stud 108 which in turn is screwed into the turret 34, the spring 152 urges the slide 130 inwardly of the turret.

When the jaws are in open position, as shown at station U—U in Figure 15, the roller 158 contacts the periphery of the cam 802 in advance of the recess 802' and through the lever 102, the bar 130, and the arm 91 of jaw lever 96 holds the jaws in open position against the action of the spring 120. At this time, the stud 110 is at the outer end of the incline or cam surface 140. The spring 120 is not of sufficient strength to move the slide bar 130 against the resistance of the expanded spring 120.

As a pair of gripper jaws approach station V—V in Figure 15, the dip 802' allows the roller 158, lever 102 and bar 130 to swing in a counter-clockwise direction about the stud 108 so that the spring 120 moves the jaws to closed position. If the peach is above a minimum size the roller 158 will not be moved to the bottom of the dip 802' by the spring 120 because the peach itself will limit the approaching movement of the jaws and prevent further swinging of the roller 108, lever 102 and bar 130 under the action of the spring 120. However, the spring 120 is now ineffective to restrain the inward movement of the bar 130 under the action of the spring 152 and hence, as that bar moves inwardly, both the bar and the lever 102 are swung in a further counter-clockwise direction, by the action of the stud 110 on the inclined or cam surface 140, until the roller 158 reaches the bottom of the dip 802'.

It will be evident that the extent of such movement of the roller 158, lever 108, or bar 130, relative to the jaw lever 96, is a measure of the amount that the diameter of the particular peach in the jaws, varies from the diameter of the minimum size peach for which the machine is designed, or adjusted, to handle. Hence, it may properly be said that each pair of gripper jaws and associated actuating mechanisms constitute means for measuring the sizes of individual peaches fed to the orienter mechanisms.

As a pair of gripper jaws moves from station V—V to station W—W in Figure 15, the lever 102 and bar 103 are swung a predetermined amount in a clockwise direction as the roller 158 passes out of the dip 802'. The spring 152 is now again ineffective to move the bar 130 inwardly against the resistance of the spring 120. Hence the jaws are moved apart a predetermined amount (determined by the depth of the dip 802') from the closed position of station V—V, to provide a uniform clearance for the free rotation of the fruit, regardless of the size of the fruit. Thus, regardless of the size or diameter of the fruit, there will be a constant difference in spacing between any pair of jaws at station V—V and the same jaws when brought to station W—W.

Between stations W—W and X—X, Figure 15, the cam 802 is of constant diameter and each pair of jaws remains in the partially opened position determined by its movement from station V—V to W—W.

A cam 804 is secured to the cam 802 by the two bolts 806 and 808. As a pair of jaws moves from station X—X to station Y—Y, the roller 146 carried by the slide bar 130 strikes the camming surface of cam 804, as at 810, and the slide is moved outwardly of the turret against the urge of the spring 152 until the stud 110 reaches the bottom of the inclined surface 140. The peach is now gripped by the jaws under the tension of the spring 120.

From station Y—Y to Z—Z the jaws firmly grip the peach and hold it in a fixed vertical position. It is to be noted that the roller 158 moves out of contact with the cam 802 as the jaws approach station Y—Y. The distance that the roller moves away from the cam depends on the size of the peach being processed, a minimum sized peach allowing the roller to most closely approach, on contact, the cam 802 while a maximum sized peach causes the roller to move a maximum amount away from the cam 802.

As each pair of jaws moves between stations Y—Y and Z—Z, the fruit firmly gripped therein is subjected to an orientation-inspection operation, as will be hereinafter described, and as the jaws then move from station Z—Z toward station U—U, the fruit is transferred or abducted from the first turret, the jaws being moved to an open, fruit releasing position in such manner and in such timed relation with the operation of a vertically moving transfer mechanism, hereinafter described, that the fruit is transferred or abducted without interrupting the movement, or varying the rate of movement, of the continuously revolving fruit gripper jaws of the first turret.

To make this opening of the jaws 86 and 88 uniform whether the peach be large or small, the shorter cam 804 is provided with a recess or dip 812 (Figure 15) to receive the roller 146. Now due to the action of the spring 152 the slide 130 is instantaneously moved inwardly, and with the lever 102 is swung counter-clockwise by the action of the stud 110 and the inclined surface 140, thereby causing the roller 158 to contact the cam 802 at the point of beginning, or just in advance of the point of beginning of an actuating cam surface 816 of the cam 802.

At the instant the roller 158 reaches the point of beginning of cam surface 816 the transfer mechanism grips the peach and the roller 158 climbs the cam surface 816 causing the jaws 86 and 88 of the orienting turret to open in timed relation with the vertical movement of the fruit being transferred. The action is such that the rollers 158 contact the camming surface 816 at the same time relative to the movement of the transfer jaws, whether the peach be large or small so long as it is of a size within the grade-size range of the machine. The present machine is designed to handle peaches from 2⅜ inches in diameter to 3½ inches in diameter. Obviously other grade-size ranges of peaches may be handled by variations in the size and adjustment of appropriate parts of the machine.

The stop screws 126 have been provided (Figure 15) to limit the closing movement of the jaws 86 and 88 so that in the absence of the peach they cannot interfere with the proper operation of the transfer mechanism. It is to be noted that at the transfer station, but after the peach has been moved from the jaws 86 and 88 the roller 146 engages the cam surface 814 of the cam 804 and returns the bar 130 to the position in which the stud 110 lies at the inner end of the incline 140 so that the jaws 86 and 88 can be opened by cam surface 816 to their fullest extent to receive a peach from the infeed conveyor mechanism hereinafter described.

*Peach feeding hopper and conveyor*

A hopper is provided for receiving a mass of peaches which are in general graded as to size within a particular or desired range of size as previously indicated. In general, any type of feed belt 308 (Figure 7) may be provided for delivering a series of peaches from any desired source to a hopper 310 from which they are delivered to a feeding mechanism by which they are fed in a manner such that a single row of peaches is fed to the orienting mechanism of the continuously moving turret. During the feeding of the peaches to the turret, the peaches are spaced a uniform distance apart so that they will be delivered in properly spaced apart relation to the continuously and uniformly moving orienting mechanisms.

The hopper and feed mechanism comprises a pair of rails 326 and 328 (Figures 6 to 9 and 11), which have secured to the ends thereof, as by bolts 338, journal bearings 330, 332, 334 and 336. These rails are held in spaced apart relation by straps 340 and 342 secured by bolts 344. A rotatable shaft 346 passes through the journal bearings 334 and 336 and has secured thereto a sprocket 348. A drive shaft 350 passes through the bearings 330 and 332 and has secured thereto a sprocket 352 which is connected to the sprocket 348 by a chain 375. The lower end of the conveyor is supported by a brace 354 secured to the rail 326 by a bolt 356 and to the stationary vertical frame 2 of the machine by means of bolts 357. The drive shaft 350 is supported by the bearing 332 which has depending therefrom an L-shaped bracket 360 which is bolted to the angle iron 10 of the main frame of the machine by the bolts 362. This drive shaft 350 is also supported by the bearing 330 which has an L-shaped bracket 366 which is bolted to the upright 367 by bolts 368.

A sprocket 370 is secured to one end of the shaft 350 and is connected by a chain 373 to a drive sprocket 371 which drives the shaft 350 in timed relation with the turret of the orientator mechanism.

The hopper (as shown in Figures 6 to 10 inclusive) consists of a side wall 372, a back wall 374 and an open bottom through which passes the upper reach of a travelling conveyor belt. The hopper is provided with an apron having an upstanding end 364, an inclined lowermost or entering end portion 376 (Figures 6 and 7) which merges into an intermediate portion 377 of less inclination. The portion 377 of the apron merges into an upper end portion 379 of the same inclination as the portion 376. Peaches are delivered continuously by the belt 308, or other suitable conveyor to the lower end portion 376 of the apron where they are retained, due to the inclination of this portion 376. As shown in Figure 9 this lower end portion 376 of the apron is inclined laterally downwardly toward the conveyor whereby peaches delivered onto the apron of the hopper roll by gravity into the leading or lower end of the conveyor.

The endless conveyor chain 375 comprises a preferably ¾ pitch roller chain made with continuous "K-1" attachments which are well known in the art. The chain 375 is provided with a series of groups of articulated conveyor lugs which ride upon the opposed parallel rails 326 and 328. Each group of these lugs forms a peach receiver pocket or bucket consisting of a peach feeding lug 380 (Figure 6a) which has upwardly extending lug portions 380a of sufficient height to form a retainer for the peach. Each group of lugs also comprises a plurality of slightly spaced, peach supporting lugs 382 having lug portions 382a substantially shorter than the lug portions 380a of the lug 380. In the present instance each peach receiving pocket is formed with one lug 380 and four lugs 382. Each lug portion 380a (as shown in Figure 6a) is formed with a tapered peach engaging, forward surface extending upwardly from a relatively low, forwardly projecting laterally inclined ledge 380b. The top surface of these ledges 380b are inclined downwardly from the side wall 372 of the hopper at the same angle as the lower end portion 376 of the hopper apron, as shown in Figure 9. The laterally inclined surfaces 380a cause the peaches to roll toward the hopper wall 374. Each one of the lugs 380 comprises in addition to the upstanding lug portions, a cross bar 384 having bolted thereto chain attaching links 384a attached to the cross pins of the chain 375.

Each lug 382 is provided with a series of upstanding, relatively low, spaced apart, lug portions or projections 382a. The upper surfaces 382b of these lower lugs 382 are laterally inclined and taper downwardly toward the hopper wall 374, as shown in Figures 7a and 11, at the same angle as the ledges 380a of the lugs 380, so that the peach will tend to roll against the wall 374 of the hopper. The lug portions 380a and 382a form spaced apart fingers permitting the passage therethrough of stationary rods 404, 406, and 408 located at the entrance end of the inclined conveyor for the purpose of holding a peach on the short lugs 382 of a peach receiving pocket during the time fingers 380 are swinging around the lower sprocket of the conveyor and are not yet in position to support the peach. These rods 404, 406 and 408 are welded to a bracket 403 which is bolted to the side frame of the machine.

Rods 412, 414 and 416 at the discharge end of the conveyor are likewise welded to an L-shaped bracket 428 which is bolted to the bearing bracket 360 by the bolts 359 (see Figure 6). The rods 412, 414 and 416 form means down which the peaches may roll into a receiver 418 between the gripping jaws 86 and 88. This receiver or trough 418 consists of the two vertical arcuate side walls 420 and 422 and a bottom 424. This arcuate receiver has a terminating edge 426 and the arrangement is such that when the peaches roll off this edge 426 they are deposited on the orienting wheels which are positioned to underlie the same, as hereinafter more fully set forth.

Wiping means is provided to remove surplus peaches and to prevent them from reaching each orienter wheel. This wiping means consists preferably of a bar 430 which is set at an angle across the conveyor lugs 380 so that if peaches are not properly seated in the buckets of the conveyor, or are riding on top of peaches so seated, this bar will scrape them off and they will roll back onto the area 377 of the hopper apron and from there will roll down into a pocket of the conveyor in advance of the upstanding pusher finger 380a of a lug 380. This wiping means also serves to discharge surplus peaches from the upper end portion 379 of the hopper apron. The bar 430 is welded to a hub 432 which is adjustably secured on a rod 434 and is held in place by a thumb screw 435. The lower end of the rod 434 is welded to a bracket 437 which is bolted to the bracket 428 by bolts 440.

The arcuate trough like receiver 418, hereinbefore mentioned, is supported by brackets 436 and 438 which are bolted to the Geneva lock ring 258 (see Figure 13). In addition, a guard like deflector 439 is suitably mounted to prevent peaches, which are wiped off by the surplus wiper 430, from falling out of the machine. This deflector insures that the peaches roll back onto the hopper surface 377.

It should be noted that the inner edge of the hopper apron 376 lies at the same level as the tops of the lugs 380, as shown in Figure 6, and this edge then lowers, relatively to the lugs, until, in the end portion 379, it is at the same level as the tops of the lugs 382. Thus, as the peaches roll down the lower end 376 of the hopper apron they will not strike the lugs 380 and become bruised and yet surplus peaches on the upper end 379 of the apron will be wiped off by the action of the wiping means so that only one peach at a time will be fed to the orientor.

*Fruit inspecting and transferring mechanisms*

Mechanism is provided for inspecting the fruit, without interrupting the movement of the continuously rotating orientor turret, for the purpose of determining whether or not the fruit is properly oriented.

This fruit inspecting mechanism (Figures 46–62) may comprise a hub 624 (Figure 51) pivotally mounted on top of the stationary shaft 14. A washer 626, held by a bolt 628, keeps this hub in place. An arm 630 extends radially outwardly of this hub and terminates in a depending arcuate portion having at its lower end a boss 632 (Figures 46, 51, 53). This arm carries an inspector assembly 633.

As shown most clearly in Figure 50 the radially extending arm 630 swings arcuately about the center post 14 of the first turret. This arm starts its swing in a counter-clockwise direction about 30° away from the center line CL and swings back and forth about 12° in its fruit inspecting operation. The 30° starting line is shown in Figure 50 as line CL30. The finish line, 12° removed from CL30, is shown at CL12. These lines CL30 and CL12 thus define the angle or zone of movement of the arm 630 in which the inspecting of the fruit takes place. This arm 630 and the inspecting assembly 633, carried thereby, moves in a counterclockwise direction in unison with the fruit. An inspector member is raised and contacts the under surface of the fruit while the inspecting assembly is moving in unison with the fruit in a counter-clockwise direction from line CL30 to CL12. When the inspecting mechanism reaches the line CL12, the motion of the arm 630 is reversed and carries the inspector assembly in a clockwise direction back to the line CL30 to become aligned with the next oncoming fruit. In this manner the continuously moving fruits are successively inspected without interrupting the movement of the fruits through the machine.

Means is provided for driving the arm 630 counter-clockwise in unison with the constantly rotating turret 34. Thus, the turret is provided with a series of spaced apart upstanding driving lugs 634 (Figures 15, 46, 50, 51 and 53) one for each pair of gripper jaws. The inspector assembly remains at rest in the position shown in Figures 15 and 50, until a driving lug 634 contacts the toe 635 (Figure 46) of an arcuate lever 636. This arcuate lever 636 has a boss 638 through which passes a stud 640 which is threaded into the arm 630 as at 642 (Figure 50). The opposite end 637 of the arcuate lever 636 has studded thereto a roller 644 (Figures 46 and 51). A stop screw 646 is threaded into the arm 630 to limit the upward travel of the curved arm 636. A stop plate 648 is attached to the lever 630 by a screw 649. These two stops 646 and 648 provide means for limiting the arcuate movement of the end 635 of the lever 636 relative to the series of driving lugs 634 on the turret 34. In addition, an L-shaped rod 650 is attached to the arm 630 and serves as a support for the upper end of a tension spring 652, the lower end of which is fastened to the lever 636 by means of a screw 654. This spring 652 holds the lever 636 normally against the stop 648 and in the path of the lugs 634 as shown in Figures 46 and 51.

Means is provided for disengaging the lever 636 from the driving lugs 634. To this end a camming surface 656 (Figures 46 and 51) is provided to actuate the roller and thereby depress the arcuate arm 636 about its pivot 640 so as to cause the free end 635 of the arcuate lever 636 to raise above the driving lugs 634 and thereby to break the driving connection between the constantly moving turret 34 and the carrier arm 630 of the inspector mechanism.

In addition, means is provided to return the inspecting mechanism from its counter-clockwise limit of movement represented by line CL12, Figure 50, to starting position represented by the line CL30. To this end, a stationary bracket 660 is secured at one end to the stationary cam 802 (see Figure 50) by means of a bolt 662 and at the other end to a stationary cam 490 by bolts 491. The upright portion 664 of the cam 656 is also secured to the cam 490 (Figure 55). A stud 666 (Figure 50) is screwed into swinging arm 630 and receives on its upper end a rod connection 668 which is carried by a rod 670 which passes through a hole 671 in the stationary bracket 660. A compression spring 672 acting against the bracket 660 and a collar 674 on the end of the rod 670 causes the arm 630 to swing back to the starting position as soon as the toe 635 of lever 636 is released from a driving lug 634. A stop collar 676 is secured to the rod 670 so that the arm 630 will always swing back a predetermined distance. Means is provided to cushion the shock of the returning arm 630. To this end an air cylinder has been provided. A stud 678 is screwed into the arm 630 and receives at its upper end a rod connection 680 carried by a piston rod 682 connected to a piston 684 which travels back and forth in a cylinder 686. A standard petcock 688 is screwed into the end of the cylinder and this petcock can be adjusted so that as the arm 630 swings back a cushioning air pressure is created so that there is no banging when the stop collar 676 contacts the bracket 660. A hole or outlet 688 is provided in the side of the cylinder 686 so that when the arm 630 swings counter-clockwise the piston passes this hole and the cylinder is opened to atmospheric pressure thereby assuring the same amount of air in the cylinder each time the arm 630 starts its swing back to its starting position.

The inspecting mechanism preferably comprises a plate like dish which is moved upwardly toward the peach after the peach has been subjected to a period of orientation by one of the rotating orientators and is held gripped in a pair of fruit gripping jaws of the orienting turret. This disk 690 is shown in Figure 46. The inspector disk is preferably secured to a horizontal lever arm 692 which arm terminates in a hub 694 (Figures 46 and 53). This hub has a depending boss 696 which has studded thereto a roller 698. This roller 698 is acted upon by a stationary cam 699 (Figures 46, 50 and 51). A bracket 700 is secured to an upright 454 (see Figure 64) by suitable bolts and this bracket 700 has secured thereto by suitable bolts an upright member 702 (Figures 46 and 51) which in turn carries or has formed as a part thereof, the cam 699. When the roller 698 is on the portion 704 of the cam 699 the inspector disk 690 is held below the lowermost surface of a continuously moving peach held in the peach gripping jaws 86 and 88. As the peach and the inspection disk 690, as hereinafter described, move counter-clockwise at the same rate the roller 704 moves off the high portion 706 of the cam thereby allowing the inspection disk 690 to raise and contact the peach, as shown in Figure 57, or to move to the position shown in Figure 59 in which it is in its uppermost position but unable to contact the peach, all as hereinafter described.

Projecting upwardly from the boss 694 (see Figures 46 and 53) which is journalled on a stud 708 carried by the boss 632, is an upright arm 710 which has at its upper end a slot 712. This arm 710 is connected to the upper part of a lever 714 by a link 716 adjustably pivoted in the slot 712 and pivoted to the lever 714 as at 726. A stationary bracket 718 fastened to the arm 630 has at its upper end a pivot pin 720 about which the lever 714 oscillates. This lever 714 has at its lower end a one way pawl 722 which when moving in one direction may contact a driving lug 724 (Figures 48 to 50, 52 and 54) but on the return stroke slides over this lug 724. Due to the long distance between the stud 708 and the pivot connection of the link 716 to the arm 710, the short distance between the pin 726 and the pivot pin 720, and the long distance between the pivot pin 720 and the free end of the pawl 722, a slight movement of the inspector disk 690 causes a large movement of the pawl 722. In other words, the pawl 722 is very sensitive to any up or down movement of the inspector disk 690. A tension spring 728 (Figures 46 and 51), fixed at its upper end to the arched lever 630 and its lower end to the lever 692 as at 730, serves to urge the roller 698 toward the cam 699. The upright arm 710 is secured to an upstanding lever 732 which is pivoted on the stud 708, as shown in Figure 46, whereby the arm 710 swings about the axis of the stud 708 as shown in Figures 56 to 61.

As shown in Figures 48, 49 and 64 a V-shaped arm 734 is secured to the upright 454 by screws 736 and 738 and has cut in its outer face a groove 740 which receives a slide 742. This slide is held in place by plates 744 secured by screws 746. The slide has attached thereto, as by bolts 750, the lug 724 hereinbefore described. The slide 742 also has attached to it an upstanding bracket 752, which is secured by bolts 754. The upper part of this bracket 752 has an offset extension to which is secured, as by bolts 758, a cam 756.

A bar 760 is pivoted at 762 to the inner leg of the V-shaped bar 734. This pivoted bar 760 is formed with spaced recesses providing a shoulder 764 and a lug 766. A flat spring 768 is fastened to the support 734 and urges the pivoted bar 760 upwardly so that the latter is always pressed up against the lug 724. Cooperating with the pivoted bar 760 is a one way pawl 770. A bracket 772 (Figure 46) is secured to the arm 630 by the pivot bolt 708 and has an upstanding portion 774 terminating in a horizontal lateral extension 776 to which is pivoted, as by pin 778, the one way pawl 770. As shown in dotted lines in Figure 52 the driving lug 724 is held by the shoulder 764 against movement to the right or outwardly of the groove 740. The lug 724 is normally urged in such direction by a spring 780 (Figures 48 to 50) fastened at one end to a pin 777 on the movable bracket 752 and at the other end to an upstanding pin 783 on the stationary bracket 700.

Between the side frames 2 and 4 of the machine a miter gear 442 (Figures 1, 63 and 64) is secured to the shaft 42. This gear meshes with a miter gear 444, which is secured to a shaft 446. To the upper end of the shaft 446 is secured a bevel pinion 448 which meshes with a bevel gear 450 secured to a horizontal shaft 452. An upright casting 454 is secured to the side 2 of the machine by bolts 456 and 458. This casting terminates in the journals 460 and 462 (see Figure 64) through which the shaft 452 is journalled. The shaft 446 is journalled in a bearing 461 (Figures 51 and 62) which is bolted to the upright 454 by the bolts 466 and in a bearing 470 which is bolted to the side 2 of the machine by the bolts 472 and 474 (Figure 1). On the opposite side of the machine the upright casting 476 (Figure 64) is bolted to the side 4 by the bolts 478. This casting terminates in the bearing 482 which also journals the shaft 452. A brace 484 is bolted between the uprights 454 and 476 by bolts such as 486 to give rigidity to the assembly. Projecting upwardly from the bearing 462 is the projection 488 which has secured thereto by bolts 492 and 494 a stationary cam 490 mounted on shaft 452. Also mounted on the shaft 452 is a stationary cam 496 which is secured to the bracket 498 which is bolted to the upright 476 by the bolt 500. A turret or spider 504 is secured to a flanged collar 506 which is keyed to the shaft 452. Slots 508 and 510 are provided in the flange of this collar to receive bolts 512 and 514 threaded into the turret to permit adjusting of the timing of turret 504 with relation to the orienting turret 34. The turret or spider 504 is provided with 4 holes 516 to 522 which receive the studs that hold the transfer gripper jaw assemblies hereinafter to be described.

A sprocket 526 is also adjustably secured to a collar 528 which is secured to the shaft 452. This sprocket 526 is for driving the in-feed conveyor and is provided with slots 530 and 532 through which the bolts 534 pass. This adjustment is necessary so that the feed conveyor can be properly timed to deliver the peaches into the orientator jaws at station U—U in Figure 15. It can thus be seen that the shaft 452 is rotated by the shaft 42, through the gears 442, 444, shaft 446 and gears 448 and 450. The only parts that rotate with the shaft 452 are the turret or spider 504 and the sprocket 526. The cam 490 and the cam 496 remain stationary.

Figures 64 to 67 show the details of the gripper jaws for the transfer turret. A plurality of the gripper jaws are mounted upon the transfer spider or turret 504. In the present instance there are four pairs of these jaws and each pair comprises two relatively movable jaws. These two jaws for purposes of illustration only may be referred to as an upper gripper jaw 560, and a lower gripper jaw 578, the jaw 560 comprising an elongated arm which has pivoted to its outer end clamp member 561 having a substantially V groove 562. This groove is provided to receive the projecting tip which is sometimes found on peaches. The inner end of this upper jaw 560 joins a boss 564 which is journalled on a stud 566 in turn screwed into the jaw carrier 568 (see Figures 67 and 68). A second arm 570 extends from the boss 564 and has mounted on its outer end a roller 572. Also projecting from the boss 564 is an arm 574 which has gear teeth 576 cut thereinto. The lower jaw 578 has at its outer end a knob 580 which enters the stem indent of the peach. The other end of the lower jaw comprises a hub 582 which is journalled about the stud 584 in turn screwed into the jaw carrier 568. This hub 582 also has an arm 586 having teeth which mesh with the teeth 576. A slot 588 is provided in the arm 586 and this slot has passing therethrough a pin 590 which is screwed into a boss 591 on the jaw carrier 568. This is for limiting the opening and closing of the jaw. A tension spring 592 is provided to urge the jaws toward each other. Each jaw carrier comprises the member 568 hereinbefore described and its raised portion 591 provides a bearing for the stud 596 which passes through one of the holes such as 516, 518, 520 and 522 in the turret to which it is held by the nut 598. The jaw carrier 568 also has a projection 600 which has a stud 601 mounting the roller 602.

*The second conveyor*

The second conveyor, fruit feeding mechanism or device 30 (Figures 1 to 4, 12 and 87 to 95) for feeding the oriented whole fruits past the splitting, spreading and pitting mechanisms, preferably comprises an endless conveyor consisting of a pair of sprocket chains 22a and 22b passing at the rear, discharge end of the machine over drive sprockets 35 and 37 adjustably secured, as by bolts 39 (Figure 87) received in arcuate slots 39' in the sprockets, two collars 35' and 37' (Figures 4 and 5) secured to a drive shaft 31 journalled in suitable bearing brackets 41 bolted to the side frame plates 2 and 4. The sprocket chains at their forward or feed-in end pass over sprockets 42' and 43' (Figures 2 and 88) fastened to the cross shaft 33 mounted in bearings 45' bolted to the side frame plates 2 and 4.

An elongated casting 1346, Figures 2 and 5, is bolted to the side frame plate 2 and has threaded into it a stud shaft 1347 (Figure 5). A hand wheel 1348 is mounted on the outer end of a rotatable sleeve 1349 on the stud shaft 1347, the sleeve being connectible by a manually operable clutch of any suitable construction to a drive pulley 1350 journalled on the sleeve 1349. The sleeve 1349 is connected or fixed in any suitable manner to a gear 1351. The pulley 1350 is driven through belt 1352 (Figures 2 and 3) from the slow speed shaft 29a of the combined motor and speed reducer 29. The gear 1351 meshes with and drives a larger gear 1353 journalled on a stud shaft 1354 carried by the casting 1346. The gear 1353 has attached to it a smaller gear 1355 which is also journalled on the stud shaft 1354, the gear 1353 meshing on one side with a drive gear 1356, secured to one end of the conveyor drive shaft 31 and on the other side with a gear 1357 secured to the outer end of a cross shaft 1358 journalled in suitable brackets bolted to the side frame plates 2 and 4.

The sprocket chains 22a and 22b, throughout their entire lengths, are provided with a series of equally spaced, whole fruit holders, cups or supporting devices 1360 (Figure 87).

Each whole fruit holder, cup or supporting device 1360 comprises a pair of half fruit holders, cups or cup sections 1362 and 1364, Figures 90 to 92 and 94. The inner wall 1369 of each of these cups is conical in form and the outer edges of the rim of each cup is cut away or relieved as at 1371. Each cup section is an internally cone-shaped, half fruit holder when the cups are "open" or "partially open." The half cups when in horizontal lowered position, as illustrated in Figures 90 and 92, form an open top, half fruit receptacle having conical internal surfaces. The two sections when in raised position, as illustrated in Figures 87, 88 and 94, form closed, whole fruit receptacles or clamps having opposed, conical, internal walls confronting each other along their base planes, but in spaced relation to a vertical plane coincident with the suture plane of the whole fruit.

The cup segments or sections 1362 and 1364 are formed integrally with lever arms 1366 and 1368 having bosses 1370 and 1372 (Figures 90 and 94) at their inner ends journalled on a shaft 1374. The shaft 1374 is mounted in bosses 1376 of opposite end brackets 1378, the shaft being held against rotation with respect to the brackets as by set screws 1380. The brackets 1376 are mounted on a carriage 1382 shown in Figures 90 to 93. This carriage comprises a central dependent body portion or block 1384 (Figure 93), and laterally extending arm portions 1386 and 1388 extending oppositely from opposite diagonal corners of the central body portion or block 1384. The end portions 1390 and 1392 of the arms 1386 and 1388 are offset oppositely so that their opposite side edges are aligned. Pairs of wheels or rollers 1394 are suitably journalled as at 1396 on each of the free ends of the portions 1390 and 1392 of the carriage. Carriage supporting shoes or slides 1398 are secured by screws or bolts 1400 to the undersurfaces of the portions 1390 and 1392 of the carriage. Chain attachment links 1402 and 1404 are bolted to the undersurface of the end portions 1390 and 1392 of the carriage arms 1386 and 1388, the chain attachment links 1402 being secured by bolts 1405, see Figure 92, and the chain attachment links 1404 having their side flanges received in notches in the upper surfaces of the shoes 1398 and each secured to the carriage by one of the bolts 1400 by which its associated shoe is secured. It should be noted that the end portions 1390 and 1392 of the carriage arms 1386 and 1388 are recessed in their upper surfaces as shown in Figure 92 to receive the bottom portions of the cup segments 1362 and 1364 so that the cup segments may be swung into an open horizontal or near horizontal position as shown in Figure 92.

The cup halves 1362 and 1364 are operated by racks 1406 and 1408, Figures 4 and 92 to 95, the rack 1406 being bolted to one edge of a slide block 1410 and extending upwardly therefrom while the rack 1408 is bolted to the opposite side edge of a like block 1412. An actuating roller 1414 is journalled on a bolt threaded into the side of the rack 1408 adjacent its lower end. The blocks are secured to a lateral extension or arm 1415 having spaced holes 1416 receiving bolts 1418 and 1420 fastening the parts. The blocks 1410 and 1412 are formed on their inner surfaces with longitudinally extending guide slots 1422 and 1424 receiving guide projections or splines 1426 and 1428 respectively formed at diagonally opposite corners of the central body portion 1384 of the carriage. The mounting brackets 1378, Figures 91 and 93, for the cup carrying shaft 1374 are formed with horizontal arms apertured to receive mounting bolts by which the arms are secured to opposite edges of the arms 1386 and 1388 of the carriage 1382. The brackets are also formed with depending portions 1430, cooperating with the vertical, recessed surfaces 1432 and 1434 of the central block 1384 of the carriage to form spaced guide surfaces for the slide blocks 1410 and 1412 carrying the racks 1406 and 1408. Recesses 1436 and 1438, formed in the edges of the arms 1386 and 1388, cooperate with the opposed side surfaces 1440 of the body portion 1384 to form guide surfaces for the racks 1406 and 1408. Each bracket 1378 is also formed with a horizontal shelf portion 1450, see Figure 93.

A spring 1452, Figures 90 to 92 and 94, urges the cup segments to raised position or to a position substantially at right angles to the carriage 1382. This spring 1452 is a coil spring which at its lower end encircles a pin 1454 and bears upon the extension or arm 1415, see Figures 92 and 94, and encircles at its upper end a pin 1456 and bears upon the underside of the shelf-like portion 1450 of the bracket 1378 with which the slide block 1412 is associated.

It should be noted that the rack 1406 meshes with gear teeth 1460 (Figures 90 and 92) formed on the mounting boss 1372 for the cup segment 1364 while the rack bar 1408 meshes with the gear teeth 1462 formed on the mounting boss for the cup segment 1362. Hence, as the racks 1406 and 1408 are lowered the cup segments 1362 and 1364 are raised and as the racks 1406 and 1408 are raised the cup segments are lowered.

Each cup holder carriage 1382 is confined or restricted, in its movements along the upper flights of the chains or conveyor, to a definite horizontal plane without deviation or deflection therefrom as it passes from the front end of the machine to the rear end of the machine between the sprockets 42' and 43', Figures 2, 87, and 88, and the drive sprockets 35 and 37, Figures 2, 4 and 87. This confining, restricting or guiding of the movements of each carriage 1382 is accomplished by a pair of guide tracks 1464 and 1466, Figures 4 and 87 to 89, mounted on the outer ends of brackets 1468 and 1470 respectively secured to the side frame plates 2 to 4. The guide tracks 1464 and 1466 cooperate with the slide shoes 1398 secured to the under surface of each carriage 1382, the shoes riding on the upper surfaces of the guide tracks 1464 and 1466 so as to support the carriage against movement in a downward direction. The rollers 1394 at the opposite sides of each carriage 1382 engage and roll along overhanging guide tracks 1472 and 1474, Figures 4 and 87 to 89, supported on the outer end of brackets 1476 and 1478 respectively secured to the side frame plates 2 and 4. The guide tracks 1472 and 1474 serve as a guide confining the carriages against upward movement from the front to the rear of the machine along the upper flight of the chains or conveyor. It will be evident that the confining or guiding tracks 1464, 1466, 1472 and 1474 serve not only a guiding function but also serve a clamping function in that they clamp the carriage against vertical movement so that by forces applied to the rollers 1414 or by springs 1452 to the slide block 1412, the racks 1406 and 1408 may move up or down to swing the cup segments to the various positions. These tracks serve also to take the load of the carriages off the chains so that relatively light sprocket chains or conveyors may serve to move the carriages and hence convey the fruit holders through their designed path. The movements of the carriages along the lower track of the chains or conveyor, from the rear to the front end of the machine, are guided and the carriages supported by tracks 1476 and 1478, Figures 4 and 87, secured to the outer end of brackets 1480 and 1482 respectively secured to the side frame plates 2 and 4. The rollers 1394 of each carriage engage and roll on the upper surfaces of the tracks 1476 and 1478 and thereby support the weight of the carriages and thereby relieve the chains of that weight and decrease the bearing pressure on shafts 31 and 33. The cup segments are moved to open positions or to partially open positions, and allowed to move to closed positions as they are moved continuously along their endless path by a plurality of cam, guide or control tracks, engaging the rollers 1414, as best seen in Figures 5 and 87 to 89. These tracks comprise a plurality of generally flat tracks 1481, 1483 for controlling the cup segments, the track 1481 extending from a rear, inclined cam surface 1484 to a forward cam surface 1485 concentric to the axis of the shaft 33. The cam surface 1485 terminates in an abrupt, convex cam surface 1486 (permitting rapid closing of the cup sections). The cam surface 1486 is followed by a cam surface 1487, concentric to the shaft 33 and extending from surface 1486 to the flat track 1483.

A track 1490, adjacent the rear sprocket, controls the positioning of the two cup segments in partially open position for cooperation with the pitting or deseeding mechanism. This track is aligned longitudinally of the machine with track 1483 so as also to engage the actuating roller 1414 of the cup segments. This track 1490 has at its forward end an inclined, camming section 1492 which engages and raises the actuating rollers 1414. This track has also an intermediate recessed portion or surface 1494 which permits the actuating roller 1414 to drop down, thereby raising the cup segments slightly to position the fruit halves in proper engagement with the pitting mechanism. The track 1490 at its rear end merges into a curved track or surface 1496 which is concentric to the axis of the drive shaft 31. The guide surface 1496 may be provided by a disk or collar in which the shaft 31 is journalled but which is held against rotation by being pinned or otherwise secured to the stationary track 1490, the track 1490 being fixed to brackets 1500, Figure 5, secured to the carriage track 1464. It should be noted that the portion 1502 of the track 1490 between the recessed portion 1494 and the arcuate surface 1496 is of greater height or thickness than the flat portion of the track in advance of the recess 1494 so that while the cup sections are partially opened as the cup control rollers 1414 reach the recess 1494 they are fully opened as the cup rollers 1414 pass from the recessed portion 1494. The arcuate surface 1496 retains the cup sections in fully open position as the rollers 1414 move around the drive sprockets 35 and 37. The tracks 1481 and 1483 may be secured in any convenient manner, as by brackets 1504, Figure 5 (of which one only is shown) to the carriage track 1464, the tracks 1464 and 1466 having at their forward ends concentric circular surfaces interfitting concentric, recessed surfaces in the shoes 1398 as shown in Figure 89.

A cam track 1505, Figure 87, extending forwardly from the cam surface 1496 retains the rollers 1414 in lowered position until they pass forwardly beyond the shaft 31 and parts secured thereto.

In addition, an auxiliary control device, track or guide 1506 (Figures 5 and 87) is provided for actuating the roller 1414 of the cup segments to supply an auxiliary additional tension to the cups during the splitting or sawing operation. The track 1506 comprises a bar extending longitudinally in alignment with the plane of the track 1483. Track 1506 is provided at its forward end with an inclined cam surface 1510 under which the roller 1414 is adapted to pass and to be depressed by the track as the cup carrier advances. The track 1506 is mounted on spaced bars 1512 and 1514, the bar 1512 being secured to a rod 1516 journalled in spaced brackets 1518 bolted to the under surface of the carriage track 1464. The bar 1514 is also secured to the rod 1516 but passes beyond said rod to overlie at its free end a coil spring 1519 which bears at its lower end on a washer adjustably mounted on a vertical rod 1520 (Figure 87) supported by and upstanding from a bracket 1522 bolted to the side frame plate 2, the other end of the spring 1519, acting through the pivoted bar 1514 to depress the track 1506.

The splitting and sawing mechanism and the separating and spreading mechanism The splitting or sawing mechanism 1286 comprises, as best shown in Figs. 2, 3, 87 and 96, a rotary saw 1600 secured to a shaft or arbor 1602 which is journaled in an arbor housing 1604 that extends through a suitable opening in an upstanding portion of the side plate 4. The arbor housing is secured to said side plate as by brackets 1606 bolted to the end of the arbor housing and also bolted to the side plate. The arbor shaft 1602 extends beyond the arbor housing 1604 on the right side of the machine as shown in Fig. 3 and has secured to it a pulley driven by a belt 1610 in turn driven by a pulley 1612 secured to the high speed shaft 29b of the combined motor and speed reducer 29. The shaft 1602 also has secured to it a fly wheel 1614 which equalizes the rim speed of the saw while the pit of the peach is being cut in two.

The saw arbor housing 1604 is also supported by a bracket 1616 having an upper horizontal plate portion 1618, Fig. 2, bolted to the top plate 3 and a lower horizontal plate portion 1620 bolted to the saw arbor housing.

The separating or spreading mechanism 1288 comprises four stationary separating or deflecting blades or members 1622, 1624, 1626 and 1628, Figure 96, the members 1622 and 1624 being formed at their rear ends with an integral cross member including a vertical wall 1630, Figure 97, and a horizontal bar 1632. The bar 1632 is mounted on a cross member 1634 as by bolts 1636, the cross member 1634 being secured in any desired manner to the upstanding portions of the side plates 2 and 4. The spreader members 1622 and 1624 are adjustably connected and reinforced intermediate their ends by a cross rod 1638 received in notches in the upper ends of reinforcing straps 1640 spot welded or otherwise fixed to or formed integrally with the spreader members. The cross rod 1638 is adjustably secured to each of the straps 1640 by means of opposed clamping nuts 1642. By adjusting of the rod 1638 and the clamping nuts 1642 the spacing of the spreader members 1622 and 1624 may be adjusted relative to the saw 1600 to obtain the proper clearance between the saw and the spreader blades.

The front spreader members 1626 and 1628 comprise sheet metal members fastened at their rear ends as by screws 1644 appropriately countersunk in the spreader plates 1626 and 1628 so as to be flush with the surface of those plates. The spreader plates 1626 and 1628 closely approach at their forward ends the plane of the saw 1600 and may be beveled at their forward edges so that the fruit halves split or sawed by the blade 1600 pass readily from the saw blade onto the opposite surfaces of the spreading or deflecting members 1626 and 1628. The form of the spreader members or blades 1622, 1624, 1626 and 1628 will be evident from Figs. 96, 97 and 99 to 108. As clearly illustrated in Fig. 96, the spreader member formed by the spreading or deflecting blades 1622 and 1626 on the one side and the spreader member formed by the deflecting blades 1624 and 1628 on the other side diverge from their forward to their rear end in a horizontal plane and as evident from Figs. 99 to 108, diverge from bottom to top in a vertical plane.

The forward end portions of the blades in horizontal sections are substantially parallel to the saw as can be seen in Fig. 96, and in vertical sections they diverge from bottom to top quite gradually, as will be seen from Figure 99. These forward end portions thus effect a gradual divergence of the peach halves from the plane of the saw while they are engaged by or in contact with the splitting saw.

Just in advance of the transverse plane, represented by the section line 101—101 in Figure 97, the spreader blades 1626 and 1628 begin to bow or curve outwardly slightly, as illustrated in Figure 101, and are thereafter of constantly and gradually increasing curvature in a vertical plane, as seen in Figures 103 and 105, until the transverse plane 105—105 is reached, after which the spreader blades are of rapidly decreasing curvature, as seen in Figure 107. Between the vertical planes, indicated by lines 101—101 to 107—107 in Figure 97, the blades 1626—1628 and the blades 1622—1624 diverge in a horizontal plane at a uniform increment so as to effect a uniform horizontal spreading of the peach halves and of the cups in which the peach halves are carried. The forward end of the doubly-divergent, convex portions of the spreader blades merges gradually into the forward end portions of the spreader blades, as shown in Figure 96. The rear end portions of the spreader blades 1622 and 1624 are provided with horizontal wires 1644 to prevent the peach halves from turning in the cup sections as they approach the spread-apart position which they will occupy during the pitting operation.

Applicant has found that movable spreader blades or wings restrict or limit the capacity of a continuously moving pitting machine and a smoother action in spreading the fruit and the carrying cups is necessary as the speed and hence the capacity of the machine are increased. It is difficult to illustrate the exact relative positions of the peach halves as the fruit is moved along the spreader blades, as these positions will vary somewhat depending upon the size of the peach. In the illustrative diagrams of Figures 99 to 109, the relative positions of the half peaches in the cups are represented for an average size peach of approximately 3" in diameter.

During the time the peach halves travel over the spreader blades, the peach halves are pressed toward and into contact with the spreader blades by the spring 1452 which urges the cup sections toward each other.

In Figures 99, 101, 103, 105 and 107, the peach halves are illustrated as though they were traveling on a horizontally straight surface rather than on surfaces of continually increasing divergence in a horizontal plane. These views, however, serve to show that as the peach travels along the horizontal path, each half peach turns in its cup on a horizontal axis. Thus, it will be noted that as each half peach passes over its spreader blade surface, the distance between the edge 1362b of the cup section 1362 and the spreader blades 1626 and 1622 decreases while the distance between the lower edge 1362c of the cup section and those spreader blades increases. Similarly, as shown in Figures 99, 101, 103 and 105, as the opposite peach half travels horizontally along the spreader blades, the distance between the upper cup edge 1364b and the spreader blades 1628 and 1624 decreases while the distance between the spreader blades and the lower edge 1634c of this cup section increases. These distances decrease and increase respectively until the peach has reached the position shown in Figure 107, after which the turning of the peach halves in the cup sections is prevented by the wires 1644.

Figures 100, 102, 104, 106 and 108 are plan views looking down upon the peach half in the cup section 1364. From these views it will be noted that the distance between the leading edge A of the peach half and the leading edge 1364d of the cup section 1364 decreases while the distance between the trailing edge B of the peach half and the trailing cup edge 1364e of the cup section 1364 increases as the peach half moves along the spreader plates 1628 and 1624. It will be understood that the peach half in the cup section 1362 similarly moves in that cup section as exemplified in Figures 102, 104, 106 and 108. Thus, as shown in these figures, the peach halves also turn in the cups on vertical axes. Experience in the use of the machine clearly demonstrated that notwithstanding this turning of the peach halves in the cups about both horizontal and vertical axes, the long axis of the pit is not moved out of its predetermined position or orientation with respect to the longitudinal axis of the machine. The theory why this maintenance of orientation takes place is not clearly understood. However, it is believed that the engagement of the hard flat surface of each half peach with the crown of the curve of each spreader blade, at points 1626c, 1628c, 1622c, and 1624c enables these crown points of the curve of the spreader blades to act as fulcrum points for the turning of the peach halves about horizontal axes, which fulcrum points lie in the long axes of the pits so that the long axes of the pits in effect serve as the horizontal axes of turning of the peach halves occasioned by the vertical divergence of the spreader blades. As each half peach moves along the spreader blades, the flesh of each peach half slightly folds itself around the long curve of the spreader blades, thereby keeping the long axis of each pit in proper position of orientation longitudinally of the machine even though the peach is turned about vertical and horizontal axes relative to the cup sections.

In Figure 99 the half peaches are shown as traveling across the surface of the spreader blades in advance of the curved portions thereof, at which time the peach halves have just been released from the effects of the added pressure of the spring 1519, and therefore do not start to turn in the cup sections until the exposed surfaces of the half pits engage the crown points of the convex surfaces of the spreader blades.

As the peach halves approach the position shown in Figures 107 and 108, the roller 1414 for actuating the cup sections reaches the inclined end 1492 of the cam track 1490 and the cup sections begin to swing outwardly under the action of the cam track. Between that position and the position shown in Figure 109, the peach halves continue to move along surfaces of the diverging spreader blades which are substantially flat in vertical section and the wires 1644 prevent turning of the peach halves in the cup sections while the continuing divergence of the spreader blades cause the peach halves to move outwardly or to be spread with the outwardly spreading cup sections so that the peaches remain fully seated in the cup sections until said sections have been spread apart sufficiently for the peach halves to remain seated in the cup sections by the action of gravity. The wires 1644 also establish restricted areas or zones of sliding contact between the spreader blades and peach halves so as to overcome the tendency of the peach halves to stick to surfaces in which they are in face to face contact.

The cut away leading edges 1371 of the cup sections, as illustrated in Figure 98, permit smaller peaches to be firmly held against the spreader blades. Applicant found that with the smaller peaches the cup sections, unless relieved along the leading edges, as shown in Figure 98, would so confine or grip the peaches that could not turn relative to the cup sections while moving along the spreader blades, and the orientation thereof was, at times, adversely affected by the spreader blades. Thus, at times, the smaller peaches would not be properly presented to the pitting mechanism and the pit cavities formed in the peach halves would be out of line with the stem blossom axis of the half peaches. Applicant found that the relieving of the leading edges of the peach cups cured the difficulty by enabling the smaller peaches to be held firmly against the spreader blades.

*The pitting or deseeding mechanism*

The pitting, deseeding or coring mechanism 1290, Fig. 2, comprises a traveling frame 1770, best shown in Figs. 115 and 120. As there shown, the frame 1770 comprises longitudinal bar portions or arms 1772 and 1774 joined adjacent their forward ends by an integral cross bar 1776. The frame 1770 is pivotally mounted, by studs 1778 and 1779, on the upper ends of parallel links 1780, 1782, 1784, and 1786, Figs. 2, 4, 5, 10, 117 and 120. The parallel links 1780 to 1786 inclusive are journalled on parallel cross shafts 1788 and 1790, Figs. 2 and 4, journalled in suitable bosses provided in brackets such as 1792, Fig. 2, bolted to side frame plates 2 and 4. The pitter headframe 1770 is moved "forwardly" with respect to the moving fruit cups (but rearwardly of the machine) from the "rearward" position shown in dotted lines in Fig. 2 to the "forward" position shown in full lines in said figure, by a stud 1794, Fig. 5, on which is journalled a cam roller 1796 (Fig. 110) received in an internal cam track 1797 of a cam 1798 secured to the end of the shaft 1358.

A pitter headframe carries a pair of knife mechanisms 1806 and 1808, Fig. 118; a pair of pitter pad and knockout assemblies 1810 and 1812, Figs. 114 and 118, and a pair of pitter knife operating mechanisms 1814 and 1816, Fig. 117.

The pitter knife mechanisms 1806 and 1808 comprise four curved pitter blades or scoops 1818, 1820, 1822 and 1824 mounted in pairs, the pitter blades 1818 and 1820 being bolted to bars 1826 and 1828 while the blades 1822 and 1824 are bolted to bars 1830 and 1832. The bars 1826 and 1828, Fig. 114, are formed with depending, right angle end portions forming bosses 1834 at one end and bosses 1836 and 1837 at the other end. The boss 1836 is pinned or otherwise secured to a shaft 1838 and the boss 1837 is pinned or otherwise secured to a sleeve 1840, the shaft 1838 being journaled in the sleeve 1840 and the sleeve 1840 being journaled in a boss 1842 formed in a bracket 1844, best shown in Fig. 116. The bracket 1844 has a generally triangular vertical portion 1846; a horizontal plate portion or shelf 1848, and bosses 1842 and 1850 formed integrally with the plate portions 1846 and at the base corners thereof.

The shelf 1848 rests upon the cross bar 1776 of the pitter head frame 1770 and is secured thereto as by bolts 1852, Figs. 117 and 120, received in slots 1854, Fig. 116, in the shelf 1848 and threaded into the cross bar 1776. Slots 1854 permit ready adjustment of the bracket 1844 laterally of the pitter head frame 1770 so that the pitter knife mechanisms 1806 and 1808 and the pitter pad assemblies 1810 and 1812 may, by adjustment laterally of the conveyor, be properly aligned with respect to the fruit cups. The pitter knife mounting bars 1830 and 1832 of the pitter knife mechanism 1808 are identical to the pitter knife mounting bars 1826 and 1828 of the pitter knife mechanism 1808 and are provided at one end with a boss (not shown) similar to the boss 1836 and a boss 1857, Fig. 119, similar to the boss 1837, these bosses being secured to a shaft 1858 and a sleeve 1860. Bars 1830 and 1832 are formed at their opposite ends with bosses, not shown, but similar to the bosses 1834 of bars 1826 and 1828. The bosses 1834 of the knife mounting bars 1826 and 1828 are journaled on a stud 1861, Fig. 114, bolted to the depending flange or leg 1862 of a mounting bracket 1863 having a horizontal plate portion 1864 extending over those knife mounting bars. The bracket 1863 is formed at its other end with an upstanding flange 1866 bolted to the vertical plate portion 1846 of the bracket 1844. The knife mounting bars 1830 and 1832 are similarly journaled on a stud 1870, Fig. 118, bolted to the depending rear leg of a bracket 1873 identical to the bracket 1863 and having a plate portion 1874 extending over the knife mounting bars 1830 and 1843. The bracket 1873 is also formed with an upstanding front end flange similar to the flange 1866 of the bracket 1863 and similarly bolted to the vertical plate portion 1846 of the common bracket 1844. As clearly seen in Fig. 118, the brackets 1863 and 1873 are so mounted that the plate portions 1864 and 1874 are inclined to the vertical at equal, opposite angles and are symmetrically disposed with respect to the central vertical plane of the machine.

The pitter pad assemblies 1810 and 1812 comprise main hold-down pads or plates 1878 and 1880 respectively, contacting the exposed surfaces of the fruit halves when the fruit halves are properly positioned by the fruit cups. These main pads are centrally apertured, as at 1882 and 1884, to expose the pit or seed containing section of the fruit halves and permit passage of the pitting or deseeding knives into engagement with the exposed faces of the fruit halves and to pass around the pit or seed containing sections of the fruit halves. The main pad or plate 1880 is adjustably mounted by bolts 1886, Fig. 114, on the plate portion 1864 of the bracket 1863. The main pad 1878 is similarly, adjustably mounted, by bolts, not shown, on the plate portion 1874 of the bracket 1873. The pitter pads may therefore be adjusted, by adjustment of the aforementioned bolts, toward and from the fruit holding cups so that the pitting mechanism, by change in the pitter blades, may be made to accommodate different grade-sizes of fruit halves. This adjustment also permits raising or lowering of the pads 1878 and 1880 so that the blades can be set to cut deeper or shallower depending on the size of pit.

The pad assemblies also comprise knock-out pads 1890 and 1892 positioned at the centers of the apertures 1882 and 1884 of the main pitting pads. The knock-out pads are threaded on plunger rods 1894 and 1896 to which are secured collars 1898 and 1900 slidably mounted in tubes 1902 and 1904 threaded into the plate portions 1864 and 1874 of the brackets 1863 and 1873. The plungers 1894 and 1896 are also slidably mounted in apertured plugs 1906 and 1908 threaded into and closing the upper ends of the tubes 1902 and 1904. Coil springs 1910 and 1912 are interposed between the collars 1898 and 1900 and the plugs 1906 and 1908 and therefore normally urge knock-out pads 1890 and 1892 downward so that their lower surfaces are normally disposed below the planes of the lower surfaces of the main pads 1878 and 1880. The springs of the knock-out pad assemblies readily yield as the fruit halves are brought by the raising of the cups into engagement with the main pads so that the knock-out pads are moved upwardly to have their lower surfaces in the planes of the lower surfaces of the main pads when the fruit halves are brought into engagement with the main pads, as shown in Fig. 118. These knock-out pad assemblies apply, through the pits or seed sections of the fruit halves, compressive forces on the flesh of the fruit halves in the paths of the pitting knives so that the pitting knives may make a clean cut about the pits or seed containing sections. On dropping of the cups away from the main pitter pads, after the pitting has been accomplished, springs 1910 and 1912 push the knock-out pads out or downwardly to free the fruit halves from the main pads should they tend to stick thereto.

The pitter knife operating mechanisms 1814 and 1816, Fig. 117, comprise gear segments 1914—1916 and 1918—1920, respectively. The gear segments 1914 and 1918 are pinned to the shafts 1838 and 1858 and the gear segments 1916 and 1920 are pinned to the sleeves 1840 and 1860. The central portion of the segmental gear 1918 is offset from the toothed rim thereof, as shown in Fig. 119, so as to interfit with the segmental gear 1920 and permit the teeth of the segmental gears 1918 and 1920 to lie in the same plane transverse to the axis of the shaft 1858 and sleeve 1860. The segmental gears 1914 and 1916 are similarly interfitted so that the teeth thereof lie in the same plane transverse to the axis of the shaft 1838 and the sleeve 1840.

The segmental gears 1914, 1916, 1918 and 1920 intermesh with rack bars 1922, 1924, 1926 and 1928 respectively, the rack bars 1926 and 1928 being bolted, as shown in Fig. 119, to a cross head 1930 and the rack bars 1922 and 1924 being similarly bolted to a cross head 1932. The cross head 1932 is bolted at its upper end to a rack bar 1934, Fig. 114, slidably mounted in guides formed by the front face of the upstanding arm of a bracket 1938 and side bars 1940, Fig. 117, bolted to the upstanding arm of the bracket 1938. The bracket 1938 is provided with an inturned foot portion or flange 1942 secured to the shelf 1848 as by bolts 1944. The cross head 1930 is similarly bolted at its upper end to rack bar 1936, Fig. 117, slidably mounted in guides formed by the front face of the upstanding arm of a bracket 1939 similar to the bracket 1938 and between the side guide bars 1946, the bracket 1939 being mounted on the shelf 1848 of the bracket 1844 in the same manner as is the bracket 1938.

The cross heads are raised by spring action, following a pitting operation, to return the pitting knives to open position. For that purpose the cross heads 1930 and 1932 are provided with threaded rods 1954 and 1956 threaded into lateral lugs, as 1958 and 1959, of the cross heads. These rods are slidably mounted in the shelf portions of brackets 1960 and 1962 which are bolted to the brackets 1938 and 1939 and are provided with suitable slots permitting passage of the rack bars 1934 and 1936. The rods 1954 and 1956 are encircled, above the shelves of the brackets 1960 and 1962, by coil springs 1964 and 1966 which bear at their lower ends on the shelves of the brackets 1960 and 1962 and at their upper ends on washers underlying nuts 1968 and 1969 threaded on the upper ends of the rods. The cross heads 1930 and 1932 are moved downwardly against the action of the springs 1964 and 1966, by segmental gears 1970 and 1972, Figs. 113 and 116, meshing with the rack bars 1934 and 1936, as illustrated in Fig. 114. The segmental gears 1970 and 1972 are fastened to shafts 1974 and 1976 respectively (Figs. 113 and 117), which are journaled in bosses formed at the upper ends of the brackets 1938 and 1939 and are axially aligned. The shaft 1974 is adjustably connected to the shaft 1976 by means of a lever 1978 fastened to the shaft 1974 and a lever 1980 fastened to the shaft 1976. Lever 1980 is preferably formed with a split boss 1982 clamped to the shaft 1976 by the bolt 1984. The lever 1980 is formed with an arcuate slot 1986 receiving a clamping bolt 1988 threaded into an aperture 1990 in the lever 1978. A set screw 1992 received in a threaded aperture extending through the side of the lever 1980 communicating with the slot 1986, provides means for adjusting clamping bolt 1988 arcuately of the lever 1980 and hence serves to adjust the lever 1978 relative to the lever 1980. The set screw 1992 is held in adjusted position as by clamping nut 1994.

The shaft 1976 is also journaled in a boss 1996 of a bracket 1998 bolted to and upstanding from a generally triangular supporting plate 2000 secured to the pitter head frame 1770, as by the bolts 1779 which pivotally connect the frame carrying links 1784 and 1786 to the pitter head frame, as shown in Fig. 120.

A cam 2002, Figs. 5 and 110, secured to the shaft 1358 adjacent the pitter head actuating cam 1798 operates a pitter knife actuating lever 2004. The lever 2004 is pivoted intermediate its ends on a stud 2006 supported by brackets 2008 and 2010 bolted to the side frame plate 4. The lever 2004 carries at its lower end a stud on which is journaled a cam roller 2012, the lever being urged in a counterclockwise direction, as seen in Fig. 110, so as to maintain the cam roller 2012 in engagement with the cam 2002 by coil spring 2014 encircling a rod 2016 pivoted at one end to the lever 2004 and slidably mounted in an outwardly extending arm of a bracket 2018 bolted to the side frame plate 4. The spring 2014 bears at one end against the bracket 2018 and at the other end against an annular shoulder 2020 formed on the rod 2014. The lever 2004 is connected to and actuates the shaft 1976, and through it the shaft 1974, by an internally threaded coupling 2022 pivoted to the upper end of the lever 2004; a coupling 2024 adjustably connected as hereinafter described to the shaft 1976 and a threaded adjusting rod 2026 threaded into the couplings 2022 and 2024 and held in adjusted position by the clamping nuts 2028 and 2030.

The coupling 2024 is adjustably connected to the shaft 1976 by means of a lever 2032 journaled on the shaft 1976 and a lever 2034 preferably formed with a split boss 2036 clamped to the shaft 1976 as by bolt 2038. A pivot bushing 2040 inserted in the boss of the coupling 2024 is journaled on a mounting bolt 2042, Fig. 117, received in a longitudinally inclined slot 2044 in the lever 2032. The bushing 2040 is of a length slightly greater than the width of the boss portion of the coupling 2024 and a washer 2046 on bolt 2042 retains the coupling on the bushing but permits the coupling and bushing to rotate relatively. A nut 2048 on the other end of the bolt clamps the bolt and bushing in adjusted position in the slot 2044 of the lever 2032. A set screw 2050 threaded into the lower end of the lever and projecting into the slot 2044 provides means for adjusting the bolt 2042 longitudinally of the slot to vary the angle of throw of the lever 2032 and thereby vary the angle of swing of the pitting blades actuated by the shafts 1974 and 1976. The usual clamping nut 2052 retains the set screw 2050 in adjusted position. The lever 2034 is formed with an arcuate slot 2054 receiving a bolt 2056 threaded in an aperture 2058 in the lever 2032. A set screw 2060 threaded into an aperture in the edge of the lever projects into the slot 2054 so as to adjust the bolt 2056 relative to the lever 2034.

It should be noted, as shown in Fig. 111, the slot 2044 in the lever 2032 is in vertical position when the pitting blades are closed around the pit. Consequently, adjustment of the stud bolt 2042 up or down in the slot does not change the position of the blades when closed under the pit but allows the blades to open to a greater or lesser extent depending on the direction of adjustment of the stud bolts in the slot. On loosening of the bolts 1988 and 2056 the set screws 1992 and 2060 may be adjusted to cause the pitting blade units 1806 and 1808 to operate together, that is, to cause the blades of the two units to close the same amount and to open the same amount.

It should be noted that the cup closing spring 1452 supplies a compressive force urging the cut surfaces of the fruit halves into engagement with the apertured plates 1878 and 1880 of the pad assemblies 1810 and 1812. Auxiliary means 2062, Fig. 2, provides additional or auxiliary compressive forces urging the cut faces of the fruit halves into engagement with the apertured pitting pads during the swinging of the pitting knives about the half pits. This means 2062 comprises, as best shown in Figs. 2, 117, 118 and 120, brackets 2064 and 2066 bolted to the longitudinal arms 1772 and 1774 of the pitter head frame 1770. Each of these brackets is formed with integral spaced depending arms 2068 terminating at their lower ends in bosses 2070. A shaft 2072 is journaled in the bosses 2070 of the bracket 2064 and a shaft 2074 is journaled in the bosses of the bracket 2066. A lever 2076 is fastened to the inner end of the shaft 2072 while a like lever 2078 is fastened to the inner end of the shaft 2074, these levers carrying at their free ends rollers 2080 and 2082 respectively for engaging and pressing the cup sections 1362 and 1364 upwardly and toward the apertured pitting pads 1880 and 1878, as illustrated in Figs. 117 and 118, when the shafts 2072 and 2074 are actuated. The shaft 2072 is actuated by means of a yoke 2084 having at one end a boss 2086 fastened to the shaft 2072 while its other end is connected by a universal joint 2088 to a vertical actuating rod 2090. The shaft 2074 is connected with the actuating yoke 2084 for simultaneous actuation of the shaft 2072 by means of a lever 2092 pinned to the forward end of the shaft 2074 and connected by a pitman or rod 2094 to a lever 2096 which may be formed integrally with the actuating yoke 2084, the rod 2094 being pivoted at its opposite ends to the levers 2092 and 2096. The vertical actuating rod 2090 is slidably received relatively adjacent its lower end in a block 2098 pivoted on an axis transverse to the rod. The pivot studs for the block 2098 are received in suitable apertures in the outer end of a lever 2100 and in a block 2102 riveted or bolted to the lever 2100. A coil spring 2104 is interposed between a collar 2106 bearing against the under surface of the block 2098 and a nut 2108, Fig. 2, threaded on the lower end of the actuating rod 2090. The lever 2100 is pivotally mounted on a headed stud or bolt 2110 secured to the side frame plate 2 and carries a cam roller 2112 operated by an actuating cam 2114 fastened to a shaft 2116 journaled in a suitable bracket, not shown, secured to the side frame plate 2. The shaft 2116 is provided with a drive gear 2118 to mesh with the chain conveyor drive gear 1356. The cam roller 2112 is maintained in engagement with the cam 2114 by a coil spring 2120 mounted on a rod 2122 slidably mounted in the laterally extending shelf of a bracket 2124 fastened to the side frame plate 2. The coil spring 2120 is interposed between a spring retainer carried by the shelf of the bracket 2124 and a nut and washer 2126 secured to the upper portion of the rod 2122, the rod being secured at its upper end to a yoke 2128 pivotally secured to the lever 2100. The coil spring 2120 serves not only to maintain the roller 2112 in engagement with the cam 2114 but also, being normally stronger than the spring 2104, serves normally to maintain the rod 2090 in elevated position so that the rollers 2080 and 2082 are out of the path of the traveling pitter cups. The spring 2120 acts upon the rod 2090 through the lever 2100 and a collar 2130 adjustably fastened to the rod 2090. When the cam 2114 depresses the roller 2112, and thereby depresses the lever 2100, the spring 2120 is rendered ineffective to urge the rod 2090 upwardly and the spring 2104 is compressed thereby urging the rod 2090 downwardly and thereby rotating the shaft 2072 in a counterclockwise direction, as seen in Fig. 120, while rotating the shaft 2074 in a clockwise direction, as seen in the same figure, so that the rollers 2080 and 2082 engage the cup sections 1362 and 1364 and thereby apply the additional compressive force of the spring 2104 to the fruit halves thus urging the cut surfaces of the fruit into still firmer engagement with the apertured pitting plates 1878 and 1880.

*Operation of the machine*

The combined motor and speed reducer 29 continuously drives the conveyor 30, as previously described, by continuously rotating the shaft 31 in a clockwise direction, as seen in Fig. 2, to cause the upper flights of the conveyor chains 22a and 22b to pass from the sprockets 42' and 43' to the sprockets 35 and 37. The drive shaft 350 of the fruit feeding hopper and conveyor, the turret 34 of the orienting mechanism and the drive shaft 452 of the fruit transferring mechanism are driven in synchronism with the conveyor 30 through the sprocket 44 secured to the shaft 1358 of the conveyor 30 and the chain 46, all as previously described.

The orienting wheel units are revolved by the orienting turret 34 to which they are secured, and the orienting wheels are severally rotated by the combined motor and speed reducer unit 20 through the drive connections previously described. The orienting wheel units are also vibrated by the combined motor and speed reducing unit 20 as previously described in such manner that the vibrating of these orienting wheels takes place while they are raised out of engagement with their driving spools.

Peaches are fed into the machine by means of the conveyor belt 308, Fig. 7, which may be driven by any suitable external power source, not shown. The fruit fed by the belt is delivered by the conveyor to the hopper 310 by which they are delivered in the manner as previously described in a single row stream of peaches to the orienting mechanisms of the continuously moving turret 34. Surplus peaches are removed from the peach feeding conveyor by the bar 430 of the wiping means so that the peaches as they are fed to the turret of the orienting mechanism are spaced a uniform distance apart and delivered in proper spaced-apart relation to the receiver 418 so that as the pair of gripping jaws 86 and 88, in open position as shown in Fig. 15, passes over the receiver 418, a single peach is delivered into the space between these open jaws. The peach rolls along the bottom plate 424 of the receiver as the turret revolves, being urged therealong by the clamping jaw 86. While traveling over the receiver 418 and after the peach has been dropped between the jaws, the associated roller 158 of the clamping jaw unit reaches the dip 802' of the stationary actuating cam 802 thereby allowing the jaws 86 and 88 to grip the peach before it reaches the end of the bottom plate of the receiver. As previously described, the roller 158 moves into the dip 802' variant distances determined by the sizes of the peaches gripped between the jaws 86 and 88 so that as the jaws move from Station V—V to Station W—W, Fig. 15, the jaws are moved apart a predetermined amount to provide a uniform clearance for the free rotation of the fruit regardless of the size of the fruit. As the peach gripped between the jaws moved from the receiver to Station V—V, the wheel of an orienting unit associated with the particular pair of gripping jaws 86 and 88 is raised by the cam tracks or rings 252 and 254 so as to contact or approach contact with the peach gripped in the closed jaws. As the peach moves from Station V—V to Station W—W in Figs. 15 and 41, the roller 306 of the orienting wheel unit moves between stations or positions A—A and B—B of Fig. 13 and the Geneva lock plate 194 moves along the cam section 274 of the Geneva lock ring 258 so that the orienting wheel 184 is rotated from the position shown in Figs. 22 and 27, to the position shown in Figs. 23, 28 and 41, in which position the orienting wheel extends at an angle of substantially 45 degrees to a line extending radially of the turret through the vertical axis of the spindle 198 of the orienting wheel.

It should be noted that the fruit clamping jaws 86 and 88 as they move to closed position serve to centralize the fruit with respect to a vertical plane through this radial line. However, as illustrated in Figs. 42 and 43, the vertical axis 198c of the orienting wheel spindle 198 is preferably offset slightly, toward the free ends 86d and 88d of the fruit gripper jaws, from the transverse center line CL—J so that a tendency is created for the peach to incline radially inwardly of the jaws to abut against the back of the jaws thereby overcoming any tendency for the peach when rotated by the orienting wheel to become wedged against the free edges of the jaws, it being noted that the opening between the free edges of the jaws is greater than the opening between the inner or butt end of the jaws. When the jaws 86 and 88 are moved partially to open position as at Station W—W, as shown in Figs. 15 and 41, the clamps or grippers are opened a predetermined amount thus providing a uniform clearance for the fruit so that the fruit gripping jaws impose no substantial restriction on the free turning of the peach under the action of the orienting wheel. The peach is thus substantially entirely supported only by the orienting wheel and the fruit clamps or grippers serving during the orienting operation merely to limit the tilting of the peach on the wheel and prevent displacement of the peach out of driving engagement with the wheel.

The rotating orienting wheel causes the peach to rotate and if the indent is in the plane of the wheel, the indent will very quickly reach and register with the wheel and the peach will therefore drop down on the wheel to the extent permitted by the stem indent. If the suture plane also lies in or coincides with the plane of the wheel, the peach will of course be very quickly turned so that not only does the wheel register with and penetrate the stem indent but also at the same time becomes aligned with the long axis of the indent and accordingly penetrates the maximum amount into the stem indent.

The peach may not, however, be originally received on the orienting wheel with its indent or suture plane lying in the plane of the wheel but the peach may fall onto the wheel in any position. If the peach falls onto the orienting wheel with the long axis of its indent in a plane normal to the wheel plane, as illustrated in Fig. 32, the rotation of the wheel in its original position radially of the turret, at the time the fruit clamping jaws are first opened, may not serve to orient the peach. Accordingly, as the turret continues to revolve, and the clamps move past position B—B, Figs. 13, 23 and 28, the orienting wheel is rotated to a position at 45 degrees to a plane radially of the turret. The orienting wheel remains in engagement with its driving spool 184 and the peach is now rotated about an axis which is inclined at an angle of 45 degrees with its original axis of rotation. Due to the weight and inertia of the peach, the peach is not turned about a vertical axis during this turning of the orienting wheel about its spindle axis.

If the peach had originally dropped onto the orienting wheel with its indent in such a position that the turning of the wheel relative to the peach about a vertical axis caused the wheel to lie in the plane of the indent or transverse thereto, the continued rotation of the wheel in this new plane quickly serves to locate the indent.

If the peach, as originally dropped on the wheel, was in such a position that the consequent turning of the peach served to position the indent over the wheel with the wheel projecting into the indent crosswise thereof, the wheel will have become ineffective to rotate the peach. The subsequent first vertical turning of the wheel, at position B—B, will cause the wheel in the process of such turning to become aligned with the long axis of the stem indent and thereafter turns with the wheel about the vertical axis so that the suture plane of the peach remains coincident with the plane of the wheel. The peach then drops down to the maximum extent onto the wheel.

However, it may happen that the peach falls onto the orienting wheel in such position that neither the indent nor the suture plane is located before or during the time the wheel is passing from position B—B, Figs. 13, 23 and 28, to position C—C, Figs. 13, 24 and 29. As the turret continues to revolve and an orienting unit approaches position C—C in Figs. 13 and 41, the bottom edge of this spindle 198 engages, and the spindle is raised by, the stationary cam block 240. This cam block in raising the spindle, lifts the orienting wheel out of engagement with its driving spool, and as the spindle passes over the top of the cam block, the Geneva gear 192 is engaged by the teeth of the Geneva gear sector 260 so that the spindle is rotated through an angle of 90 degrees to the position shown in Figs. 24, 29, 34 and 41, the Geneva lock ring 258 having a suitably relieved portion or notch below the teeth of the Geneva gear sector 260 so as to provide clearance permitting the locking plate to rotate with the spindle and to position the next curved surface of the locking plate for locking engagement with the surface of the locking ring beyond the notch. The wheel spindle having been rotated through an angle of 90 degrees the spindle then passes beyond the cam block 240 and drops down thereby re-engaging the orienting wheel with its driving spool. If the indent of the peach had been located prior to this vertical turning of the wheel, the wheel in so moving may become aligned with the long axis of the indent and the peach therefore drops down into complete registration with the wheel, after which the peach turns about a vertical axis with the wheel.

If the stem indent had not been previously located, the wheel in its new position may serve by rotating the peach to cause the indent to register with the wheel.

As the turret continues to revolve, the orienting wheel unit is carried through the positions D—D and E—E, indicated in Figs. 12 and 41, and as shown in Figs. 25–30 and 24–29, respectively, it being noted that the wheel is rotated in the same plane in position E—E as it occupied at position C—C. Fig. 35 illustrates a peach which at position D—D has been finally brought by the rotation of the wheel in such position that its indent is penetrated by the wheel but the long axis of the indent extends crosswise of the plane of the wheel. In some instances this registration of the indent with the wheel takes place before the peaches have arrived at the station or position D—D, Fig. 15, as previously described herein, but in some instances this registration takes place as the orienting wheel unit moves from Station D—D toward Station E—E. At Station E—E the orienting wheel is again rotated about its vertical axis to the position shown in Figs. 29, 36 and 41, and as the wheel turns to this position, it first turns about the vertical axis relative to the peach so that the wheel and suture plane of the peach may become aligned and the peach drop down so that the wheel penetrates to a maximum extent into the stem indent cavity of the peach and thereafter the peach turns about the vertical axis with the wheel.

In some cases the indent may not have registered with the wheel, as shown in Fig. 35, by the time the wheel unit reaches Station D—D or moves from Station D—D to Station E—E, but as the wheel turns about the vertical axis it becomes aligned with the suture plane and as the wheel continues to rotate after passing Station E—E the peach is rotated into suture plane registration.

As the turret 34 continues to revolve and the orienting wheel unit approaches the position or station F—F, the Geneva gear 192 is brought into engagement with a single toothed gear sector 266 and the orienting wheel is rotated about a vertical axis through an angle of 45 degrees so that the wheel spindle is again radially aligned with the turret, as illustrated in Figures 26, 31, 37 and 41. As the orienting wheel approaches this position the Geneva lock plate 194 reaches the reduced end portion of the Geneva lock 258 and a corner of the Geneva lock plate 194 is engaged by the hooked end 270 of the latch spring 268, as shown in Figure 19, so as to hold the orienting wheel in this radial position.

The peaches are oriented before the orienting mechanism reaches position F—F. Accordingly, the swinging of the wheel to a position in radial alignment with the turret serves to fix the suture plane of the oriented peach with respect to the radial axis of the turret as a reference plane. It may happen that because the stem indents of peaches or like fruit are in some cases not perfectly smooth; or because grooves are left from stems or twigs that bore the fruit; or because of creases or small bumps on the sides of the stem indents, the wheel has not entered the stem indent to its fullest extent or that therefore the suture plane has not been precisely oriented by the time the fruit reaches and passes position F—F. Accordingly, as the turret continues to revolve, each orienting wheel unit passes onto and over the ring sector 286, Figs. 13 and 14, the wheel spindle passing over the cam block section 247, Fig. 13, at the end of the ring 248, onto the track section 286 which is elevated with respect to the ring 248. Thus, as the orienting wheel passes over the track or sector 286, the orienting wheel spindle is held in raised position and therefore out of driving engagement with its driving spool 238. This track sector or section 286 is continuously vibrated through a distance adjustable from almost nothing to one-eighth inch. The wheel spindle, orienting wheel and peach are vibrated vertically, preferably at high speed (on the order of 1300 vibrations per minute), but with rather a gentle movement, and the wheel clears the bumps, creases, twigs or roughened surfaces on the sides of the indent of the peach, and the peach settles down onto the wheel so that the wheel penetrates to the maximum possible extent into the indent of the peach and the long axis of the indent of the peach is precisely located by the wheel.

Peaches are frequently, if not usually, not perfect spheres, and therefore, although the peach may be precisely oriented with respect to the long axis of the stem indent or the suture plane, the peach may tilt toward one side or the other of the fruit clamping jaws so that the suture plane is not truly vertical. The peach will generally tilt inwardly of the turret toward the back of the jaws if the wheel is offset forwardly of the center line of the jaws, as illustrated in Fig. 42. Accordingly, when the orienting wheel unit passes the end of the vibrating track or sector 286 and approaches position G—G in Fig. 13, and moves from station X—X to station Y—Y in Fig. 15, the actuating roller 146, for the associated clamps or grippers 86 and 88, engages the cam surface 810 of the cam 804 and the clamps are released for closing movement by the spring 120, as previously described. As these clamps or grippers move to closed position, they, by reason of their V shape in plan on horizontal section, serve to recentralize the peach vertically with its suture plane now extending in a truly vertical plane coincident with the vertical plane of the orienting wheel and extending through the axis of the rotating turret. The generally V shape of the grippers or jaws in elevation or vertical section serves to centralize the peach with respect to a horizontal plane and to hold the peach against vertical movement or slippage. As the grippers and associated orienting wheel unit move past position G—G, Figs. 13 and 41, and from station Y—Y toward station Z—Z in Fig. 15, the fruit firmly gripped between the clamping jaws is subjected to an orientation inspection operation and the orienting wheel is swung downwardly out of fruit engaging position by the downwardly and inwardly twisted sections of the guiding and control tracks 252 and 254 for the orienting wheel control roller 306, as previously described.

The downward movement of the orienting wheel takes place just in advance of the orientation inspection operation. If the peach has been properly oriented as to suture plane, the wheel will have penetrated to the maximum extent into the stem cavity of the peach and the peach will overhang the wheel a maximum amount and thereby project a maximum distance below a horizontal reference plane L—L, illustrated in Figs. 56 to 61. This reference plane lies tangential to the upper edge of the orienting wheels, when the wheels are in elevated position and prior to their downward movement out of engagement with the peach. It will be seen by reference to Figs. 56–61 that the reference plane L—L coincides with or passes through the bottom of the stem cavity of a properly oriented peach.

If the peach as presented to the orientation inspection apparatus has been partially oriented, that is oriented as to indent so that the indent is partially penetrated by the wheel, but the long axis thereof lies crosswise of the plane of the wheel, the peach will have dropped down somewhat on the wheel and partially overhang the wheel, but will not have dropped to its maximum extent. Hence, the bottom of the stem indent cavity of the peach will be above the reference plane L—L, as indicated in Figs. 60—61, and the peach will, of course, not project as much below this reference plane as when the suture plane is aligned with the wheel, as illustrated in Figs. 56–58.

If the peach as presented to the orientation inspection apparatus has not been oriented at all, either as to indent or suture plane, the entire peach will lie above the wheel, and hence tangent to and above the reference plane L—L, as indicated in Fig. 59.

As the orienting turret 34 continues to revolve and the peach held in the clamping jaws moves from position G—G toward position H—H in Figs. 13 and 41, and from station Y—Y to Z—Z in Fig. 15, the supporting arm 630 carrying the inspector assembly 633 is driven in a counterclockwise direction by the engagement of the lever 636 with the lugs 634 carried by the orienting turret 34. As the inspector supporting arm 630 moves from line CL-30 to line CL-12, as previously described, the arm 630 and the inspector assembly move in a counterclockwise direction at the same rate as the fruit clamping jaws, and the roller 698 of the inspector assembly traverses the stationary cam bar 699. By the time that the orienting wheel drops down sufficiently to clear the path of the disc 690, the roller 698 moves over the high portion 706 of the cam thereby allowing the inspection disc 690 to move upwardly under action of its control spring 728. If the peach as presented to the orientation inspection apparatus has been properly oriented as to suture plane, this upward movement of the disc will be limited by its engagement with the bottom of the peach periphery, as indicated in Fig. 57, and the pawl 722 will be held in the position there shown and clear the lug 724 of the slide 742. The cam 756 will therefore remain out of alignment with cam 490, as illustrated in Fig. 48, so that the transfer mechanism will operate properly, as hereinafter described, to transfer the oriented peach from the fruit clamping jaws of the orienting turret to the fruit receiving cups of the splitting, spreading and pitting mechanisms. When the supporting arm 630 reaches the position represented by line CL-12 in Fig. 50, the cam roller 644 carried by the lever 636 will engage and be depressed by the stationary cam 656, Figs. 46, 50 and 55, and the lever 636 will be thereby swung in a clockwise direction as shown in Fig. 46 and be released from the drive lug 634 of the fruit orienting turret 34, whereupon the spring will cause the supporting arm 630 and, consequently, the inspector assembly 633 to be swung in a clockwise direction, as seen in Fig. 50, back to the starting line CL-30, this rearward movement of the orientation inspection apparatus being cushioned by the air cylinder 636.

If the fruit, as presented to the fruit orientation inspection apparatus, has not been oriented, as illustrated in Figs. 59 and 60, or has been partially oriented, i. e., as to stem indent, as illustrated in Figs. 61 and 62, the inspection disc 690, during the counterclockwise movement of the supporting arm 630, will be either moved up to the maximum extent permitted by the stationary cam bar 699 without ever contacting the peach, or will be moved up into contact with the bottom periphery of the peach, but be displaced a lesser distance from the reference plane L—L, as shown in Fig. 61. In the case of a partially oriented peach, as illustrated in Fig. 61, the pawl 722 will be so positioned as to engage the lug 724 of the slide 742. It is, of course, evident, as shown in Fig. 59, that if the inspection disc moves up to the maximum possible extent permitted by the cam bar 699 without contacting the peach as in the case of a wholly unoriented peach, the pawl 722 will move downwardly to an even greater extent so as to be positioned to engage the lug 724 of the slide 742.

When the lug 724 is engaged by the pawl 722, the slide 742 moves with the inspector assembly and the cam 756, attached to the slide is aligned with the transfer mechanism control cam 490, as illustrated in Fig. 49. The jaws of the transfer mechanism are then held open by cam 756 and the wholly unoriented, or partially oriented peach will fall from the fruit clamping jaws 86 and 88 of the fruit orienting turret as the jaws pass position H—H in Figs. 13 to 41, or station Z in Fig. 15. The cam 756 is held in this aligned position by the latch lever 760, the shoulder 764 engaging the lug 724 and thereby holding the slide 742 against outward movement, or to the right in Fig. 49, while the inspector assembly completes its counterclockwise movement and begins its counterclockwise return movement to its starting position. As it approaches that original starting position, in order to inspect the next succeeding peach, the pawl 770 of the inspector assembly engages the lug 766 of the latch lever 760 and depresses the same thereby freeing the lug 724 of the slide 742 for outward or return movement under the action of the spring 780 so that the cam 756 is returned to its initial or normal position out of alignment with the transfer control cam 490.

In transferring the properly oriented fruit from the clamping jaws 86 and 88 of the orienting turret 34 the transfer jaws 560 and 578 move or rotate continuously in a vertical plane about the axis of the transfer shaft 452 while the fruit gripping jaws move or rotate continuously in a horizontal plane about the axis of the turret 34.

The instant that the jaws 86 and 88 arrive at station Z—Z in Fig. 15, to position the suture plane of the oriented peach in the jaws in the plane of the transfer turret 504, the roller 158 engages the actuating cam surface 816 of the stationary cam 802, as previously described, to cause the jaws to open in timed relation with the vertical movement of the fruit being transferred. As previously pointed out, the roller 158 contacts the cam surface 816 at the same instant relative to the movement of the transfer jaws 560 and 578, whether the peach be large or small. As the turret 504 continuously rotates, the transfer jaw units are revolved about the axis of the turret and the cams 490 and 496 control the opening and closing of each pair of jaws 560 and 578 and the swinging of the associated jaw carrier 568. As illustrated in Fig. 65, the cam 490, for the major portion of its length, engages the roller 572 and holds the jaws 560 and 578 in open position. As the pair of jaws approach the point of transfer of the fruit from the jaws of the orienting turret, the jaw carrier 568 is swung in a counterclockwise direction, as seen in Fig. 65, by the cam 496, the center line of the internal cam track of that cam being indicated by the numeral 604 in Fig. 65. The specific movement of the jaws is illustrated in detail in the operational diagram of Figs. 71 to 85, in which latter figure the inner surface of the cam track of the cam 496 is illustrated in full line, and the circular dash-dot line CL-596 illustrates the path of movement of the axis of the jaw carrier stud 596. Various positions taken by the cam roller 602, the cam roller 572, the gripper 561, the indent entering knob 580, the pivot stud 564, the jaw lever 560, the pivot stud 584 and the jaw lever 578, are illustrated by the position numbers 1 to 9 prefixed to the part number. As can be seen from this operational diagram, as the transfer jaws approach the point of transfer of the fruit from the jaws of the fruit orienting turret, the cam roller 602, in moving from position 1 to position 2, starts to move inwardly or toward the axis of the turret as does also the cam roller 572 in moving from its corresponding position 1 to position 2. As the cam rollers 602 and 572 continue to move inwardly between positions 2 and 5, the roller 572 approaches the roller 602 so that the jaw carrier 568 is swung in a clockwise direction and the knob 580 of the jaw carrier 578 approaches the oncoming fruit gripping jaws 86 and 88 of the fruit orienting turret from the right of the center of the peach and passes below the path of the peach. At the same time the peach clamp 561 moves to a position somewhat above the path of the oncoming peach and approaches it from the left of the center of the peach. Between positions 5 and 6, the roller 572 jumps off the end of the cam 490 and moves outwardly while the roller 602 moves rapidly inward so that the jaw members 560 and 578 are swung into vertical alignment and released for instantaneous closing under the action of their closing spring 592 so that the indent penetrating knob 580 and the peach clamp 561 grip the peach in a vertical plane coincident with the suture plane of the peach. In other words, at the same instant the gripper jaws of the orienting turret are swung open, the jaw members 560 and 578 grab the peach "on the fly" at the very instant that a pair of gripping jaws 86 and 88 are aligned with the plane of the transfer turret and the associated actuating roller 158 engages the point of beginning of the active cam section 816 of the stationary cam 802, Fig. 15.

The roller 602, in moving from position 6, through positions 7 and 8, swings the jaw carrier 568 in a counterclockwise direction, to accelerate or speed up the downward movement of the peach from its position between, but out of contact with, the open, gripper jaws 86 and 88. This downward, accelerated, rapid movement of the peach relative to the jaws 86 and 88 is illustrated in Figs. 71 to 84, which show the manner in which the peach clears the jaws 86 and 88, in both vertical and horizontal directions as the jaw members 561 and 580 move downwardly, at an accelerated rate, between positions 6 and 8. As the roller 602 approaches position 9, this counterclockwise movement of the jaw carrier 568 is discontinued, for by that time the peach and the upper jaw member 560 have cleared the path of the rearmost jaw 86 of the fruit gripping jaws of the orienting turret, as illustrated in Figs. 76, 81 and 84. Figs. 77 to 81 illustrate in vertical section, and Figs. 82 to 84 illustrate in plan, the timing of the continuously moving jaws of the turret in respect to the continuously moving peach and the jaws of the fruit orienting turret. As shown in Fig. 77, jaw members 560 and 578 have been brought to a position on opposite sides of the path of the continuously moving peach and, at the illustrated instant, to the right of the suture plane of the oncoming peach. As shown in Fig. 78, the jaws have been moved in to contact the peach in the suture plane, the jaws 86 and 88 of the fruit orienting turret being still closed. There is practically no difference between the position of the parts illustrated in Fig. 78, and the position of the parts illustrated in Fig. 79, at which latter instant the jaw members 86 and 88 of the fruit orienting turret have been swung to open position. Fig. 82 shows how at the instant that the jaws of the transfer turret move or snap to closed position, the jaws 86 and 88 of the fruit orienting turret move from the closed position shown in dotted line to the open position shown in full line. Figs. 80 and 83 show how the fruit grasped by a pair of jaws of the fruit transfer turret moves downwardly between the open jaws of the fruit orienting turret while the rearmost jaw 86 of the pair approaches the path of the downwardly moving fruit, but at such a rate that the peach, which has been accelerated in its downward movement by the swinging of the jaw carrier 568, as previously described, clears the jaw 86. Figs. 81 and 84 show how the continuously moving open jaws of the fruit orienting turret pass over the abducted peach and the upper jaw of the fruit transfer turret as the orienting turret continues its movement.

Figs. 65 and 86 illustrate the operation of the jaws of the transfer turret as the fruit is abducted therefrom by the cups of the second conveyor, by which the fruit is carried past the fruit, splitting, spreading and pitting mechanisms.

As a cup unit 1360 approaches the forward end of the second conveyor the cup actuating roller 1414 of that unit engages the cam track 1484, thereby opening the cup unit which therefore remains in open position until the roller 1414 reaches the cam surface 1486, Figs. 87 and 89, which position it reaches just prior to the transfer instant, at which time the transfer jaw unit is approaching position 1, Fig. 86. As the cam roller 1414 passes over the cam surface 1486 the cup unit 1360 is closed by the action of its spring 1452 so as to engage and grip the peach at the instant that the jaw unit of the transfer turret reaches position 1, in which position the center of the peach is aligned horizontally with the horizontal center line of the cup unit 1360. As the transfer turret continues to revolve, the cam roller 572, moving from positions 1 to 3, causes the transfer jaws to move quickly to open position and the cam roller 602 in moving from positions 1 to 3, causes the jaw carrier 568 to swing counterclockwise to speed up the movement of the jaw 578 and knob 580 so as to clear the path of the peach now being carried away from the transfer point by the cup unit 1360 of the second conveyor. Although, at the same time, the jaw 560 and the peach clamp 561 are moving toward the peach, their movement is not sufficient for the clamp to re-engage the peach so that, as shown by the positions indicated as 2–561 and 3–561 in Fig. 86, the jaw 560 and the clamp 561 lag behind while the fruit is carried away from it by the continuously moving cup unit 1360 of the second conveyor. In the case of a small peach, the peach will be moved away from the clamp 561 about 9/16 of an inch as the clamp moves from position 1 to position 2. As the transfer jaw unit moves from position 3 to position 4, the cam roller 602 reaches the circular surface portion of the cam 496 and the counterclockwise rotation of the jaw carrier 568 is terminated, the forward end of the jaw 578 having been moved out of the path of the receding peach carried in the cup unit 1360.

The cup unit 1360, having grasped the peach in its suture plane coincident with the central longitudinal plane of the machine, carries the fruit then past the rotating saw which splits the flesh and pit of the fruit along the suture, the saw being positioned in the central vertical plane of the machine. The cup unit then carries the fruit halves over the doubly divergent and curved stationary spreader blades 1620 to 1628, as previously described, to spread apart the fruit halves and the cup sections in which the fruit halves are contained, all as shown in Figs. 99 to 109, the fruit halves turning in and relative to the cup sections about a vertical axis and about a horizontal axis substantially about the point of contact of the hard pit with the crown of the vertically curved portion of the spreader blades. The wires 1644, Figs. 97 and 107, preclude further turning of the fruit halves as the fruit is carried past the rear portion of the spreader blades 1622 and 1624 and serve to break the suction between the sticky cut surfaces of the flesh of the fruit halves and the surfaces of the spreader blades. As the fruit halves pass along the wires 1644, the actuating roller 1414 moves into engagement with the inclined track section 1492 and the cup sections are swung to open position, as shown in Fig. 109, so as to pass beneath the traveling pitter frame 1770 and below the pitter pad assemblies 1810 and 1812. The pitter head-frame, mounted on the pivoted links 1780 and 1784, in moving "forwardly" at the same rate as the continuously moving half fruit cups 1362 and 1364, traverse an arc of movement, of which the highest point is at the end of the forward movement of the pitter headframe. By the time the roller 1414 of the fruit cup unit 1360 reaches the entering end of the notch 1484 in the cam track 1490, the half peaches are vertically aligned with the pitting pad assemblies and the cup closing spring 1452 swings the half fruit cups upwardly to bring the cut surfaces of the fruit halves into engagement with the apertures of the fruit engaging pads 1878 and 1880, as shown in Fig. 118, which, if the halves be tilted in the cups, re-center them with the cup walls. During the movement of the actuating roller 1414 through the notch in the cam track, the cam 2002, Fig. 102, causes rotation of the shafts 2072 and 2074 in such direction as to bring the rollers 2080 and 2082 into engagement with the cup sections 1362 and 1364 and thereby apply the additional spring pressure, provided by spring 2104, to the fruit cups and therethrough to the fruit halves thereby to increase the compressive forces urging the flesh of the fruit against the apertured pitting pads 1878 and 1880. While the fruit halves are thus firmly pressed against the apertured pitting plates, cam 2002 actuates the shafts 1974 and 1976 so that the gear segments 1970 and 1972 are rotated in a clockwise direction, as seen in Figs. 113 and 114, thereby to raise the crossheads 1930 and 1932 and to cause opposite swinging movement of the blades of each pitting mechanism so as to cut around the pit and meet beneath the pit, all as heretofore described. The knock out pads 1890 and 1892 engage the pit halves, as shown in Fig. 118, and by the pressure exerted on the pits, urge the pits toward the path of movement of the pitting knives, and so compress the flesh of the fruit about the pit that a minimum pitting cut is made by the pitting knives, and a clean uniform nonjagged cut made by the knives through the flesh of the fruit about the pit.

The pitting knives having completed their movement, the cup actuator roller 1414 reaches the section 1502 of the cam track 1490 thereby again swinging the cup sections outwardly to open position and away from pitting pad assemblies, while the cam 2114 actuates the lever 2100 to swing the rollers 2080 and 2082 out of the path of the cup units as they move downwardly, and the cam 2002 causes the pitting blades to swing from closed position to open position. As the pitting blades move to open position the springs 1910 and 1912 force the knock out pads 1890 and 1892 outwardly, thereby ejecting the half pits from between the pitting blades. The fruit cup units 1360 continue their movement toward the rear of the machine, while the cam 1798 causes the pitter head frame 1770 to reverse its direction of movement and return to its starting position in time to meet and again move forwardly with the next oncoming cup unit. As the cup unit carries the simultaneously pitted fruit halves past the rear end of the second conveyor, the fruit cups being in open position, the pitted fruit halves are discharged by gravity from the cups onto a suitable receptacle or into a suitable conveyor or belt by which they are carried to suitable packing mechanisms or further peach processing mechanisms. As the cup units 1360 pass about the end of the conveyor, they are swung to closed position depending vertically from the lower flight of the conveyor and in this closed position they remain until they again arrive at the point where the cup actuating roller 1414 engages cam track 1484, as previously described, and are swung to open position for the abduction of a peach from the transfer turret.

It is apparent that many widely different embodiments of this invention may be made without departing from the spirit and scope thereof, and therefore, it is not intended to be limited except as indicated in the appended claims.

Having thus described the invention, what I claim as new and desire to secure by Letters Patent is:

1. In a fruit orienting machine, a pair of fruit receiving clamps, a carrier for said clamps, means for mounting the clamps on said carrier for movement relative to each other to open and closed positions, means for moving said carrier at a continuous uniform rate to feed the fruit received by the clamps, a fruit orienting wheel movably mounted below the clamps to support the fruit when loosely confined within the clamps, means for moving said wheel continuously at said uniform rate parallel to the path of movement of the clamp carrier, means for rotating the wheel to orient the fruit loosely confined within the open clamps, said clamps being generally V shaped in plan and elevation to centralize the fruit in the plane of wheel and support the fruit when the clamps are closed, and actuating means for momentarily closing the clamps on receipt of the fruit to centralize the fruit in the plane of the wheel then open the clamps and loosely confine the fruit during rotation thereof by the wheel and thereafter to close the clamps when the fruit has been oriented to hold the fruit centralized in the plane of the wheel and support the fruit independently of the wheel.

2. In a fruit orienting machine, a pair of fruit receiving clamps mounted for relative movement to open and closed positions, a fruit orienting wheel mounted for rotation below the clamps to support and rotate the fruit when it is loosely confined within the clamps while the clamps are open, means for rotating the wheel, means for moving said clamps to closed position to position fruit received therein over the wheel, and means for opening said clamps a predetermined amount regardless of the size of the fruit to provide a uniform clearance between the fruit and the clamps during the rotation of the wheel.

3. In combination, a peach orienting mechanism including a conveyor movable continuously at a uniform rate, peach receiving and supporting means carried by said conveyor, orienting means carried by said conveyor for rotating the peach in said receiving and supporting means into a predetermined position of orientation as to suture plane, peach splitting means including a second conveyor movable continuously at said uniform rate, relatively movable fruit holding clamps carried by said second conveyor and movable relatively between open and closed positions, transfer mechanism including a third conveyor movable continuously between the conveyor of the orienting mechanism and the conveyor of the splitting means for transferring an oriented whole peach from the conveyor of the orienting mechanism to the second conveyor, said splitting means including means causing said fruit holding clamps to move to closed position when aligned with an oriented peach carried by the transfer mechanism to abduct the peach from the transfer mechanism with the suture plane lying in a predetermined plane, and said splitting means including a splitting member disposed in said plane to split the peach along its suture plane as the peach is moving with the second conveyor at said uniform rate.

4. Peach feeding and orienting mechanism comprising a conveyor moving continuously at a uniform rate, means carried by said conveyor for supporting and rotating a whole peach to cause the stem indent of the peach to assume a predetermined position, a pair of peach holding members mounted for relative movement to open and closed positions to receive a whole peach for confining it upon said rotating means and supporting the peach when oriented, means mounting said peach rotating means and said holding members for relative movement toward and from each other to cause the rotating means to engage and rotate the fruit when loosely confined in said supporting members and relatively away from each other when the peach has been oriented to clear a transverse passage between said members, a second conveyor moving continuously at said uniform rate, peach holding means carried by said second conveyor, transfer mechanism including a carriage moving continuously at a uniform rate, and means mounted on said transfer carriage for movement into the passage between said peach holding members of the first mentioned conveyor when said passage therebetween is cleared by relative displacement of said peach rotating means and said holding members for abducting an oriented peach from said peach rotating members, said transfer mechanism being constructed and arranged to deliver the oriented peach to the peach holding means of the second conveyor, and means for moving said conveyors and said transfer carriage in synchronism.

5. Peach orienting and feeding means, comprising a pair of spaced conveyors moving continuously at a uniform rate, means associated with one of said conveyors for rotating a peach received in random position to orient the stem indent thereof into a predetermined position, and a transfer mechanism between said conveyors and including a carriage moving continuously at a uniform rate transverse to the path of movement of said one conveyor, and fruit gripping jaws carried by said transfer carriage for abducting an oriented peach from the orienting means of said one conveyor and for delivering it to the second conveyor with its stem indent in predetermined oriented position.

6. In combination, a turret rotatable continuously at a uniform rate, a plurality of spaced fruit holders carried by said turret for supporting whole fruit received in random positions, rotating means associated with said turret for rotating the whole fruit in each of said fruit holders about horizontal and vertical axes to cause the suture plane of each whole fruit to become aligned with a radius of the turret, a conveyor moving continuously at a uniform rate, a plurality of spaced fruit holding members carried by said conveyor, said conveyor being arranged to cause conveyance of the fruit along a plane which includes a radius of the turret, fruit splitting means mounted in said plane for splitting fruit in the fruit holding members of the conveyor, a transfer mechanism including a pair of fruit holding jaws mounted for movement in said plane between said turret and said conveyor at a continuous uniform rate, and jaw actuating means for closing said jaws on oriented fruit when the suture plane thereof lies in said plane and convey the fruit from the fruit holding means of the turret to the fruit holding means of the conveyor with the suture plane of the fruit lying in said plane of conveyance of the fruit by the conveyor.

7. In a fruit treating machine, means for orienting indented fruit, comprising a rotating wheel for orienting fruit and supporting the fruit against the action of gravity during rotation thereof, fruit restraining means positioned above said wheel to prevent separation of the fruit from said wheel, the downward passage of said fruit from said fruit restraining means being impeded only by said wheel, means for moving said wheel relatively away from said restraining means to permit downward passage of the fruit from said fruit restraining means, said fruit restraining means including a pair of relatively shiftable members movable toward each other to hold the fruit against downward passage on the shifting of said wheel away from said fruit restraining means, and means for inspecting the fruit as to orientation while held by said members and with respect to a reference plane established by the position of the oriented fruit on said wheel prior to shifting of said wheel away from said fruit restraining means.

8. Fruit feeding means, comprising a fruit receiving hopper having a conveyor, said conveyor having spaced upstanding protuberances forming pockets for the reception of the fruit, opposite upstanding walls confining the fruit in the pockets of the conveyor, an inclined wall extending above one of said side walls for delivering fruit into the pockets of said conveyor, said inclined side wall having a portion terminating at its lower end above the pocket forming projections of the conveyor and a portion inclined longitudinally from said portion and terminating below the pocket forming projections of the conveyor to deliver fruit to the pockets of the conveyor along an extended portion of the length of said conveyor.

9. Fruit feeding means, comprising a fruit receiving hopper having a conveyor, said conveyor having spaced upstanding protuberances forming pockets for the reception of the fruit, opposite upstanding walls confining the fruit in the pockets of the conveyor, an inclined wall extending above one of said side walls for delivering fruit into the pockets of said conveyor, said inclined side wall including a fruit receiving portion above the pocket forming projections of the conveyor, a longitudinally inclined portion merging into said fruit receiving portion and into a third portion substantially parallel to the conveyor below the pocket forming projections of the conveyor.

10. Fruit feeding means, comprising a fruit receiving hopper having a conveyor, said conveyor having spaced upstanding protuberances forming pockets for the reception of the fruit, opposite upstanding walls confining the fruit in the pockets of the conveyor, an inclined wall extending above one of said side walls for delivering fruit into the pockets of said conveyor, said inclined side wall including a fruit receiving portion above the pocket forming projections of the conveyor, a longitudinally inclined portion merging into said fruit receiving portion and into a third portion substantially parallel to the conveyor below the pocket forming projections of the conveyor, said conveyor having a laterally inclined fruit supporting surface inclined in the same direction as the inclined wall of the hopper.

11. In an orienting mechanism for peaches or like fruit, a fruit holder open at the top and bottom and having spaced opposite walls loosely confining the fruit, a fruit revolving wheel below the holders for orienting the fruit while loosely confined in said holder, said fruit revolving wheel being mounted relative to the holder for rotation about an axis offset from the transverse centroidal plane of the holder to cause the fruit to revolve against predetermined portions of the wall surface of the holder.

12. In a fruit orienting mechanism, a fruit rotating wheel for revolving the fruit to orient the same, a pair of relatively movable jaws above said rotating wheel and mounted for movement between open and closed positions to position the fruit on said wheel while loosely confining the fruit for revolution thereof by said wheel and to grip the fruit when oriented by said wheel, said wheel being mounted for rotation about an axis offset toward the free edges of the jaws to cause the fruit to tilt toward the back walls of the jaws.

13. In a fruit orienting machine, a fruit carrier movable continuously at a uniform rate; a plurality of spaced pairs of fruit receiving jaw members mounted for movement with said carrier at said rate; means for mounting the jaw members of each pair for relative movement toward and from each other into a first position clamping the fruit therebetween, a second position loosely confining the fruit, and a third position releasing the fruit for abduction therefrom; a plurality of fruit revolving units mounted for movement with said carrier for revolving the fruit to a predetermined oriented position when the fruit is loosely confined within the said jaw members, and actuator means for moving said jaw members toward and from each other to each of said three positions, said actuator means including means for providing a uniform clearance between the jaw members and the fruit, regardless of the size of the fruit, when the jaw members are moved to said second position loosely confining the fruit therebetween.

14. In a fruit orienting machine, a pair of fruit receiving and carrying members, means mounting said members for movement toward and from each other, means for moving said members toward each other to measure the size of the fruit, means for moving said members away from each other so as loosely to confine the fruit for rotation therein, means responsive to the extent of movement of the members toward each other in measuring the fruit for controlling the extent of movement of the members away from each other and means controlled by said controlling means for moving said members apart whereby to provide a uniform clearance between the fruit and members during the rotation of the fruit.

15. In a fruit orienting machine, a pair of fruit receiving clamps mounted for movement toward and from each other, actuating means for moving said clamps toward each other to measure the size of the fruit, said actuating means including an extensible connection responsive to the extent of movement of the clamps in measuring the size of the fruit, and actuating means responsive to the extension of said extensible connection for moving said clamps away from each other to provide a uniform clearance between the clamps and the fruit during orientation of the fruit in said clamps.

16. In a fruit orienting machine, means for receiving fruit to be oriented and loosely confining the same during the orientation thereof, said means comprising a two part receptacle, a pivoted lever supporting each of said receptacle parts, spring means interconnecting said levers for urging said receptacle parts toward each other, an actuating bar having a lost motion connection to said levers for moving said levers away from each other to separate said receptacle parts, means for shifting said bar relative to said levers various amounts depending upon the size of the fruit in said receptacle, means for thereafter moving said bar a predetermined amount, regardless of the size of the fruit, whereby to move said receptacle parts away from each other a predetermined amount so as to provide a uniform clearance between the fruit and the receptacle parts during the orientation of the fruit in the receptacle.

17. In a machine for orienting indented fruit, a fruit carrier, fruit orienting means connected to and movable with said carrier, said fruit orienting means comprising means for revolving the fruit received by the carrier, an indent sensing member for controlling the vertical positioning of the fruit on said carrier in accordance with the orientation or non-orientation of its indent relative to said indent sensing member, orientation inspection means mounted to engage fruit on said carrier for sensing the vertical position of the fruit to determine whether it is oriented, means for abducting fruit from the carrier, and means operatively controlled by said inspection means for controlling said abduction means to reject fruit not having its stem indent properly positioned relative to said indent sensing member.

18. In a fruit feeding means, a fruit feeding conveyor moving continuously at a uniform rate, a plurality of fruit positioning units mounted for movement with said conveyor at said rate for bodily displacing oriented fruit on said conveyor relative to unoriented fruit, and assorting means comprising a control member moving at the same rate in the direction of movement of the conveyor and in juxtaposition to said conveyor to contact the periphery of certain fruit according to its relative position on the conveyor for passing oriented fruit and rejecting unoriented fruit as the fruit is carried continuously at said uniform rate by said conveyor.

19. In a machine for feeding indented fruit, a fruit feeding conveyor moving continuously at a uniform rate, a plurality of fruit positioning units mounted for movement with said conveyor at said uniform rate, each of said units including an indent sensing member shaped to enter the indent to a maximum distance when aligned with the long axis of the indent and to enter to a lesser extent the indent of fruit not having the long axis of the indent registering with said member for vertically displacing on said conveyor fruit oriented as to the long axis of its indent relative to fruit oriented as to its indent but not as to the long axis of said indent, and assorting means including a control member moving at the same rate in juxtaposition to the conveyor to engage the periphery of fruit in one of said positions of vertical displacement for passing fruit oriented as to the long axis of the indent and for rejecting fruit oriented as to indent but not as to the long axis of said indent.

20. In a machine for feeding peaches or like fruit, a fruit conveyor, a plurality of fruit orienting units mounted for movement with said conveyor, each of said units having a suture plane sensing member for causing the fruit to be positioned in one of three vertical displaced positions dependent upon the registration or non-registration of the indent of the fruit with said member and the alignment or non-alignment of the suture plane of the fruit with said member, and assorting means including a control member mounted to contact the periphery of the fruit on said conveyor depending on its relative positioning by said indent sensing member and means operated by said control member for passing fruit oriented as to suture plane, and rejecting fruit oriented as to indent only, and also fruit not oriented as to indent or suture plane.

21. In a machine for feeding peaches or like fruit, a fruit feeding conveyor moving continuously at a uniform rate, a plurality of fruit positioning units mounted for continuous movement with said conveyor at said uniform rate, each of said fruit positioning units including an indent sensing member for variably positioning relative to a predetermined reference plane, fruit oriented as to suture plane, fruit oriented as to indent but not suture plane and fruit not oriented as to indent or suture plane, orientation inspection means mounted for to-and-fro movement parallel to the path of the fruit carried by the conveyor, means for moving said orientation inspection means at said uniform rate while moving in the direction of said conveyor, said orientation inspection means comprising a member mounted for movement toward and from said predetermined reference plane while said orientation inspection means is moving in the same direction as the conveyor to contact the periphery of certain fruit, and means operatively connected to said member and responsive to the extent of movement of said member toward said reference plane for passing fruit oriented as to suture plane while rejecting fruit oriented as to indent only and also fruit not oriented either as to indent or suture plane.

22. A machine as set forth in claim 21 wherein the means for passing oriented fruit and rejecting unoriented fruit comprises means for removing the fruit from the fruit holders of the said conveyor and means for rendering said removal means effective to remove oriented fruit and ineffective to remove unoriented fruit.

23. A machine as set forth to claim 21 wherein the fruit holders each comprise a pair of relatively movable members movable toward each other to receive and hold the fruit and away from each other to release the fruit and wherein the means for passing oriented fruit and rejecting unoriented fruit comprises means for transferring fruit from said holders, means for moving the members of each fruit holder away from each other in timed relation to the operation of said transfer means to release the fruit for transfer from said holders by said transfer means, and means for rendering said transfer means ineffective to transfer unoriented fruit when released by the members of a holder containing unoriented fruit.

24. In a machine for feeding oriented peaches or like fruit, a fruit feeding conveyor having a plurality of fruit holders conveying the fruit, orientation inspection means mounted for forward and backward movement parallel to the path of the fruit carried by the conveyor, means carried by the conveyor for engaging and moving said orientation inspection means forward with the conveyor, means automatically disengaging said orientation inspection means from said last mentioned means on completion of the forward movement of said orientation inspection means, and means operatively associated with and controlled by said orientation inspection means for passing oriented fruit and rejecting unoriented fruit.

25. In a machine as set forth in claim 24, spring means for moving said orientation inspection means backwardly.

26. In a fruit feeding machine, a first conveyor moving continuously at a uniform rate and having a plurality of spaced fruit holders, each of said holders comprising a pair of relatively movable members mounted for movement toward and from each other to receive and grip the fruit and away from each other to release the fruit, a second conveyor moving continuously at a uniform rate and having a plurality of pairs of fruit clamping members mounted for simultaneous movement relative to the second conveyor and for relative movement toward and from each other between an open and a closed fruit gripping position, said conveyors being positioned and arranged for the successive pairs of fruit gripping members to pass between the members of successive fruit holders of the first conveyor at a transfer point, means for simultaneously moving the holders of the first conveyor away from each other and the members of a pair of fruit gripping members of the second conveyor to closed position when they reach said transfer point, and means for moving said fruit gripping members relative to the second conveyor as said members pass the transfer point to accelerate the rate of movement of the fruit as it is gripped and removed from the holders of the first conveyor at the transfer point.

27. In a fruit feeding machine, a fruit feeding turret rotating continuously at a uniform rate, a plurality of spaced fruit holders carried by said turret, each of said holders comprising a pair of members movable relatively toward and from each other to open and closed position and projecting beyond the periphery of said turret, a second turret mounted for rotation at a continuous uniform rate on an axis substantially normal to the axis of rotation of the first turret, a plurality of spaced pairs of fruit gripping members carried by said second turret and mounted for movement relatively toward and from each other to open and closed positions and for movement on rotation of the turret in a plane normal to and intersecting the path of movement of the holders of the first turret, and means for simultaneously opening a holder of the first turret and closing a pair of gripping members of a second turret when at the transfer point to transfer the fruit from the first turret to the second turret.

28. A fruit feeding machine as set forth in claim 27 wherein each pair of fruit gripping members of the second turret is mounted on the turret for movement relative to the turret, and means is provided for moving each pair of gripping members relative to the turret as they approach the transfer point to clear a holder of the first turret and encompass the fruit as the holder and fruit approach the transfer point.

29. In a fruit feeding machine, a first conveyor moving continuously at a uniform rate, a plurality of pairs of fruit gripping members, means for mounting said fruit gripping members in spaced pairs on said conveyor for movement of the members of each pair relative to each other and for movement of each pair relative to the conveyor, a second conveyor moving continuously at a uniform rate, a plurality of spaced pairs of fruit clamps mounted on said second conveyor for conveyance in a plane substantially coincident with the plane of conveyance of the gripping members of the first conveyor, said fruit clamps of each pair being mounted for relative movement toward and from each other in a plane substantially normal to the plane of conveyance of the fruit gripping members of the first conveyor, means for successively moving the fruit gripping members of the pairs of fruit gripping members relative to each other and substantially simultaneously moving the fruit clamps of companion pairs relative to each other for transferring the fruit from the first conveyor to the second conveyor without interfering with the movement of either conveyor, and means for then moving said pairs of fruit gripping members relatively to said first conveyor in a direction opposite to the direction of movement of the first conveyor to permit the fruit transferred to the second conveyor to clear the fruit gripping members of the first conveyor.

30. In a peach pitting machine comprising a fruit orienting conveyor having a plurality of spaced fruit holders each for receiving a single whole fruit to be oriented, means for continuously moving said conveyor at a uniform rate to feed the peaches received in said holders at a continuous uniform rate to a delivery point, rotating means carried by the conveyor and associated with each fruit holder for rotating each peach into a predetermined position of orientation as to suture plane as it is fed at said continuous uniform rate to said delivery point, a fruit hopper having an inclined fruit receiving conveyor, means forming a plurality of individual fruit receiving pockets on the fruit receiving conveyor, means for directing fruit by gravity from the upper end of the fruit receiving conveyor in individual succession into the holders of the orienting conveyor, means for wiping off surplus fruit from the fruit received in the pockets of the inclined conveyor, a peach pitting conveyor having spaced peach supporting means, means for continuously moving said pitting conveyor at said uniform rate from a receiving point past a peach splitting station and to a pitting station, means engageable with the fruit in the holders of the orienting conveyor as they approach the delivery point of said conveyor for inspecting the peaches for orientation as to suture plane, a continuously moving transfer carriage, means carried by the transfer carriage and controlled by said inspection means for abducting oriented peaches in succession from the peach holders of the orienting conveyor at said delivery point while the peaches are moving at said continuous uniform rate and delivering the peaches in predetermined oriented positions to the peach supporting means of the second conveyor at the receiving point thereof while the said supporting means of the second conveyor are moving at said uniform rate, peach splitting means at the spitting station and positioned to split the oriented peaches along their suture planes while they are moving, and peach pitting mechanism at said pitting station in position to pit the half peaches while they are moving, and means for driving said orienting conveyor, said fruit receiving conveyor, said pitting conveyor and said transfer carriage in synchronism and for driving said peach rotating means, said peach inspection means, said peach abducting means and said peach pitting mechanism in timed relation with said conveyors and said transfer carriage.

31. In a fruit orienter, a pair of fruit receiving holders mounted for relative movement to open and closed positions, means mounted for rotation below said holders to support and rotate the fruit when it is loosely confined in the holders while the holders are open, means for rotating the fruit rotating means, means for moving said holders to closed position to position the fruit received therein in engagement with the fruit rotating means, and means for opening said holders a predetermined amount regardless of the size of the fruit to provide a uniform clearance between the fruit and the holders during the rotation of the fruit rotating means.

32. In a fruit orienting machine, a pair of fruit receiving clamps, a carrier for progressing said clamps over a predetermined path, means mounting the clamps on said carrier for movement relative to each other to open and closed positions, a fruit orienting wheel movably mounted below the clamps to support the fruit when loosely confined within the clamps, means for progressing said wheel parallel to the path of movement of the clamps on the carrier at the same rate as the clamps, means for rotating the wheel to orient the fruit loosely confined within the open clamps, means for moving said clamps to closed position to position fruit received therein over the wheel, and means for opening said clamps a predetermined amount regardless of the size of the fruit to provide a uniform clearance between the fruit and the holders during the rotation of the wheel.

33. In a fruit feeding machine, a conveyor moving continuously at a uniform rate and having a plurality of spaced fruit holders, each of said holders comprising a pair of relatively movable fruit gripping members mounted toward and from each other to receive and grip the fruit and away from each other to release the fruit, a fruit transfer carrier having a pair of fruit clamping members mounted thereon for simultaneous movement relative to the transfer carrier and relative to each other between an open and a closed fruit clamping position, said transfer carrier and said conveyor being positioned and arranged to cause the fruit clamping members to pass between the fruit gripping members of the fruit holders of the conveyor at a transfer zone, means for simultaneously moving the fruit gripping members of a holder of the conveyor away from each other and the fruit clamping members to closed position when they reach said transfer zone, and means for moving said fruit clamping members relative to the transfer carrier as said clamping members pass the transfer zone to accelerate the rate of movement of the fruit as it is gripped and removed from the fruit gripping members of a holder of the first conveyor at the transfer zone.

34. In combination, a first conveyor having spaced peach supporting means to receive peaches in random positions, means for continuously moving said conveyor at a uniform rate to feed the peaches received in said supporting means at a continuous uniform rate to a delivery point, means including said supporting means for rotating each peach into a predetermined oriented position as it is conveyed at said continuous uniform rate to said delivery point, a second conveyor having spaced peach supporting means, means for continuously moving said second conveyor at said uniform rate to feed peaches from a receiving point to a discharge point at said continuous uniform rate, transfer mechanism including a third continuously moving conveyor, means carried by the third conveyor for abducting oriented peaches from the peach supporting means of the first conveyor at said delivery point while the peaches are moving at said continuous uniform rate and delivering the peaches in predetermined oriented positions to the peach supporting means of the second conveyor at the receiving point thereof while the said supporting means of the second conveyor are moving at said uniform rate, and peach splitting means cooperating with the peach supporting means of the second conveyor for splitting the oriented peaches while they are moving between the receiving and discharge points of said second conveyor.

35. In combination, a conveyor moving continuously at a uniform rate, a plurality of pairs of peach holding members, each pair of said members being adapted to hold a whole peach therebetween, peach sawing mechanism mounted to engage a peach in each pair of said peach holding members to divide each peach and its pit as said peach holding members move at said uniform rate, peach pitting mechanism mounted for engagement with the peach halves in said members to pit said halves, peach orienting mechanism including a second conveyor moving continuously at said uniform rate, a plurality of whole peach holders carried by said second conveyor, means mounted for movement with said second conveyor at said uniform rate for rotating whole peaches in said holders into predetermined positions of orientation as to their suture planes while the second conveyor is moving at said uniform rate, means for feeding whole peaches in individual succession in random positions to said holders while said holders are moving with said second conveyor at said uniform rate, a transfer conveyor moving continuously at a uniform rate, means carried by said transfer conveyor for abducting the oriented peaches in individual succession from the holders of the second conveyor and delivering each abducted whole peach to the peach holding members of the first mentioned conveyor with the suture plane of the oriented peach aligned with the plane of the peach sawing mechanism, means for operating the sawing mechanism and the pitting mechanism to saw each oriented whole peach along the suture plane and thereafter pit each half peach while said whole peaches and said half peaches are being carried by first metioned conveyor at said uniform rate.

36. In a peach treating machine, a first conveyor moving continuously along a predetermined path at a uniform rate, a plurality of spaced rotating means mounted for movement with the conveyor at said uniform rate for rotating the peaches to cause the suture planes of the peaches to lie in a predetermined plane, peach supporting means associated with each peach rotating means and receiving peaches in random positions for loosely confining the peaches during rotation thereof, means mounting each peach rotating means and its associated peach supporting means for relative movement toward each other to cause the rotating means to rotate the peach while loosely confined in said peach supporting means and away from each other when the peach has been oriented to leave the peach supported in said peach supporting means independently of said rotating means, a second conveyor moving continuously at a uniform rate along a predetermined path transverse to the path of the first conveyor, means carried by said second conveyor for engaging and abducting an oriented peach from each peach supporting means associated with the first conveyor, a third conveyor moving continuously along another predetermined path at substantially the same uniform rate as the first conveyor, a plurality of spaced peach holding means associated with said third conveyor and arranged to receive and abduct the oriented peaches from the peach engaging means of the second conveyor and to convey the oriented whole peaches with their suture planes parallel to the predetermined path of movement of the third conveyor, and peach splitting mechanism mounted for halving the peaches in a plane substantially coincident with the suture planes of the peaches.

37. In combination, a conveyor moving continuously at a uniform rate, peach indent orienting mechanism associated with said conveyor to receive a peach in random position and for rotating the peach to cause the peach indent to assume a predetermined oriented position, peach supporting means associated with said rotating means for supporting the peach in stem indent oriented position, said peach supporting means having a passage therethrough in which said orienting mechanism is positioned when rotating the peach, means for causing a relative displacement between said peach orienting mechanism and said peach supporting means to clear said passage when said peach has been oriented, a transfer carrier having a pair of fruit gripper jaws mounted on said carrier for movement through the passage of the peach supporting means for abducting the oriented peach from said peach supporting means, one of said jaws having an indent penetrating member to maintain the abducted peach in predetermined oriented position.

38. In combination, a first conveyor having peach receiving holding means movable continuously at a uniform rate along a linear path, peach splitting mechanism mounted to engage and split a peach as it is carried along said linear path by the peach holding means of the first conveyor, a first rotating turret having peach holding means receiving peaches in random positions and means for rotating peaches in said peach holding means about horizontal and vertical axes into predetermined positions of orientation as to suture plane as the turret rotates, a transfer turret rotatable continuously in the plane of said splitting mechanism and having means for abducting a peach from the first turret and delivering the peach with its suture plane aligned with the splitting mechanism to the conveyor without interrupting the movements of the first turret and the conveyor.

39. In a fruit treating machine, a combination of a continuously movable conveying means having a fruit gripping device, a second continuously movable conveying means having a fruit orienting device for orienting fruit engaged thereby, the two conveying means being mounted for movement in transverse planes, said second conveying means having a fruit holding member for supporting the fruit in engagement with said fruit orienting device and means for causing simultaneous release of the fruit by the fruit holding member of the second conveying means and gripping of the fruit by the gripping device of the first mentioned conveying means whereby to transfer the oriented fruit in predetermined oriented position from the second conveying means.

40. In an orienting mechanism for indented fruit, rotating means receiving the indented fruit in random position for revolving the fruit and causing oriented or nonoriented fruit to be displaced different amounts from a predetermined reference plane, assorting apparatus including an inspection member positioned to engage fruit displaced a certain amount from said reference plane by said rotating means and to clear fruit displaced a different amount from said reference plane by said rotating means, whereby to distinguish between oriented and unoriented fruit and said apparatus including means operably connected to said member for delivering oriented fruit separately from unoriented fruit under the control of said member.

41. In a machine for orienting indented fruit, a fruit carrier, fruit rotating means engaging fruit on the carrier for vertically displacing oriented fruit relative to unoriented fruit on said carrier as the carrier moves along a portion of its path, and assorting means including a control member positioned in juxtaposition to the carrier to engage fruit carried by said carrier along a subsequent portion of its path and responsive to the relative vertical displacement of oriented fruit from unoriented fruit for rejecting unoriented fruit.

42. In a machine for orienting indented fruit, fruit rotating means for positioning the fruit at one elevation when not aligned with the indent and permitting the fruit to drop below said elevation when aligned with the indent, and assorting means including a control member positioned to engage the fruit in one of the vertical positions of elevation of the fruit for rejecting unoriented fruit while passing oriented fruit.

43. In a fruit feeding machine, a first conveyor moving continuously at a uniform rate and having a plurality of spaced fruit holders for receiving and feeding the fruit in a predetermined centroidal plane at said rate, a fruit transfer carrier having a pair of relatively movable fruit gripping members carried by said transfer carrier along a path intersecting the path of movement of the fruit in the holders of the first conveyor, and means for moving the fruit gripping members relatively toward each other as they are brought by the transfer carrier to said point of intersection to grip and extract fruit from the holders of the first conveyor without interfering with the movement of said conveyor.

44. In a fruit feeding machine, a first conveyor moving continuously at a uniform rate and having a plurality of spaced fruit holds for receiving and feeding the fruit in a predetermined centroidal plane at said rate, a fruit transfer carrier having a pair of relatively movable fruit gripping members carried by said transfer carrier along a path intersecting the path of movement of the fruit in the holders of the first conveyor, said pair of fruit gripping members being mounted for movement relative to the transfer carrier, means for moving the fruit gripping members relatively toward each other as they are brought by the transfer carrier to said point of intersection to grip and extract fruit from the holders of the first conveyor without interfering with the movement of said conveyor, and means for moving said gripping members relative to the transfer carrier and in the direction of movement of said carrier on initial gripping of the fruit to accelerate the movement of the gripping members during the transfer of the fruit.

References Cited in the file of this patent

UNITED STATES PATENTS

| Number | Name | Date |
|---|---|---|
| Re. 17,659 | Thompson | May 6, 1930 |
| 407,161 | Brooks | July 16, 1889 |
| 808,067 | Briggs | Dec. 26, 1905 |
| 1,047,786 | Goldman | Dec. 17, 1912 |
| 1,325,704 | Scott | Dec. 23, 1919 |
| 1,358,913 | Young | Nov. 16, 1920 |
| 1,423,649 | Daniel | July 25, 1922 |
| 1,860,745 | MacDougall | May 31, 1932 |
| 1,885,946 | Redler | Nov. 1, 1932 |
| 1,901,042 | Robbins | Mar. 14, 1933 |
| 2,010,865 | Kingsbury | Aug. 13, 1935 |
| 2,026,794 | Neighbour | Jan. 7, 1936 |
| 2,096,264 | Schutz | Oct. 19, 1937 |
| 2,190,970 | Ashlock | Feb. 20, 1940 |
| 2,197,794 | Ewald | Apr. 23, 1940 |
| 2,207,179 | Schreiber | July 9, 1940 |
| 2,225,979 | Carroll | Dec. 24, 1940 |
| 2,226,664 | Jepson | Dec. 31, 1940 |
| 2,232,210 | Carroll | Feb. 18, 1941 |
| 2,254,595 | Carroll | Sept. 2, 1941 |
| 2,255,533 | Ridley | Sept. 9, 1941 |
| 2,259,332 | Winkelman | Oct. 14, 1941 |
| 2,265,515 | Carroll | Dec. 9, 1941 |
| 2,277,711 | Nawman | Mar. 31, 1942 |
| 2,296,490 | Ashlock | Sept. 22, 1942 |
| 2,309,321 | Jepson | Jan. 26, 1943 |
| 2,335,239 | Gladfelter | Nov. 30, 1943 |
| 2,343,496 | Carroll | Mar. 7, 1944 |
| 2,428,370 | Kelly | Oct. 7, 1947 |
| 2,443,863 | Lindley | June 22, 1948 |
| 2,447,640 | Dunn | Aug. 24, 1948 |
| 2,506,779 | Criger | May 9, 1950 |
| 2,525,990 | Wurgaft | Oct. 17, 1950 |
| 2,526,712 | Thompson | Oct. 24, 1950 |
| 2,540,020 | Waters | Jan. 30, 1951 |
| 2,563,443 | Wormser | Aug. 7, 1951 |
| 2,568,947 | Carroll | Sept. 25, 1951 |
| 2,581,634 | Coons | Jan. 8, 1952 |
| 2,609,913 | Doering et al. | Sept. 9, 1952 |
| 2,614,593 | Arengo-Jones | Oct. 21, 1952 |

FOREIGN PATENTS

| Number | Country | Date |
|---|---|---|
| 203,879 | Germany | Oct. 31, 1908 |
| 392,110 | Germany | Mar. 15, 1924 |
| 664,892 | Germany | Sept. 13, 1938 |